US011403675B2

(12) United States Patent
Goldshtein et al.

(10) Patent No.: US 11,403,675 B2
(45) Date of Patent: Aug. 2, 2022

(54) SYSTEMS AND METHODS FOR PRESENTING SUPPLEMENTAL INFORMATION RELATED TO AN ADVERTISEMENT CONSUMED ON A DIFFERENT DEVICE WITHIN A THRESHOLD TIME PERIOD BASED ON HISTORICAL USER INTERACTIONS

(71) Applicant: Rovi Guides, Inc., San Jose, CA (US)

(72) Inventors: Omry Zvi Goldshtein, Santa Clara, CA (US); Paul Stathacopoulos, San Carlos, CA (US); Jocelin Lee, Redwood City, CA (US); Taro Kent Banno, Los Gatos, CA (US); Joseph J. Flynn, Chalfont, PA (US); Benjamin Maughan, Pleasanton, CA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 16/795,932

(22) Filed: Feb. 20, 2020

(65) Prior Publication Data
US 2020/0258128 A1 Aug. 13, 2020

Related U.S. Application Data

(63) Continuation of application No. 15/639,709, filed on Jun. 30, 2017, now Pat. No. 10,607,260.

(51) Int. Cl.
G06Q 30/02 (2012.01)
(52) U.S. Cl.
CPC ..... *G06Q 30/0272* (2013.01); *G06Q 30/0256* (2013.01); *G06Q 30/0277* (2013.01)

(58) Field of Classification Search
CPC .......... G06Q 30/0272; G06Q 30/0277; G06Q 30/0256; G06Q 30/0267
See application file for complete search history.

(56) References Cited

U.S. PATENT DOCUMENTS

| 6,856,330 B1 * | 2/2005 | Chew ................... G06F 3/0481 715/744 |
| 8,516,515 B2 * | 8/2013 | Zigmond ............... G06Q 30/02 725/19 |

(Continued)

FOREIGN PATENT DOCUMENTS

WO WO-2016170728 A1 * 10/2016 ........... H04N 21/812

*Primary Examiner* — Alexandru Cirnu
(74) *Attorney, Agent, or Firm* — Haley Guiliano LLP

(57) ABSTRACT

Systems and methods are described for presenting supplemental information to a user that is related to an advertisement consumed by the user that the user found interesting. It may be determined that a user is interested in receiving supplemental information based on the user starting to use a device within a threshold time period from consuming the advertisement on a different device. The threshold time period may be determined based on historical amounts of time users have taken to access supplemental information after consuming the advertisement (e.g., if users access a webpage associated with the advertisement five minutes after the conclusion of the advertisement, the threshold time period may be five minutes). In response to determining that the user started using the first device within the threshold period of time from the end of the advertisement, supplemental information associated with the advertisement may be presented.

18 Claims, 13 Drawing Sheets

(56) References Cited

U.S. PATENT DOCUMENTS

| | | | |
|---|---|---|---|
| 9,691,084 B1 * | 6/2017 | Gong | G06Q 30/0252 |
| 2007/0118425 A1 * | 5/2007 | Yruski | H04L 67/306 |
| | | | 705/14.61 |
| 2007/0226053 A1 * | 9/2007 | Carl | G06Q 30/0239 |
| | | | 705/14.39 |
| 2014/0289239 A1 * | 9/2014 | Kanigsberg | G06Q 30/0625 |
| | | | 707/733 |
| 2014/0298257 A1 * | 10/2014 | Grandhi | G06F 3/0484 |
| | | | 715/808 |
| 2015/0235275 A1 * | 8/2015 | Shah | G06Q 30/0269 |
| | | | 705/14.66 |

* cited by examiner

700

702 — Detect that a User has Started Using a First Device

704 — Identify an Advertisement Slot Associated with One or More Advertisements that the User has Most Recently Consumed on a Second Device

706 — Determine that the User Started Using the First Device within an Amount of Time from an Endpoint of the Advertisement Slot that Corresponds to a Duration Associated with the Advertisement Slot

708 — Generate for Display, on the First Device, Supplemental Information Associated with the One or More Advertisements Associated with the Advertisement Slot

FIG. 7

SYSTEMS AND METHODS FOR PRESENTING SUPPLEMENTAL INFORMATION RELATED TO AN ADVERTISEMENT CONSUMED ON A DIFFERENT DEVICE WITHIN A THRESHOLD TIME PERIOD BASED ON HISTORICAL USER INTERACTIONS

CROSS-REFERENCE TO RELATED APPLICATION

This patent application is a continuation of U.S. patent application Ser. No. 15/639,709, filed Jun. 30, 2017, the disclosure of which is hereby incorporated by reference herein in its entirety.

BACKGROUND

Due to the plethora of media assets available to modern consumers, content providers have multiple advertising slots to fill with promotional content. Because of the large number of advertisements consumed by a user even during a single media asset, it is difficult for an advertiser to determine whether the user is interested in their advertised product(s) or the products of another advertiser. It is of value to advertisers to understand when users are engaged with an advertisement so that the advertiser can provide additional information that may facilitate the user purchasing product(s).

Some conventional systems display, while the advertisement is being presented, a prompt to a user to view information related the advertisement (e.g., a promotion) overlaid on the advertisement. However, in this approach, the supplemental information is received during the advertisement. Furthermore, displaying an overlay with supplemental information may interfere with a media asset that a user is watching, which may be particularly problematic in a multiple user environment where some users are uninterested in the advertisement. Many users may decide that an advertisement is interesting and wish to learn more about the product(s) that were advertised. Using conventional systems, the user may need to manually search for content associated with the advertisement he or she has just consumed (e.g., in a web browser).

SUMMARY

Accordingly, systems and methods are described herein for presenting supplemental information to a user that is related to an advertisement consumed by the user that the user found interesting. The systems and methods may determine that a user is interested in receiving supplemental information based on the user starting to use a device within a threshold time period from consuming the advertisement on a different device. Specifically, the system may determine that a user has started using a first device (e.g., a mobile device) within a period of time from the end of an advertisement that the user consumed on a second device (e.g., a television). The system may determine a threshold time period based on the length of the advertisement slot including the advertisement (e.g., the threshold time period may be 30 seconds if the length of the advertisement slot is 30 seconds). Alternatively or additionally, the system may determine a threshold time period based on historical amounts of time it has taken users to access supplemental information on their own after consuming the advertisement (e.g., if users access a webpage associated with the advertisement five minutes after the conclusion of a particular advertisement, the threshold time period may be five minutes). In response to determining that the user started using the first device within the threshold period of time from the end of the advertisement, the system may present supplemental information associated with the advertisement to the user. In this way, the system presents supplemental information associated with an advertisement to a user after the user consumes the advertisement and without explicitly prompting the user for the supplemental information. This enables the user to receive supplemental information efficiently by, for example, not having to type in a website URL or perform a search on a device, as the information is automatically presented.

In some aspects, a media guidance application may be configured to present supplemental information that is related to an advertisement consumed on a device if the user begins using a different device within a threshold time period of an advertisement slot corresponding to the advertisement slot (e.g., the length of the advertisement slot). Specifically, the media guidance application may detect that a user has started using a first device at a first time. For example, at the first time, the media guidance application may check the user's recent interactions with the first device to determine whether the user has just started using the device after a period of not using the device.

In some embodiments, the media guidance application may detect that the user has started using the first device based on whether the first device has recently received a user input prior to the first time. Specifically, the media guidance application may receive, at the first device, a user input at the first time. For example, the media guidance application may detect that the user has input a command (e.g., a user has unlocked the screen of the first device) at the first time (e.g., 8:22 pm). To determine whether the user was already using the first device or whether the user has started using the first device at the first time, the media guidance application may retrieve a second time corresponding to a most recent user input received prior to the first input.

The media guidance application, in order to determine whether the previous user input indicates that the user started to use the first device at the first time or was already using the first device, compares the first time with the second time that the previous user input was received. Specifically, the media guidance application may determine that a difference between the first time and the second time is greater than a threshold difference. For example, if the user sent an email ten seconds prior to the first time and the threshold is five minutes, then the media guidance application may determine that since the previously received user input was close in time to the first time it likely does not indicate the user is interested in the advertisement based on the threshold being greater than the calculated difference. The media guidance application may, in response to determining that the difference is greater than the threshold difference, determine that the user has started using the device. For example, if the previous user input was received 12 minutes from the user input at the first time and the threshold is five minutes, the media guidance application may determine that the user had stopped using the device and has now started using the device, which may be due to the user's interest in the advertisement.

In some embodiments, the media guidance application may determine that the difference between the first time and the second time is greater than the threshold difference based on the average time between user inputs. Specifically, the media guidance application may retrieve a log of recent user inputs on the first device. For example, as discussed above, the media guidance application may retrieve a log of recent user inputs from storage of the first device. The media guidance application may determine, based on the log of recent user inputs, an average time between user inputs on the first device. For example, the media guidance application may iteratively determine differences between every user input and a next most recent user input in the log, or a subset within a threshold timeframe (e.g., the last two hours). As a specific example, if user inputs were received at 8:10 pm, 8:20 pm, and 8:22 pm, the media guidance application may calculate the differences as two minutes and ten minutes, respectively. The media guidance application may average the differences by dividing the total number of differences by the sum of the differences. Continuing with the previous example, if two minutes and ten minutes were calculated as the differences, then the average difference calculated by the media guidance application may be six minutes.

The media guidance application may compare the difference between the most recent user input and the second most recent user input with the average amount of time between user inputs at the first device. Specifically, the media guidance application may compare the average time between user inputs with the difference between the first time and the second time. For example, the media guidance application may compare the average time (e.g., two minutes) between user inputs with the time between the two most recent user inputs (e.g., ten minutes) to determine which value is greater. The media guidance application may determine, based on comparing the average time between user inputs with the difference, that the average time between user inputs is less than the difference. For example, the media guidance application may determine that since the average time between user inputs is two minutes and the time between the two most recent user inputs (e.g., at the first time and the second time) is ten minutes, the user has started using the first device at the first time. The media guidance application may, based on determining that the average time between user inputs is less than the difference, determine that the difference between the first time and the second time is greater than the threshold difference. For example, since the average time between user inputs is less than the difference, the media guidance application may determine that the user started using the first device at the first time, and has not been using the first device.

The media guidance application may, based on detecting that the user has started using the first device at the first time, determine whether the user has consumed an advertisement on a second device within a threshold amount of time from when the advertisement slot associated with the advertisement ended. If the user has consumed the advertisement on the second device within the threshold amount of time, the media guidance application may present supplemental information to the user. Specifically, the media guidance application may search media asset consumption history associated with the user for an advertisement that the user consumed last. For example, the media guidance application may determine based on an associated time period during which the advertisement was consumed which advertisement the user consumed most recently (e.g., based on comparison with the first time when the user started using the first device). As a specific example, the consumption history may store an indication that the user consumed an advertisement with identifier "Cola_ad_1" from 8:20 pm to 8:21 pm. If the current time is 8:22 pm and no additional advertisements were consumed after "Cola_ad_1," then the media guidance application may determine it is the advertisement that the user consumed last.

In some embodiments, the media guidance application may determine the advertisement that the user consumed last based on which advertisement was consumed on a second device that is closest to the current location of the first device. Specifically, the media guidance application may detect a device that is closest to the first device, where the device is one of a plurality of devices associated with the user. For example, the media guidance application may receive an indication that an identifier associated with the user (e.g., a parental control PIN and/or any other login that is specific to the user) has been entered on a second device. Based on receiving the indication that the identifier associated with the user has been entered on the second device, the media guidance application may determine that the second device is located closest to the first device that the user started using at the first time. Alternatively or additionally, the media guidance application may receive GPS coordinates and/or an estimated distance from a wireless network hub (e.g., a hotspot) based on signal strength to determine a location of the first device and which other devices are nearby. In this way, the media guidance application may prevent the user from receiving supplemental information about advertisements he or she did not watch (e.g., if the user's sister consumed an advertisement most recently on a television that is also associated with the user, the user may receive supplemental information about the advertisement his sister consumed which will likely not be of interest).

The media guidance application may determine a device identifier of the device closest to the first device. For example, the media guidance application may retrieve an identifier, which may be any combination of characters that uniquely identifies the device from other devices associated with the user (e.g., "Family Room STB"), of the device determine to be closest to the first device. The media guidance application may retrieve, using the device identifier for the device closest to the first device, device media asset consumption history associated with the user. For example, the media guidance application may filter the media asset consumption history (e.g., of media assets consumed by the user on multiple devices) based on the device each media asset was consumed on in order to determine the advertisement most recently consumed on the device determined to be closest to the user (e.g., media assets are grouped based on device identifiers where the user consumed the media assets). The media guidance application may search the device media asset consumption history for the advertisement that the user consumed last. Continuing with the above example, the media guidance application may sort the advertisements consumed by the user on the device determined to be closest to the first device by time and date. The media guidance application may determine from the sorted device consumption history which advertisement that the user consumed last on the device closest to the first device (e.g., based on the time and date of a particular advertisement being closest to the current time and date).

The media guidance application may retrieve, from the media asset consumption history associated with the user, a time period associated with the advertisement that the user consumed last. For example, the media guidance application may retrieve a start value and/or end value of the advertisement from the media asset consumption history. As a specific example, the media guidance application may retrieve two values from the media asset consumption history, indicating that from 8:21:20 pm (hours:minutes:seconds) to 8:21:40 pm (hours:minutes:seconds) the user consumed the advertisement.

The media guidance application may search for an advertisement slot associated with the advertisement that the user consumed last. For example, the media guidance application may compare the time period of the advertisement that the user consumed last with an index of advertisement slots and advertisements that filled the slots. The media guidance application may retrieve metadata associated with the advertisement (e.g., from a media guidance data source or the media asset consumption history associated with the user) such as an identifier of the advertisement (e.g., "Budweiserad1"), a source from which the user consumed the advertisement (e.g., "NBC"), and/or any other information associated with the advertisement that may enable the media guidance application to more efficiently determine the advertisement slot associated with the advertisement that the user consumed last.

In some embodiments, the media guidance application may determine the advertisement slot associated with the advertisement that the user consumed last from a schedule data structure of advertisement slots (e.g., stored at a remote server). Specifically, the media guidance application may retrieve, from the media asset consumption history associated with the user, an identifier of a source associated with the advertisement. For example, the media guidance application may retrieve the identifier of the source (e.g., "NBC") that aired the advertisement from a field of the media asset consumption history associated with the advertisement that the user most recently consumed. The media guidance application may retrieve a schedule data structure for the source containing the plurality of advertisement slot time periods. The media guidance application may compare the time period associated with the advertisement that the user consumed last with each of the plurality of advertisement slot time periods stored in the schedule data structure. For example, the media guidance application may retrieve that a particular advertisement slot was scheduled on Monday, Apr. 24, 2017 from 8:20 pm to 8:23 pm. Continuing with this example, the media guidance application may compare the retrieved time period with the time period associated with the advertisement to determine whether the advertisement fits within the time period associated with the advertisement slot. The media guidance application may determine, based on comparing the time period associated with the advertisement that the user consumed last with each of the plurality of advertisement slot time periods, that the time period associated with the advertisement that the user consumed last matches a stored advertisement slot time period. For example, if the advertisement that the user consumed last was presented on Monday, Apr. 24, 2017 from 8:21 pm to 8:22 pm, the media guidance application may determine that the advertisement is part of an advertisement slot scheduled for the same date from 8:20 pm to 8:23 pm. The media guidance application may retrieve, from a field of the schedule data structure associated with the stored advertisement slot time period, a corresponding identifier. For example, the media guidance application may retrieve an identifier of the advertisement slot, which may be any combination of characters that uniquely identifies the advertisement slot from other advertisement slots. The media guidance application may determine, based on the corresponding identifier, that the advertisement is associated with the advertisement slot. For example, the media guidance application may determine that the advertisement is associated with the advertisement slot identified by the retrieved identifier.

The media guidance application may retrieve a start time code and an end time code associated with the advertisement slot. For example, the media guidance application may retrieve an end time code (20:21:40:00) corresponding to (hour:minute:second:frame) when the advertisement time slot ended. Thus, the media guidance application may retrieve start and end time codes associated with the advertisement slot, indicating that the advertisement slot lasted from 8:21:00 pm to 8:21:40 pm.

The media guidance application may calculate a length of the advertisement slot based on a difference between the start time code and the end time code, and an amount of time starting from an endpoint of the advertisement slot to when the user started using the first device. For example, the media guidance application may calculate and store the length of the advertisement slot by subtracting the end time code from the start time code associated with the advertisement slot. As a specific example, if the start time code is (20:21:00:00) and the end time code is (20:21:40:00), the media guidance application may calculate that the length of the advertisement slot is 40 seconds. For example, the media guidance application may calculate and store the amount of time by subtracting the first time from the end time code of the advertising slot. As a specific example, if the user started using the first device at (20:22:10:00) and the end time code is (20:21:40:00), then the media guidance application may calculate the amount of time as 30 seconds. In some embodiments, the end time code of the advertisement slot may not be the endpoint of the advertisement slot. For example, the media guidance application may add a small amount of time (e.g., ten seconds) to account for a transition element that leads back into the show provided as part of the media asset by a content source. In some embodiments, the frame may be included as part of the length of the advertisement, for example, the length of an advertisement may be 30 seconds and ten frames. In other embodiments, the frames may be converted to seconds based on a frame rate of the media asset, for example, ten frames at 20 frames per second is 0.5 seconds.

The media guidance application may compare the length of the advertisement slot with the amount of time starting from the endpoint of the advertisement slot to when the user started using the first device. For example, the media guidance application may compare the two calculated values to determine which is greater. In some embodiments the media guidance application may round the two values (e.g., to the nearest second) for easier comparison.

The media guidance application may determine, based on the comparing, that the user started using the first device within the amount of time from the endpoint of the advertisement slot that corresponds to a duration associated with the advertisement slot. As a specific example, if the amount of time from the endpoint of the advertisement slot to when the user began using the first device was calculated as 30 seconds and the length of the advertisement slot is 40 seconds, then the media guidance application may determine that the user started using the first device within the amount of time from the endpoint of the advertisement slot. In some embodiments, the media guidance application may determine that the user started using the first device within the amount of time if the amount of time is within a tolerance factor of the duration. The tolerance factor may be adjusted based on user preferences or interaction history (e.g., stored in a profile associated with the user). For example, if the user typically leaves his or her mobile phone in another room when consuming media assets, the user may desire a longer period of time to trigger supplemental information related to advertisements and the media guidance application may store this preference in a profile associated with the user.

Alternatively or additionally, the media guidance application may adjust the length of the advertisement slot and/or the amount of time starting from the endpoint of the advertisement slot to when the user started using the first device based on user interactions after the end of the advertisement slot. For example, if the media guidance application determines that the user has paused the media asset within the length of the advertisement slot from the end of the advertisement slot, it may indicate that the user is interested in supplemental information associated with the advertisement that the user consumed last and the amount of time may be decreased (or tied to the playback position in the media asset as opposed to absolute time). Alternatively or additionally, the media guidance application may receive an indication that the user changed channels after the advertisement slot concluded, which may indicate that the user is not interested in obtaining supplemental information related to the advertisement. Accordingly, the amount of time starting from the endpoint of the advertisement slot to when the user started using the first device may be increased.

In some embodiments, the media guidance application may adjust the amount of time from the endpoint of the advertisement slot to when the user started using the first device based on the user pausing the media asset on the second device. Specifically, the media guidance application may receive, from the second device, an indication that a media asset currently played on the second device has been paused for a second duration. For example, the media guidance application may receive an indication from the second device that the user has paused the media asset being consumed on the second device and a time that the second device received the pause request from the user. The media guidance application may determine whether the pause was related to the advertisement slot based on the time when it was received. Specifically, the media guidance application may determine, based on the received indication, that a start of the second duration is both (1) after the end of the advertisement and (2) before the amount of time from the endpoint of the advertisement slot that corresponds to the first duration. For example, the media guidance application may compare a time code associated with the time that the media asset was paused (e.g., 8:22 pm) with the endpoint of the advertisement slot (e.g., 8:20 pm) to determine whether the pause happened after the advertisement slot ended. The media guidance application may also compare the time after the endpoint of the advertisement slot that corresponds to the first duration with the time that the media asset was paused. For example, the media guidance application may determine whether the media asset was paused after the endpoint of the advertisement, but before a duration (e.g., one minute) corresponding to the length of the advertisement slot. The media guidance application, in response to determining that the start of the second duration is both (1) after the end of the advertisement and (2) before the amount of time from the endpoint of the advertisement slot that corresponds to the first duration, may decrease the amount of time starting from the endpoint of the advertisement slot to when the user started using the first device by the second duration. For example, if the media guidance application determines that the media asset on the second device was paused after the end of the advertisement slot, but before a threshold amount of time after the endpoint of the advertisement slot, the media guidance application may determine there is a high likelihood that the user paused the media asset to obtain supplemental information associated with the advertisement slot. Continuing with this example, the media guidance application may accordingly decrease the amount of time starting from the endpoint by the amount of time that the media asset was paused to ensure that the threshold time does not pass while the media asset is paused.

The media guidance application may, in response to determining that the user started using the first device within the amount of time from the endpoint of the advertisement slot that is equal to the duration associated with the advertisement slot, retrieve supplemental information associated with one or more advertisements associated with the advertisement slot and generate the supplemental information for display. For example, the media guidance application may determine that since the user began using the first device within the amount of time from the end of the advertisement slot that is shorter than the length of the advertisement slot itself, supplemental information related to an advertisement should be presented to the user. Specifically, the media guidance application may retrieve supplemental information for one or more advertisements associated with the advertisement slot. For example, the media guidance application may determine that the advertisement that the user consumed most recently (e.g., "Budweiser_ad_1") matches an identifier that is associated with supplemental information. The media guidance application may retrieve supplemental information associated with the stored identifier. For example, the media guidance application may retrieve a pointer to a location in memory where the supplemental information is located and retrieve the supplemental information from that location.

In some embodiments, the media guidance application may determine the location of the second device in order to target supplemental information to the user that is related to an advertisement of the advertisement slot. Specifically, the media guidance application may retrieve a location of the second device from a profile associated with the user, where the location is from a plurality of locations that indicate an area in a home. For example, the media guidance application may retrieve the profile which includes identifiers of devices associated with the user each with at least one corresponding indication of a location of the device (e.g., "bedroom"). Continuing with this example, the media guidance application may retrieve a location from a field associated with the second device in the profile. In some embodiments, the locations may be locations in any building (e.g., an airport or office building) such that a user waiting for a flight at an airport consuming a television monitor may be able to obtain supplemental information related to an advertisement that he or she has consumed. The media guidance application may retrieve a plurality of identifiers of supplemental information associated with the one or more advertisements, where each of the plurality of identifiers is associated with one or more locations of the plurality of locations. For example, the media guidance application may retrieve identifiers of locations of each of a plurality of supplemental information.

The media guidance application may compare the location of the second device with each location associated with one of the retrieved plurality of identifiers of supplemental information. For example, the media guidance application may iteratively compare the location of the second device retrieved from the profile (e.g., "bedroom") with locations associated with supplemental information that is related to an advertisement of the advertisement slot. As a specific example, the media guidance application may compare the location of the second device, "bedroom," with the location associated with supplemental information related to a television discount that is associated with the locations "bedroom" and "living room" because user's most commonly use televisions in those rooms. The media guidance application may determine, based on comparing the location of the second device with each location associated with one of the retrieved plurality of identifiers of supplemental information, that the location matches a stored location. For example, the media guidance application may determine that all, or a threshold amount or percentage, of characters describing the location of the second device match characters describing the location associated with a particular supplemental information and thus the two locations match. The media guidance application may retrieve, from a field associated with the stored location, corresponding supplemental information related to the location of the second device. For example, the media guidance application may retrieve a pointer to a location in storage that contains data for presenting a television discount that is associated with the location of the second device (e.g., "bedroom"). The media guidance application may retrieve the supplemental information from the location in storage.

In some embodiments, the media guidance application may determine which supplemental information associated with advertisements in the advertisement slot to display based on user preferences. Specifically, the media guidance application may determine that a plurality of advertisements is associated with the advertisement slot. For example, the media guidance application may, based on a retrieved identifier associated with the advertisement slot that contains the advertisement that the user most recently consumed, query a database (e.g., either local in storage or at a remote server) to determine which, if any, other advertisements were presented during the advertisement slot. The media guidance application may retrieve, for each advertisement of the plurality of advertisements, a product type associated with the advertisement. For example, the media guidance application may retrieve, from a field of the database associated with each advertisement in the advertisement slot, an identifier of a product type. For example, the product type may be any combination of characters (e.g., a string) and describe a general category of the product that was advertised (e.g., such as "beer" or "organic food"). The media guidance application may compare each retrieved product type with user preferences stored in a profile associated with the user. For example, the media guidance application may compare the characters of each user preference in the profile associated with a product type with each product type associated with an advertisement in the advertisement slot. The user preferences may be explicit indications of products that the user enjoys (e.g., the user has indicated that they "love" the product type "beer"). Alternatively or additionally, the user preferences may be implicit and based on user purchasing history. For example, if the user often buys beer, they likely enjoy and have a preference for the product type, "beer".

The media guidance application may determine, based on comparing each retrieved product type with the user preferences, that a first user preference matches the product type associated with a first advertisement of the plurality of advertisements (e.g., one of the advertisements in the advertisement slot). For example, based on the characters, "beer" of a user preference matching the characters "beer" associated with a product type of a particular advertisement in the advertisement slot, the media guidance application may determine that the user has a preference for the particular advertisement. The media guidance application may, in response to determining that the first user preference matches the product type associated with the first advertisement, retrieve supplemental information associated with the first advertisement. For example, the media guidance application may retrieve a pointer to a location in storage that contains supplemental information that is associated with the advertisement that is for the product type that matches the user preferences. The media guidance application may retrieve the supplemental information from the location in storage.

In some embodiments, the media guidance application may generate a display enabling the user to select an advertisement of interest that aired during the advertisement slot in order to obtain appropriate supplemental information. Specifically, the media guidance application may determine that a plurality of advertisements is associated with the advertisement slot. For example, the media guidance application may, based on a retrieved identifier associated with the advertisement slot that contains the advertisement that the user most recently consumed, query a database to determine which, if any, other advertisements were presented during the advertisement slot. The media guidance application may generate for display a selectable indicator associated with each advertisement of the plurality of advertisements. For example, the media guidance application may generate for display text, graphics, or a combination as the indicator that describes each advertisement. The indicators may be displayed in a grid or a list and may be selectable, such that a user is able to select an indicator that he or she is interested in receiving supplemental information for. As a specific example, the indicators may be screenshots from each advertisement from the advertisement slot, or a graphic showing a product from each advertisement. The media guidance application may receive a user selection of a first selectable indicator associated with a first advertisement of the plurality of advertisements. For example, the media guidance application may receive a user selection of an indicator via a user input interface such as a touchscreen. The media guidance application may, in response to receiving the user selection of the first selectable indicator, retrieve supplemental information associated with the first advertisement.

The media guidance application may generate for display the supplemental information. The supplemental information may be text, graphics, video, or any other visual depiction of information related to the advertisement. As another example, the supplemental information may be related to a promotion, sale, coupon, discount, newly available product, or any other information the advertiser wishes to inform the user about to entice him or her to purchase a good or a service. As another example, the media guidance application may generate the supplemental information automatically upon detecting that the user has started using the first device (e.g., as an overlay or popup). The media guidance application may, alternatively or additionally, prompt the user prior to presenting the supplemental information. In response to receiving a user selection to display the supplemental information, the media guidance application may generate the retrieved supplemental information for display.

In some embodiments, the media guidance application may configure an application on the first device to generate for display the retrieved supplemental information when the application is accessed. Specifically, the media guidance application may retrieve the supplemental information in response to the user starting to use the first device, but generate for display that supplemental information responsive to another user input (e.g., launching the application). For example, the media guidance application may retrieve the supplemental information in response to the user unlocking the first device and may use the information to configure a homepage or a start page of a web browser application. Continuing with this example, when the user selects the web browser application with another user input, the user is presented with the supplemental information (e.g., the browser loads the start page or the homepage). It should be noted that in some embodiments, if the user doesn't access the application within a threshold amount of time (e.g., the threshold discussed above), the media guidance application may reconfigure the application to not present the supplemental information.

In some embodiments, the selection of a web browser application or other application may itself be the indication that the user has started using the first device. Specifically, upon receiving a selection of an application by the user, the media guidance application may retrieve supplemental information related to an advertisement that a user recently consumed and configure the application to generate the supplemental information for display. For example, the media guidance application may retrieve the supplemental information in response to the user selecting a web browser application on the first device and may use the information to configure a homepage or a start page of the web browser application. Continuing with this example, the web browser application may present the supplemental information in a banner advertisement on a start page or the homepage of the web browser application.

In some embodiments, the media guidance application may determine on which device to generate for display supplemental information based on user preferences. Specifically, the media guidance application may determine a type of the supplemental information. For example, the type may be a movie, text article, graphic(s) or any other category of information that can be presented to a user. The media guidance application may determine the type of a particular retrieved supplemental information from a stored string in a header of the retrieved supplemental information identifying the type (e.g., type='movie'). The media guidance application may compare the type of the supplemental information with user preferences stored in a profile associated with the user, where the user preferences identify devices to display types of supplemental information on. For example, the media guidance application may retrieve preferences of the user for different types of supplemental information and determine whether a retrieved preference matches the type of the presently retrieved supplemental information. The media guidance application may determine, based on comparing the type of the supplemental information with the user preferences, that the type of the supplemental information matches a first stored user preference associated with displaying supplemental information on the second device. For example, the media guidance application may determine that the type of the supplemental information, "movie," matches a user preference for displaying a "movie" on the second device (as opposed to on the first device, which may be more difficult for the user to see the supplemental information due to a smaller display size). The media guidance application may, in response to determining that the type of the supplemental information matches the first stored user preference, transmit an instruction to the second device to display the supplemental information. For example, the media guidance application may transmit the supplemental information and an instruction to the second device to generate the supplemental information for display.

In some aspects, the media guidance application may be configured to present supplemental information that is related to an advertisement consumed on a device if the user begins using a different device within a threshold time period of the end an advertisement based on the average amount of time users have historically taken to access supplemental information manually (e.g., by typing in a website URL after consuming an advertisement). Specifically, the media guidance application may detect that a user has started using a first device at a first time. For example, at the first time, the media guidance application may analyze the user's recent interactions with the first device to determine whether the user has just started using the device after a period of not using the device.

In some embodiments, the media guidance application may detect that the user has started using the first device based on whether the first device has recently received a user input prior to the first time. Specifically, the media guidance application may receive, at the first device, a user input at the first time. For example, the media guidance application may detect that the user has input a command (e.g., a user has unlocked the screen of the first device) at the first time (e.g., 8:22 pm). To determine whether the user was already using the first device or whether the user has started using the first device at the first time, the media guidance application may retrieve a second time corresponding to a most recent user input received prior to the first input.

The media guidance application, in order to determine whether the previous user input indicates that the user started to use the first device at the first time or was already using the first device, compares the first time with the second time that the previous user input was received. Specifically, the media guidance application may determine that a difference between the first time and the second time is greater than a threshold difference. For example, if the user sent an email ten seconds prior to the first time and the threshold is five minutes, then the media guidance application may determine that since the previously received user input was close in time to the first time it likely does not indicate the user is interested in the advertisement based on the threshold being greater than the calculated difference. The media guidance application may, in response to determining that the difference is greater than the threshold difference, determine that the user has started using the device. For example, if the previous user input was received 12 minutes from the user input at the first time and the threshold is five minutes, the media guidance application may determine that the user had stopped using the device and has now started using the device, which may be due to the user's interest in the advertisement.

In some embodiments, the media guidance application may determine that the difference between the first time and the second time is greater than the threshold difference based on the average time between user inputs. Specifically, the media guidance application may retrieve a log of recent user inputs on the first device. For example, as discussed above, the media guidance application may retrieve a log of recent user inputs from storage of the first device. The media guidance application may determine, based on the log of recent user inputs, an average time between user inputs on the first device. For example, the media guidance application may iteratively determine differences between every user input and a next most recent user input in the log, or a subset within a threshold timeframe (e.g., the last two hours). As a specific example, if user inputs were received at 8:10 pm, 8:20 pm, and 8:22 pm, the media guidance application may calculate the differences as two minutes and ten minutes, respectively. The media guidance application may average the differences by dividing the total number of differences by the sum of the differences. Continuing with the previous example, if two minutes and ten minutes were calculated as the differences, then the average difference calculated by the media guidance application may be six minutes.

The media guidance application may compare the difference between the most recent user input and the second most recent user input with the average amount of time between user inputs at the first device. Specifically, the media guidance application may compare the average time between user inputs with the difference between the first time and the second time. For example, the media guidance application may compare the average time (e.g., two minutes) between user inputs with the time between the two most recent user inputs (e.g., ten minutes) to determine which value is greater. The media guidance application may determine, based on comparing the average time between user inputs with the difference, that the average time between user inputs is less than the difference. For example, the media guidance application may determine that since the average time between user inputs is two minutes and the time between the two most recent user inputs (e.g., at the first time and the second time) is ten minutes, the user has started using the first device at the first time. The media guidance application may, based on determining that the average time between user inputs is less than the difference, determine that the difference between the first time and the second time is greater than the threshold difference. For example, since the average time between user inputs is less than the difference, the media guidance application may determine that the user started using the first device at the first time, and has not been using the first device.

The media guidance application may, based on detecting that the user has started using the first device at the first time, determine whether the user has consumed an advertisement on a second device within a threshold amount of time from when the advertisement ended. If the user has consumed the advertisement on the second device within the threshold amount of time, the media guidance application may present supplemental information to the user. Specifically, the media guidance application may search media asset consumption history associated with the user for an advertisement that the user consumed last. For example, the media guidance application may determine based on an associated time period during which the advertisement was consumed which advertisement the user consumed most recently (e.g., based on comparison with the first time when the user started using the first device). As a specific example, the consumption history may store an indication that the user consumed an advertisement with identifier "Cola_ad_1" from 8:20 pm to 8:21 pm. If the current time is 8:22 pm and no additional advertisements were consumed after "Cola_ad_1," then the media guidance application may determine it is the advertisement that the user consumed last.

In some embodiments, the media guidance application may determine the advertisement that the user consumed last based on which advertisement was consumed on a second device that is closest to the current location of the first device. Specifically, the media guidance application may detect a device that is closest to the first device, where the device is one of a plurality of devices associated with the user. For example, the media guidance application may receive an indication that an identifier associated with the user (e.g., a parental control PIN and/or any other login that is specific to the user) has been entered on a second device. Based on receiving the indication that the identifier associated with the user has been entered on the second device, the media guidance application may determine that the second device is located closest to the first device that the user started using at the first time. Alternatively or additionally, the media guidance application may receive GPS coordinates and/or an estimated distance from a wireless network hub (e.g., a hotspot) based on signal strength to determine a location of the first device and which other devices are nearby. In this way, the media guidance application may prevent the user from receiving supplemental information about advertisements he or she did not watch (e.g., if the user's sister consumed an advertisement most recently on a television that is also associated with the user, the user may receive supplemental information about the advertisement his sister consumed which will likely not be of interest).

The media guidance application may determine a device identifier of the device closest to the first device. For example, the media guidance application may retrieve an identifier, which may be any combination of characters that uniquely identifies the device from other devices associated with the user (e.g., "Family Room STB"), of the device determine to be closest to the first device. The media guidance application may retrieve, using the device identifier for the device closest to the first device, device media asset consumption history associated with the user. For example, the media guidance application may filter the media asset consumption history (e.g., of media assets consumed by the user on multiple devices) based on the device each media asset was consumed on in order to determine the advertisement most recently consumed on the device determined to be closest to the user (e.g., media assets are grouped based on device identifiers where the user consumed the media assets). The media guidance application may search the device media asset consumption history for the advertisement that the user consumed last. Continuing with the above example, the media guidance application may sort the advertisements consumed by the user on the device determined to be closest to the first device by time and date. The media guidance application may determine from the sorted device consumption history which advertisement that the user consumed last on the device closest to the first device (e.g., based on the time and date of a particular advertisement being closest to the current time and date).

The media guidance application may retrieve metadata associated with the advertisement. For example, the media guidance application may retrieve metadata associated with an advertisement locally from storage or a remote server. The metadata may be any data related to the advertisement that describes content associated with the advertisement. For example, if the advertisement is for a new book, the metadata may include the author of the article, genre (e.g., Non-fiction), and/or publisher.

The media guidance application may determine, based on the metadata associated with the advertisement, that the advertisement is part of a group of similar advertisements. For example, the media guidance application may compare the metadata associated with the advertisement with metadata associated with each group of similar advertisements stored in the advertising database to determine which group of similar advertisements the advertisement belongs to. As a specific example, if the advertisement is for a brand of beer, the media guidance application may determine that it belongs to a group of similar advertisements for "beer."

In some embodiments, the media guidance application may determine a group of similar advertisements that the advertisement that the user consumed last is part of by comparing metadata. Specifically, the media guidance application may retrieve metadata associated with a plurality of groups of similar advertisements, where each group of similar advertisements includes advertisements that share one or more characteristics. For example, the media guidance application may retrieve identifiers of an actor, product type, company name, or any other suitable metadata that is used to characterize a group of similar advertisements, for each group of similar advertisements. As a specific example, the media guidance application may retrieve metadata "Tom Hanks" for a particular group of similar advertisements that all include the actor Tom Hanks. The media guidance application may compare the metadata associated with the advertisement with the metadata associated with each of the plurality of groups of similar advertisements. For example, the media guidance application may compare each retrieved piece of metadata associated with the advertisement that the user consumed last with the metadata associated with each group of similar advertisements by comparing the characters of the metadata. For example, the media guidance application may compare characters "Tom Hanks," who is an actor associated with the advertisement that the user consumed last, with characters "Tom Cruise," an actor associated with a particular group of similar advertisements.

The media guidance application may, based on comparing the metadata associated with the advertisement with the metadata associated with one of the plurality of groups of similar advertisements, determine that the advertisement is part of the group of similar advertisements. For example, the media guidance application may determine a match between metadata of the advertisement that the user consumed last and the metadata of the group of similar advertisements if every character matches between a particular piece of metadata (e.g., for an actor). In some embodiments, all the metadata associated with the advertisement that the user consumed last must match the metadata of the group of similar advertisements for a match to be determined. In some embodiments, if a threshold amount of the metadata matches, a match may be determined. If the media guidance application determines that the metadata matches between the advertisement that the user consumed last and a particular group of similar advertisements, the media guidance application may determine that the advertisement that the user consumed last is part of the group of similar advertisements.

The media guidance application may retrieve interaction histories for a plurality of users who consumed advertisements in the group of similar advertisements. For example, the media guidance application may retrieve multiple interaction histories where each interaction history indicates that the associated user consumed an advertisement of the group of similar advertisements. As a specific example, the interaction history may aggregate times and actions taken by a specific user from different sources, for example, a web browsing history and a television viewing history. In this way, the media guidance application may use the interaction history to determine an amount of time that a user took between consuming an advertisement and accessing supplemental information manually (e.g., by typing in the URL of a particular webpage into a web browser at a given time), as discussed further below.

The media guidance application may determine which interaction histories to retrieve based on comparing identifiers of similar advertisements from the group of similar advertisements with identifiers stored in the interaction histories. For example, one of the interaction histories may contain an identifier of an advertisement of the group of advertisements that was consumed (e.g., "Cola_ad_1") from a particular source (e.g., "CW") at a particular time (e.g., 8-8:30 pm on Jan. 1, 2017). Continuing with this example, the media guidance application may determine to retrieve the interaction history based on the interaction history including the identifier of the advertisement of the group of advertisements. The media guidance application may retrieve all, or a subset of, interaction histories where a user has consumed an advertisement that is part of the group of similar advertisements. In some embodiments, the interaction history is anonymous with no identifying information associated with the user stored in the interaction history. In other embodiments, as discussed below, the interaction history includes a demographic profile, which enables the media guidance application to select interaction histories of users that are similar to the user for a potentially more accurate determination of the threshold amount of time.

In some embodiments, the media guidance application may retrieve a portion of the available interaction histories of users based on whether demographic profiles of the users associated with the interaction histories match a demographic profile of the user. Specifically, the media guidance application may determine, based on data stored in a user profile of the user, a demographic profile of the user. For example, the media guidance application may retrieve a demographic profile associated with the user stored in local storage or at a remote server. The demographic profile may contain information regarding the age, ethnicity, location, gender, or any other general feature of the user that allows the full identity of the user to remain anonymous. The media guidance application may retrieve demographic profiles associated with users who consumed advertisements in the group of similar advertisements. For example, the media guidance application may retrieve demographic profiles from the interaction histories (e.g., from one or more fields in the interaction history) or from a separate location.

The media guidance application may compare the demographic profile of the user with a demographic profile corresponding to each user of the users who consumed advertisements in the group of similar advertisements. For example, the media guidance application may compare each characteristic of the demographic profile of the user (e.g., age) with the corresponding characteristic (e.g., age) of each demographic profile associated with one of the users who consumed advertisements in the group of similar advertisements. The media guidance application may, based on comparing the demographic profile of the user with the demographic profile corresponding to each user who consumed advertisements in the group of similar advertisements, determine that a portion of demographic profiles corresponding to the plurality of users matches the demographic profile of the user. For example, the media guidance application may determine that the demographic profile of the user matches a demographic profile of one of the users that consumed advertisements of the group of similar advertisements if every characteristic in both profiles match. As another example, the media guidance application may determine that the demographic profile of the user matches a demographic profile of one of the users that consumed advertisements of the group of similar advertisements if a threshold amount of characteristics in both profiles match (e.g., five out of ten).

The media guidance application may retrieve, based on determining that the portion of demographic profiles corresponding to the plurality of users matches the demographic profile of the user, interaction histories for the plurality of users. For example, the media guidance application may retrieve the interaction history associated with each user where the demographic profile associated with the interaction history matches the demographic profile of the user. In this way, the media guidance application may calculate the threshold amount of time that it takes users to access supplemental information by filtering out users that are not similar to the user (e.g., if the user is young, the longer amount of time an older individual takes to access supplemental information related to an advertisement would skew the threshold).

The media guidance application may determine, from the interaction histories, lengths of time that other users previously took to access supplemental information associated with an advertisement after consuming the advertisement. Specifically, the media guidance application may determine, based on the retrieved interaction histories, a plurality of durations, where each duration of the plurality of durations is a length of time between a time when a user of the plurality of users finished consuming one of the advertisements in the group to when the user of the plurality of users accessed corresponding supplemental information. For example, the media guidance application may search each retrieved interaction history for an identifier of a similar advertisement from the group of similar advertisements. The media guidance application may determine whether the user accessed supplemental information associated with the similar advertisement. For example, the media guidance application may determine that an advertisement for an above ground pool was consumed by the user and ended at 8:20 pm on a particular day and that at 8:22 pm (two minutes later) on the same day the user visited www.abovegroundpools.com. Continuing with this example, the media guidance application may determine that the user accessed supplemental information two minutes after consuming the advertisement based on retrieving the values from the interaction history.

In some embodiments, the media guidance application may determine the plurality of durations by calculating a length of time between the time when each user of the plurality of users finished consuming one of the advertisements and when the user started consuming supplemental information. Specifically, the media guidance application may retrieve an end time when each user of the plurality of users finished consuming one of the advertisements in the group of advertisements from each retrieved interaction history. For example, the media guidance application may retrieve from a field of the interaction history for a given user that the user consumed an advertisement that is part of the group of similar advertisements at 8:20 pm on a particular day. Continuing with the previous example, the media guidance application may determine that the advertisement is part of the group of similar advertisements based on comparing a stored identifier of the advertisement with identifiers associated with advertisements of the group of similar advertisements. The media guidance application may retrieve a start time from each retrieved interaction history when supplemental information associated with the advertisement in the group of similar advertisements was accessed by each user. For example, when the media guidance application determines a time that the user consumed an advertisement of the group of similar advertisements in the interaction history, the media guidance application may search the interaction history for later times when the user may have accessed supplemental information. For example, if the media guidance application determines that a particular piece of supplemental information is related to the advertisement, the media guidance application may retrieve from a field of the interaction history for the user that the user accessed supplemental information at a given time, such as 8:22 pm.

The media guidance application may calculate the length of time between the time when the user of the plurality of users finished consuming one of the advertisements in the group to when the user of the plurality of users accessed the corresponding supplemental information based on the start time and the end time from each retrieved interaction history. For example, the media guidance application may determine a difference between the two values (e.g., the difference between 8:20 pm and 8:22 pm is two minutes) as the length of time after the end of the advertisement that the user of the plurality of users accessed supplemental information. The media guidance application may determine the plurality of durations based on the calculated length of time from each retrieved interaction history. For example, the media guidance application may, for each interaction history where a user did consume an advertisement of the group of similar advertisements and later consumed supplemental information associated with the advertisement, store the length of time in a list or other suitable data structure. The media guidance application may optionally modify the value stored based on how closely the demographic profile of the user associated with the retrieved interaction history matches the demographic profile of the user (e.g., weight the values added to the list). For example, the media guidance application may store a value for a weight with each duration and utilize weighted averaging to calculate the threshold amount of time. As a specific example, a higher value for the weight way be stored if more characteristics of a particular demographic profile match the demographic profile of the user.

The media guidance application may calculate a threshold amount of time associated with the advertisement based on the plurality of durations. For example, the media guidance application may retrieve the durations calculated based on the interaction histories and average the durations. As a specific example, if the durations are one, two, and three minutes, the media guidance application may calculate two minutes as the threshold amount of time. The media guidance application may optionally weight particular durations higher than others, based on a type of supplemental information accessed. For example, the media guidance application may determine that a user who accesses a website associated with a company whose product was featured in an advertisement should be weighted more highly than if the user accessed the website associated with a competitor company selling a similar product.

The media guidance application may calculate an amount of time starting from an endpoint of the advertisement to when the user started using the first device. For example, the media guidance application may calculate and store the amount of time by subtracting the first time from an end time code of the advertisement. As a specific example, if the user started using the first device at (20:22:10) and the end time code is (20:21:40), then the media guidance application may calculate the amount of time as 30 seconds. In some embodiments, the end time code of the advertisement may not be the endpoint of the advertisement. For example, the media guidance application may add a small amount of time (e.g., ten seconds) to account for a transition element that leads back into the media asset provided as part of the media asset by a content source.

The media guidance application may compare the threshold amount of time with the amount of time starting from the endpoint of the advertisement to when the user started using the first device. For example, the media guidance application may compare the two calculated values to determine which is greater. In some embodiments the media guidance application may round the two values (e.g., to the nearest second) for easier comparison.

The media guidance application may determine, based on comparing the threshold amount of time with the amount of time starting from the endpoint of the advertisement to when the user started using the first device, that the user started using the first device within the threshold amount of time from the endpoint of the advertisement. For example, if the amount of time from the endpoint of the advertisement to when the user began using the first device was calculated as 30 seconds and the threshold amount of time was calculated to be 40 seconds based on the interaction histories of users that consumed similar advertisements as described above, then the media guidance application may determine that the user started using the first device within the amount of time from the endpoint of the advertisement slot. In some embodiments, the media guidance application may determine that the user started using the first device within the amount of time if the amount of time is within a tolerance factor of the duration. For example, the user may be slow to start using a mobile phone after the conclusion of the advertisement if he or she is interested in an advertisement (e.g., because the user always keeps their mobile phone in a different room when watching television) and may want the threshold time to be increased.

The media guidance application may, in response to determining that the user started using the first device within the threshold amount of time from the endpoint of the advertisement, retrieve supplemental information associated with the advertisement that the user consumed last and generate the supplemental information for display. For example, the media guidance application may determine that since the user began using the first device within the calculated threshold amount of time from the end of the advertisement, supplemental information related to the advertisement should be presented to the user. Specifically, the media guidance application may retrieve supplemental information for the advertisement that the user consumed last. For example, the media guidance application may determine that the advertisement that the user consumed most recently (e.g., "Budweiser_ad_1") matches an identifier associated with supplemental information. The media guidance application may retrieve supplemental information associated with the stored identifier.

In some embodiments, the media guidance application may determine the location of the second device in order to target supplemental information to the user that is related to an advertisement that the user consumed last. Specifically, the media guidance application may retrieve a location of the second device from a profile associated with the user, where the location is from a plurality of locations that indicate an area in a home. For example, the media guidance application may retrieve the profile which includes identifiers of devices associated with the user each with at least one corresponding indication of a location of the device (e.g., "bedroom"). Continuing with this example, the media guidance application may retrieve a location corresponding to the second device from a field associated with the second device in the profile. The locations may, alternatively or additionally, be locations in any building (e.g., an airport or office building) such that a user waiting for a flight at an airport consuming a television monitor may be able to obtain supplemental information related to an advertisement that he or she has consumed. The media guidance application may retrieve a plurality of identifiers of supplemental information associated with the one or more advertisements, where each of the plurality of identifiers is associated with one or more locations of the plurality of locations. For example, the media guidance application may retrieve identifiers of locations of each of a plurality of supplemental information.

The media guidance application may compare the location of the second device with each location associated with one of the retrieved plurality of identifiers of supplemental information. For example, the media guidance application may iteratively compare the location of the second device retrieved from the profile (e.g., "bedroom") with locations associated with supplemental information that is related to an advertisement of the advertisement. As a specific example, the media guidance application may compare the location of the second device, "bedroom," to the location associated with supplemental information related to a television discount that is associated with the locations "bedroom" and "living room". The media guidance application may determine, based on comparing the location of the second device with each location associated with one of the retrieved plurality of identifiers of supplemental information, that the location matches a stored location. For example, the media guidance application may determine that all, or a threshold amount or percentage, of characters describing the location of the second device match characters describing the location associated with a particular supplemental information and thus the two locations match. The media guidance application may retrieve, from a field associated with the stored location, corresponding supplemental information related to the location of the second device. For example, the media guidance application may retrieve a pointer to a location in storage that contains the supplemental information that is associated with the location of the second device. The media guidance application may retrieve the supplemental information from the location in storage.

In some embodiments, the media guidance application may select supplemental information associated with an advertisement in the group of advertisements if there is not supplemental information available for the advertisement most recently consumed by the user. Specifically, the media guidance application may determine that no supplemental information is associated with the advertisement. For example, the media guidance application may compare an identifier of the advertisement that was most recently consumed by the user with a plurality of identifiers associated with supplemental information in a database (e.g., stored locally in storage or at a remote server) and determine that none of the supplemental information in the database is associated with the advertisement. The media guidance application may compare the metadata associated with the advertisement with metadata associated with each advertisement in the group of similar advertisements. For example, the media guidance application may compare each piece of metadata associated with the advertisement that the user consumed last with the metadata associated with each advertisement in the group of similar advertisements by comparing the characters of the metadata. As a specific example, the media guidance application may compare characters "Tom Hanks," who is an actor associated with the advertisement that the user consumed last, with characters "Tom Cruise," an actor associated with another advertisement in the group of similar advertisements.

The media guidance application may determine, based on comparing the metadata associated with the advertisement with metadata associated with each advertisement in the group of similar advertisements, that the metadata associated with the advertisement matches the metadata associated with a first similar advertisement. For example, the media guidance application may determine a match between metadata of the advertisement that the user consumed last and the metadata of a different advertisement in the group of similar advertisements if every character matches between a particular piece of metadata (e.g., for an actor). In some embodiments, all the metadata associated with the advertisement that the user consumed last must match the metadata of the different advertisement for a match to be determined. In some embodiments, if a threshold amount of the metadata matches, a match may be determined. The media guidance application may, in response to determining that the metadata associated with the advertisement matches the metadata associated with a first similar advertisement, retrieve supplemental information associated with the first similar advertisement in the group of similar advertisements. For example, the media guidance application may retrieve the supplemental information associated with the first similar advertisement from storage or a remote server.

The media guidance application may generate for display the supplemental information. The supplemental information may be text, graphics, video, or any other visual depiction of information related to the advertisement. As another example, the supplemental information may be related to a promotion, sale, coupon, discount, newly available product, or any other information the advertiser wishes to inform the user about to entice him or her to purchase a good or service. As another example, the media guidance application may generate the supplemental information automatically upon detecting that the user has started using the first device (e.g., as an overlay or popup). The media guidance application may, alternatively or additionally, prompt the user prior to presenting the supplemental information. In response to receiving a user selection to display the supplemental information, the media guidance application may generate the retrieved supplemental information for display.

In some embodiments, the media guidance application may configure an application on the first device to generate for display the retrieved supplemental information when the application is accessed. Specifically, the media guidance application may retrieve the supplemental information in response to the user starting to use the first device, but generate for display that supplemental information responsive to another user input (e.g., launching the application). For example, the media guidance application may retrieve the supplemental information in response to the user unlocking the first device and may use the information to configure a homepage or a start page of a web browser application. Continuing with this example, when the user selects the web browser application with another user input, the user is presented with the supplemental information (e.g., the browser loads the start page or the homepage). It should be noted that in some embodiments, if the user doesn't access the application within a threshold amount of time (e.g., the threshold discussed above), the media guidance application may reconfigure the application to not present the supplemental information.

In some embodiments, the selection of a web browser application or other application may itself be the indication that the user has started using the first device. Specifically, upon receiving a selection of an application by the user, the media guidance application may retrieve supplemental information related to an advertisement that a user recently consumed and configure the application to generate the supplemental information for display. For example, the media guidance application may retrieve the supplemental information in response to the user selecting a web browser application on the first device and may use the information to configure a homepage or a start page of the web browser application. Continuing with this example, the web browser application may present the supplemental information in a banner advertisement on a start page or the homepage of the web browser application.

In some embodiments, the media guidance application may determine on which device to generate for display supplemental information based on user preferences. Specifically, the media guidance application may determine a type of the supplemental information. For example, the type may be a movie, text article, graphic(s) or any other category of information that can be presented to a user. The media guidance application may determine the type of a particular retrieved supplemental information from a stored string in a header of the retrieved supplemental information identifying the type (e.g., type='movie'). The media guidance application may compare the type of the supplemental information with user preferences stored in a profile associated with the user, where the user preferences identify devices to display types of supplemental information on. For example, the media guidance application may retrieve preferences of the user for different types of supplemental information and determine whether a retrieved preference matches the type of the presently retrieved supplemental information. The media guidance application may determine, based on comparing the type of the supplemental information with the user preferences, that the type of the supplemental information matches a first stored user preference associated with displaying supplemental information on the second device. For example, the media guidance application may determine that the type of the supplemental information, "movie," matches a user preference for displaying a "movie" on the second device (as opposed to on the first device, which may have a smaller display size and be more difficult to consume the supplemental information). The media guidance application may, in response to determining that the type of the supplemental information matches the first stored user preference, transmit an instruction to the second device to display the supplemental information. For example, the media guidance application may send the supplemental information and an instruction to the second device to generate the supplemental information for display.

It should be noted the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 7 is a flowchart of illustrative actions for presenting supplemental information associated with an advertisement to a user, in accordance with some embodiments of the disclosure;

DETAILED DESCRIPTION

Systems and methods are described for presenting supplemental information to a user that is related to an advertisement consumed by the user that the user found interesting. The systems and methods may determine that a user is interested in receiving supplemental information based on the user starting to use a device within a threshold time period from consuming the advertisement on a different device. Specifically, the system may determine that a user has started using a first device (e.g., a mobile device) within a period of time from the end of an advertisement that the user consumed on a second device (e.g., a television). The system may determine a threshold time period based on the length of the advertisement including the advertisement (e.g., the threshold time period may be 30 seconds if the length of the advertisement is 30 seconds). Alternatively or additionally, the system may determine a threshold time period based on historical amounts of time it has taken users to access supplemental information on their own after consuming the advertisement (e.g., if users access a webpage associated with the advertisement five minutes after the conclusion of a particular advertisement, the threshold time period may be five minutes). In response to determining that the user started using the first device within the threshold period of time from the end of the advertisement, the system may present supplemental information associated with the advertisement on the first device. In this way, the system presents supplemental information associated with an advertisement to a user after the user consumes the advertisement and without explicitly prompting the user for the supplemental information. This enables the user to receive supplemental information efficiently by, for example, not having to type in a website URL or perform a search on a device, as the information is automatically presented.

Figure 1:
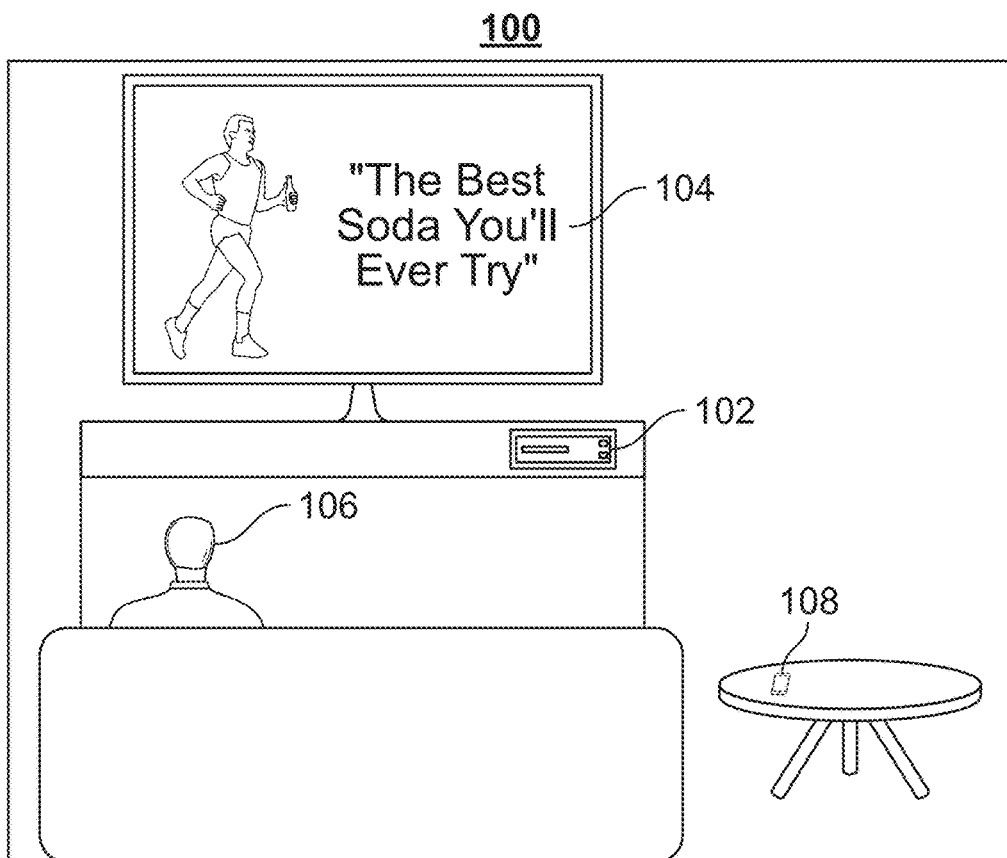
FIG. 1 shows an illustrative example of a display presenting an advertisement to a user, in accordance with some embodiments of the disclosure.

FIG. 1 shows an illustrative example of a display presenting an advertisement to a user, in accordance with some embodiments of the disclosure. For example, in panel 100, user equipment 102 may generate for display advertisement 104, which is consumed by user 106. In panel 100, mobile device 108 is not being used by user 106. For example, mobile device 108 may be displaying a lock screen, may have the display turned off, may be powered off entirely, or otherwise not in use by user 106.

Figure 2:
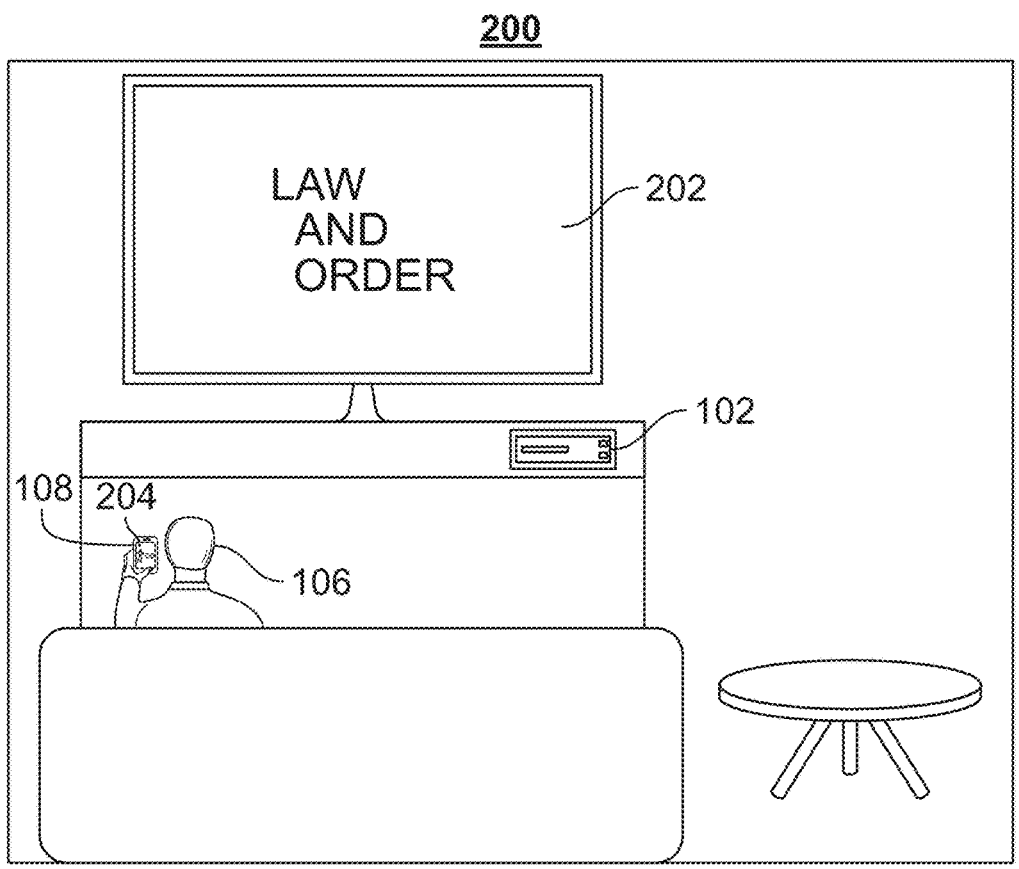
FIG. 2 shows an illustrative example of a device presenting supplemental information to a user related to an advertisement consumed on another device, in accordance with some embodiments of the disclosure.

FIG. 2 shows an illustrative example of a device presenting supplemental information to a user related to an advertisement consumed on another device, in accordance with some embodiments of the disclosure. For example, panel 200 occurs some time after panel 100 (FIG. 1) when advertisement 104 has concluded. For example, in panel 200, user equipment 102 may generate for display media asset 202. In panel 200, user 106 has begun using mobile device 108, which is presenting supplemental information 204 associated with advertisement 104. Mobile device 108 may present supplemental information 204 based on user 106 starting to use mobile device 108 within a threshold period of time from the conclusion of advertisement 104. In some embodiments, the threshold period of time may be based on the length of the advertisement and/or an advertisement slot associated with the advertisement. In other embodiments, the threshold period of time may be based on the amount of time other users who have consumed similar advertisements have taken to access supplemental information manually (e.g., in a web browser).

In some embodiments, a media guidance application may be configured to present supplemental information that is related to an advertisement consumed on a device if the user begins using a different device within a threshold time period of an advertisement slot (e.g., the length of the advertisement slot). Specifically, the media guidance application may detect that a user (e.g., user 106) has started using a first device (e.g., mobile device 108) at a first time. For example, at the first time, the media guidance application may query the user's recent interactions with the first device (e.g., mobile device 108) to determine whether the user (e.g., user 106) has just started using the device after a period of not using the device (e.g., mobile device 108 was not in use when advertisement 104 was presented). As a specific example, the media guidance application may retrieve an activity log associated with the first device (e.g., mobile device 108) to determine whether the user has just started using the device. The activity log may be structured as a table or other suitable data structure containing times that various commands were received. For example, the activity log may contain an indication that the most recent time that an application was opened was one hour ago. Alternatively or additionally, the activity log may include device states. For example, the activity log may include an indication that the device screen was locked one hour ago. In some embodiments, the devices states may be stored locally in storage of either the first device (e.g., mobile device 108) or the second device (e.g., user equipment 102), or remotely at a server. As another example, the activity log may include an indication that the device was powered off until the first time (e.g., the time stamp when the user started using the first device) and/or in a standby mode. Alternatively or additionally, the media guidance application may retrieve a messaging history (e.g., if the first device is a mobile device). For example, the media guidance application may determine that the user (e.g., user 106) has not sent a text message in an hour.

In some embodiments, the media guidance application may compare recent user interactions with the first device (e.g., mobile device 108) with a rule-set to determine whether the user has started using the first device. For example, if a rule in the rule-set indicates that a period of non-use of more than ten minutes constitutes the user not continually using the device, the media guidance application may determine that since the device was powered off for one hour before the user turned the first device (e.g., mobile device 108) on at the first time (e.g., the time stamp when the user started using the first device) that the user (e.g., user 106) has started using the device at the first time.

In some embodiments, the media guidance application may detect that the user has started using the first device based on whether the first device has recently received a user input prior to the first time. Specifically, the media guidance application may receive, at the first device (e.g., mobile device 108), a user input (e.g., from user 106) at the first time. For example, the media guidance application may detect that the user has input a command (e.g., user 106 has unlocked the screen of the mobile device 108) at the first time (e.g., 8:22 pm). To determine whether the user (e.g., user 106) was already using the first device (e.g., mobile device 108) or whether the user has started using the first device at the first time, the media guidance application may retrieve a second time corresponding to a most recent user input received prior to the first input. For example, the media guidance application may retrieve a log of user commands received at particular times stored in storage of the first device (e.g., mobile device 158). The log may be structured as a table where each row contains an identifier of an input received from the user and a time at which it was received. As a specific example, the media guidance application may determine that the most recent command was at 8:10 pm and was a user input to lock the screen of the first device.

The media guidance application, in order to determine whether the previous user input indicates that the user started to use the first device (e.g., mobile device 158) at the first time or was already using the first device, may compare the first time with the second time that the previous user input was received. Specifically, the media guidance application may determine that a difference between the first time and the second time is greater than a threshold difference. For example, the media guidance application may calculate a difference (e.g., 12 minutes) between the first time (e.g., 8:22 pm) and the second time (e.g., 8:10 pm). The media guidance application may compare the calculated difference (e.g., 12 minutes) to a threshold time indicating whether the user (e.g., user 106) is currently using the first device (e.g., mobile device 108) or has just started using it. For example, if the user sent an email ten seconds prior to the first time using the first device (e.g., mobile device 108) and the threshold is five minutes, then the media guidance application may determine that because the previously received user input was so close to the first time it likely does not indicate the user (e.g., user 106) is interested in the advertisement based on the threshold being greater than the calculated difference. The media guidance application may, in response to determining that the difference is greater than the threshold difference, determine that the user has started using the first device (e.g., mobile device 108). For example, if the previous user input was received 12 minutes from the user input at the first time and the threshold is five minutes, the media guidance application may determine that the user (e.g., user 106) had stopped using the device and has now started using the device (e.g., mobile device 108), which may be due to the user's interest in the advertisement (e.g., advertisement 104).

In some embodiments, the media guidance application may determine that the difference between the first time and the second time is greater than the threshold difference based on the average time between user inputs. Specifically, the media guidance application may retrieve a log of recent user inputs on the first device (e.g., mobile device 108). For example, as discussed above, the media guidance application may retrieve a log of recent user inputs from storage of the first device (e.g., mobile device 108). The log may be structured as a table where each row contains an identifier of an input received from the user (e.g., user 106) and a time at which it was received. The media guidance application may determine, based on the log of recent user inputs, an average time between user inputs on the first device (e.g., mobile device 108). For example, the media guidance application may execute a program script utilizing a for-loop to retrieve a user input (e.g., from a row in a table corresponding to the log) and determine a difference in time with the next most recent user input. As a specific example, if user inputs were received at 8:10 pm, 8:20 pm, and 8:22 pm, the media guidance application may calculate the differences as two minutes and ten minutes, respectively. The media guidance application may iteratively determine differences between every user input and a next most recent user input in the log, or a subset within a threshold timeframe (e.g., the last two hours). The media guidance application may average the differences by dividing the total number of differences calculated by the sum of the differences. For example, if two minutes and ten minutes were calculated as the differences, then the average difference calculated by the media guidance application may be six minutes.

The media guidance application may compare the average time between user inputs with the difference between the first time and the second time. For example, the media guidance application may compare the average time (e.g., two minutes) between user inputs with the time between the two most recent user inputs (e.g., ten minutes) to determine which value is greater. The media guidance application may scale the average time by a factor in order to increase the probability that the user (e.g., user 106) was not using the device (e.g., mobile device 108) at the first time and thus began using the first device responsive to seeing the advertisement (e.g., advertisement 104). The media guidance application may determine, based on comparing the average time between user inputs with the difference, that the average time between user inputs is less than the difference. For example, the media guidance application may determine that since the average time between user inputs is two minutes and the time between the two most recent user inputs (e.g., at the first time and the second time) is ten minutes, the user has started using the first device at the first time. The media guidance application may, based on determining that the average time between user inputs is less than the difference, determine that the difference between the first time and the second time is greater than the threshold difference. For example, since the average time between user inputs is less than the difference, the media guidance application may determine that the user (e.g., user 106) started using the first device (e.g., mobile device 108) at the first time, as opposed to already using the first device.

The media guidance application may, based on detecting that the user has started using the first device (e.g., mobile device 108) at the first time, determine whether the user has consumed an advertisement (e.g., advertisement 104) on a second device (e.g., a display coupled to user equipment 102) within a threshold amount of time from when the advertisement slot associated with the advertisement ended. If the user has consumed the advertisement on the second device within the threshold amount of time, the media guidance application may present supplemental information to the user. Specifically, the media guidance application may search media asset consumption history associated with the user (e.g., user 106) for an advertisement (e.g., advertisement 104) that the user consumed last. For example, the media guidance application may retrieve the media asset consumption history associated with the user (e.g., user 106) from local storage of either the first or second device (e.g., mobile device 108 or user equipment 102), or from a remote server. The consumption history may be structured as a table, array, or any other suitable data structure for storing times and identifiers of media assets consumed by a user (e.g., user 106). The consumption history may include times that the user consumed media assets (e.g., media asset 202), an identifier of the media asset consumed, and an identifier of a device (e.g., user equipment 102) on which the media asset was generated for display. For example, the media guidance application may, as is discussed further below, determine that a given user (e.g., user 106) is associated with multiple devices in a home that were concurrently generating media assets for display and determine which one was being used by the user (e.g., based on the user logging on to the device or GPS coordinates) to determine a media asset that the user consumed most recently.

The consumption history may include identifiers of advertisements (e.g., an identifier of advertisement 104) that were consumed during a media asset (e.g., media asset 202) consumed by the user (e.g., user 106). The media guidance application may determine based on an associated time period during which the advertisement (e.g., advertisement 104) was consumed which advertisement the user (e.g., user 106) consumed most recently (e.g., based on comparison with the first time when the user started using the first device). Alternatively or additionally, the consumption history may only identify times that a user (e.g., user 106) consumed a specific media asset (e.g., media asset 202) and another database may be necessary to determine which advertisements were generated during that media asset. For example, the consumption history may store an indication that the user consumed a media asset (e.g., media asset 202) with identifier "The Good Place" from 8 pm to 8:22 pm. The media guidance application may access a headend server or other media guidance database storing indications which advertisements (e.g., advertisement 104) were presented from 8 pm to 8:22 pm for the media asset (e.g., media asset 202) with the identifier "The Good Place." The media guidance application may determine which advertisement (e.g., advertisement 104) was generated for display closest to 8:22 pm that the user (e.g., user 106) completely consumed as the advertisement that the user consumed last.

In some embodiments, the media guidance application may determine the advertisement that the user consumed last based on which advertisement (e.g., advertisement 104) was consumed on a second device (e.g., user equipment 102) that is closest to the current location of the first device (e.g., mobile device 108). Specifically, the media guidance application may detect a device that is closest to the first device (e.g., mobile device 108), where the device is one of a plurality of devices associated with the user. For example, the media guidance application may receive an indication that an identifier associated with the user (e.g., a parental control PIN and/or any other login that is specific to user 106) has been entered on a second device (e.g., user equipment 102). The media guidance application may receive the indication from the second device (e.g., user equipment 102), or from a remote server. Based on receiving the indication that the identifier associated with the user has been entered on the second device (e.g., user equipment 102), the media guidance application may determine that the second device is located closest to the first device that the user started using at the first time. Alternatively or additionally, the media guidance application may determine the device that is closest to the first device (e.g., mobile device 108) based on comparing coordinates associated with the first device with coordinates associated with a plurality of devices associated with the user. For example, the media guidance application may access a profile associated with the user and determine GPS coordinates of a device located in a summer home of the user (e.g., user 106) and a device located in the user's main home. The media guidance application may compare GPS coordinates from the first device (e.g., a mobile phone) with the coordinates in the profile to determine which location the first device (e.g., mobile device 108) is in and thus which advertisement (e.g., advertisement 104) was most recently consumed by the user (e.g., user 106). In this way, the media guidance application may prevent the user (e.g., user 106) from receiving supplemental information about advertisements he or she did not watch (e.g., if the user's sister consumed an advertisement most recently on a television that is also associated with the user, the user may receive supplemental information about the advertisement his sister consumed which will likely not be of interest).

The media guidance application may determine a device identifier of the device closest to the first device (e.g., mobile device 108). For example, the media guidance application may retrieve an identifier, which may be any combination of characters that uniquely identifies the device from other devices associated with the user (e.g., "Family Room STB"), of the device (e.g., user equipment 102) determine to be closest to the first device (e.g., mobile device 108). The media guidance application may retrieve, using the device identifier for the device closest to the first device, device media asset consumption history associated with the user. For example, the media guidance application may filter the media asset consumption history based on the device it was consumed on to determine the advertisement most recently consumed on the device (e.g., user equipment 102) determined to be closest to the user. The media guidance application may search the device media asset consumption history for the advertisement that the user consumed last. For example, the media guidance application may sort the advertisements consumed by the user (e.g., user 106) on the device (e.g., user equipment 102) determined to be closest to the first device (e.g., mobile device 108) by time and date, using a bubble sort, merge sort, or other algorithm. The media guidance application may determine from the sorted device consumption history which advertisement (e.g., advertisement 104) that the user consumed last on the device closest to the first device.

The media guidance application may retrieve, from the media asset consumption history associated with the user, a time period associated with the advertisement (e.g., advertisement 104) that the user consumed last. For example, the media guidance application may execute a database query language script, such as Structured Query Language (hereinafter "SQL"), to retrieve data from a particular field associated with the advertisement (e.g., advertisement 104) that the user consumed last in the media asset consumption history. The media guidance application may retrieve a start value and/or end value of the advertisement (e.g., advertisement 104) from the media asset consumption history. For example, the media guidance application may retrieve two values from the media asset consumption history, indicating that from 8:21:20 pm to 8:21:40 pm the user (e.g., user 106) consumed the advertisement (e.g., advertisement 104).

The media guidance application may search for an advertisement slot associated with the advertisement (e.g., advertisement 104) that the user consumed last. For example, the advertisement slot may include only the advertisement (e.g., advertisement 104), or may include more than one advertisement that was displayed contiguous to the advertisement that the user consumed last. For example, the media guidance application may compare the time period of the advertisement that the user consumed last with an index of advertisement slots and advertisements that filled the slots at a headend server or other remote server. The media guidance application may determine (e.g., from a media guidance data source or the media asset consumption history associated with the user) an identifier of the advertisement (e.g., "Budweiser_ad_1"), a source from which the user consumed the advertisement (e.g., "NBC"), and/or any other information associated with the advertisement (e.g., advertisement 104) that may allow the media guidance application to more efficiently determine the advertisement slot that the user consumed with the advertisement.

In some embodiments, the media guidance application may determine the advertisement slot associated with the advertisement (e.g., advertisement 104) that the user consumed last from a schedule data structure of advertisement slots (e.g., stored at a remote server). Specifically, the media guidance application may retrieve, from the media asset consumption history associated with the user (e.g., user 106), an identifier of a source associated with the advertisement (e.g., advertisement 104). For example, the media guidance application may retrieve the identifier of the source that aired the advertisement (e.g., advertisement 104) from a field of the media asset consumption history associated with the advertisement that the user most recently consumed. The identifier may be any combination of characters, such as "NBC." The media guidance application may retrieve a schedule data structure for the source containing the plurality of advertisement slot time periods. For example, the media guidance application may retrieve the schedule data structure for the source (e.g., NBC) from local memory or a remote server. The schedule data structure may be structured as a table, where each row corresponds to an advertisement slot and each field in the row includes information associated with the advertisement slot, such as a time period associated with the advertisement slot and identifiers of advertisements that are part of the advertisement slot.

The media guidance application may compare the time period associated with the advertisement that the user consumed last with each of the plurality of advertisement slot time periods stored in the schedule data structure. For example, the media guidance application may execute a program script utilizing a for-loop to iteratively compare the time period associated with the advertisement that the user consumed last (e.g., advertisement 104) with each of the advertisement slot time periods stored in the schedule data structure. For example, the media guidance application may retrieve that a particular advertisement slot was scheduled on Monday, Apr. 24, 2017 from 8:20 pm to 8:23 pm. The media guidance application may compare the retrieved time period with the time period associated with the advertisement (e.g., advertisement 104) to determine whether the advertisement fits within the time period associated with the advertisement slot. The media guidance application may determine, based on comparing the time period associated with the advertisement that the user consumed last (e.g., advertisement 104) with each of the plurality of advertisement slot time periods, that the time period associated with the advertisement that the user consumed last matches a stored advertisement slot time period. For example, if the advertisement that the user consumed last (e.g., advertisement 104) was on Monday, Apr. 24, 2017 from 8:21 pm to 8:22 pm, the media guidance application may determine that the advertisement is part of an advertisement slot scheduled for the same date from 8:20 pm to 8:23 pm. The media guidance application may retrieve, from a field of the schedule data structure associated with the stored advertisement slot time period, a corresponding identifier. For example, the media guidance application may retrieve an identifier of the advertisement slot, which may be any combination of characters that uniquely identifies the advertisement slot from other advertisement slots from the same source. The media guidance application may determine, based on the corresponding identifier, that the advertisement (e.g., advertisement 104) is associated with the advertisement slot. For example, the media guidance application may determine that the advertisement (e.g., advertisement 104) is associated with the advertisement slot identified by the retrieved identifier. The media guidance application may use the identifier of the advertisement slot to determine other advertisements that were part of the advertisement slot and/or to retrieve supplemental information relevant to advertisements that are part of the advertisement slot, as described further below.

The media guidance application may retrieve a start time code and an end time code associated with the advertisement slot. For example, the media guidance application may execute a database query language script, such as SQL, to retrieve data from fields containing a start time code and an end time code associated with the advertisement slot containing the advertisement (e.g., advertisement 104) that the user consumed last. For example, the media guidance application may retrieve the end time code (20:21:40:00) corresponding to (hour:minute:second:frame) when the advertisement time slot ended. For example, the media guidance application may retrieve start and end time codes associated with the advertisement slot, indicating that the advertisement slot lasted from 8:21:00 pm to 8:21:40 pm. The media guidance application may retrieve the time codes from local storage and/or a remote server.

The media guidance application may calculate a length of the advertisement slot based on a difference between the start time code and the end time code, and an amount of time starting from an endpoint of the advertisement slot to when the user started using the first device. For example, the media guidance application may initialize and store variables for both the length of the advertisement slot (e.g., which includes advertisement 104) and the amount of time starting from the endpoint of the advertisement slot to when the user started using the first device (e.g., mobile device 108). For example, the media guidance application may calculate and store the length of the advertisement slot by subtracting the end time code from the start time code associated with the advertisement slot. As a specific example, if the start time code is (20:21:00:00) and the end time code is (20:21:40:00), the media guidance application may calculate that the length of the advertisement slot is 40 seconds. For example, the media guidance application may calculate and store the amount of time by subtracting the first time from the end time code of the advertising slot. As a specific example, if the user (e.g., user 106) started using the first device at (20:22:10:00) and the end time code is (20:21:40:00), then the media guidance application may calculate the amount of time as 30 seconds. In some embodiments, the end time code of the advertisement slot may not be the endpoint of the advertisement slot. For example, the media guidance application may add a small amount of time (e.g., ten seconds) to account for a transition element that leads back into the media asset (e.g., media asset 202) provided as part of the media asset by a content source.

The media guidance application may compare the length of the advertisement slot with the amount of time starting from the endpoint of the advertisement slot to when the user (e.g., user 106) started using the first device (e.g., mobile device 108). For example, the media guidance application may compare the two calculated values to determine which is greater. In some embodiments the media guidance application may round the two values (e.g., to the nearest second) for easier comparison.

The media guidance application may determine, based on the comparing, that the user (e.g., user 106) started using the first device (e.g., mobile device 108) within the amount of time from the endpoint of the advertisement slot that corresponds to a duration associated with the advertisement slot. As a specific example, if the amount of time from the endpoint of the advertisement slot to when the user began using the first device (e.g., mobile device 108) was calculated as 30 seconds and the length of the advertisement slot is 40 seconds, then the media guidance application may determine that the user started using the first device within the amount of time from the endpoint of the advertisement slot. In some embodiments, the media guidance application may determine that the user (e.g., user 106) started using the first device (e.g., mobile device 108) within the amount of time if the amount of time is within a tolerance factor of the duration. The tolerance factor may be adjusted based on user preferences or interaction history (e.g., stored in a profile associated with the user). For example, the user (e.g., user 106) may be slow to start using a mobile phone after the conclusion of the advertisement if he or she is interested in an advertisement (e.g., advertisement 104) and may want the amount of time to be longer. The media guidance application may store a tolerance factor and multiply the length of the advertisement segment by the factor. For example, if the advertisement segment is 30 seconds and the tolerance factor is 1.2, then the effective length of time used for the purposes of determining whether the user began using the first device within the amount of time is 36 seconds.

Alternatively or additionally, the media guidance application may adjust the length of the advertisement slot and/or the amount of time starting from the endpoint of the advertisement slot to when the user (e.g., user 106) started using the first device (e.g., mobile device 108) based on user interactions after the end of the advertisement slot. For example, if the media guidance application determines that the user (e.g., user 106) has paused the media asset (e.g., media asset 202) within the length of the advertisement slot from the end of the advertisement slot, it may indicate that the user is interested in supplemental information associated with the advertisement that the user consumed last and the amount of time may be decreased (or tied to the playback position in the media asset as opposed to absolute time). Alternatively or additionally, the media guidance application may receive an indication that the user (e.g., user 106) changed channels after the advertisement slot concluded which may indicate that the user is not interested in obtaining supplemental information related to the advertisement (e.g., advertisement 104) and the amount of time starting from the endpoint of the advertisement slot to when the user started using the first device may be increased.

In some embodiments, the media guidance application may adjust the amount of time from the endpoint of the advertisement slot to when the user (e.g., user 106) started using the first device (e.g., mobile device 108) based on the user pausing the media asset on the second device (e.g., user equipment 102). Specifically, the media guidance application may receive, from the second device (e.g., user equipment 102), an indication that a media asset (e.g., media asset 202) currently played on the second device has been paused for a second duration. For example, the media guidance application may receive a data packet from the second device (e.g., user equipment 102) that indicates the user has paused the media asset being consumed on the second device and a time that the second device received the pause request from the user (e.g., user 106). The media guidance application may determine whether the pause was related to the advertisement slot based on the time when it was received. Specifically, the media guidance application may determine, based on the received indication, that a start of the second duration is both (1) after the end of the advertisement (e.g., advertisement 104) and (2) before the amount of time from the endpoint of the advertisement slot that corresponds to the first duration. For example, the media guidance application may compare a time code in the data packet received from the second device (e.g., user equipment 102) corresponding to the time that the media asset (e.g., media asset 202) was paused (e.g., 8:22 pm) with the endpoint of the advertisement slot (e.g., 8:20 pm) to determine whether the pause happened after the advertisement slot ended. The media guidance application may also compare the time after the endpoint of the advertisement slot that corresponds to the first duration with the time that the media asset (e.g., media asset 202) was paused. For example, the media guidance application may determine whether the media asset (e.g., media asset 202) was paused before the length of the advertisement slot after the endpoint of the advertisement. The media guidance application may, in response to determining that the start of the second duration is both (1) after the end of the advertisement and (2) before the amount of time from the endpoint of the advertisement slot that corresponds to the first duration, decrease the amount of time starting from the endpoint of the advertisement slot to when the user started using the first device by the second duration. For example, if the media guidance application determines that the media asset (e.g., media asset 202) on the second device (e.g., user equipment 102) was paused after the end of the advertisement slot, but before a threshold amount of time after the endpoint of the advertisement slot, the media guidance application may determine there is a high likelihood that the user (e.g., user 106) paused the media asset (e.g., media asset 202) to obtain supplemental information (e.g., supplemental information 204) associated with the advertisement slot. The media guidance application may accordingly decrease the amount of time starting from the endpoint by the amount of time that the media asset (e.g., media asset 202) was paused to ensure that the threshold time does not pass while the media asset is paused.

The media guidance application may, in response to determining that the user started using the first device (e.g., mobile device 108) within the amount of time from the endpoint of the advertisement slot that is equal to the duration associated with the advertisement slot, retrieve supplemental information associated with one or more advertisements associated with the advertisement slot and generate the supplemental information for display. For example, the media guidance application may determine that since the user began using the first device (e.g., mobile device 108) within the amount of time from the end of the advertisement slot that is shorter than the length of the advertisement slot itself, supplemental information related to an advertisement (e.g., advertisement 104) should be presented to the user. Specifically, the media guidance application may retrieve supplemental information (e.g., supplemental information 204) for one or more advertisements associated with the advertisement slot. For example, the media guidance application may retrieve the supplemental information from storage or a remote server. The media guidance application may determine a location of the supplemental information (e.g., supplemental information 204) to retrieve based on an index data structure. For example, the media guidance application may compare an identifier of one or more advertisements in the advertisement slot (e.g., retrieved from the media consumption history or a headend server) with stored identifiers associated with supplemental information (e.g., supplemental information 204). For example, the media guidance application may determine that the advertisement (e.g., advertisement 104) that the user consumed most recently (e.g., "Budweiser_ad_1") matches an identifier stored in the index data structure. The media guidance application may retrieve supplemental information (e.g., supplemental information 204) associated with the stored identifier. For example, the media guidance application may retrieve a pointer to a location in memory where the supplemental information is located and retrieve the supplemental information (e.g., supplemental information 204) from that location.

In some embodiments, the media guidance application may determine the location of the second device (e.g., user equipment 102) in order to target supplemental information (e.g., supplemental information 204) related to an advertisement of the advertisement slot to the user. Specifically, the media guidance application may retrieve a location of the second device (e.g., user equipment 102) from a profile associated with the user (e.g., user 106), where the location is from a plurality of locations that indicate an area in a home. For example, the media guidance application may retrieve the profile from local storage (e.g., of the first device) or from a remote server. The profile may include a table or other suitable data structure with identifiers of devices associated with the user (e.g., user 106), each with at least one corresponding indication of a location of the device (e.g., bedroom). The media guidance application may retrieve a location corresponding to the second device (e.g., user equipment 102) from a field associated with the second device in the profile. The locations may, alternatively or additionally, be locations in any building (e.g., an airport or office building) such that a user waiting for a flight at an airport consuming a television monitor may be able to obtain supplemental information related to an advertisement that he or she has consumed. The media guidance application may retrieve a plurality of identifiers of supplemental information associated with the one or more advertisements, where each of the plurality of identifiers is associated with one or more locations of the plurality of locations. For example, the media guidance application may retrieve an index data structure including identifiers of supplemental information (e.g., which may be any combination of characters that describe the supplemental information). The data structure further may include both a pointer to a location in storage containing the supplemental information (e.g., supplemental information 204), as well as a location in a home that the supplemental information is relevant to.

The media guidance application may compare the location of the second device (e.g., user equipment 102) with each location associated with one of the retrieved plurality of identifiers of supplemental information (e.g., supplemental information 204). For example, the media guidance application may iteratively compare the location of the second device (e.g., user equipment 102) retrieved from the profile (e.g., "bedroom") with locations associated with supplemental information (e.g., supplemental information 204) that is related to an advertisement (e.g., advertisement 104) of the advertisement slot. As a specific example, the media guidance application may compare the location of the second device (e.g., user equipment 102), "bedroom," to the location associated with supplemental information (e.g., supplemental information 204) related to a television discount that is associated with the locations "bedroom" and "living room". The media guidance application may determine, based on comparing the location of the second device (e.g., user equipment 102) with each location associated with one of the retrieved plurality of identifiers of supplemental information, that the location matches a stored location. For example, the media guidance application may determine that all, or a threshold amount or percentage, of characters describing the location of the second device (e.g., user equipment 102) match characters describing the location associated with particular supplemental information (e.g., supplemental information 204) and thus the two locations match. The media guidance application may retrieve, from a field associated with the stored location, corresponding supplemental information (e.g., supplemental information 204) related to the location of the second device (e.g., user equipment 102). For example, the media guidance application may retrieve a pointer to a location in storage that contains the supplemental information (e.g., supplemental information 204) that is associated with the location of the second device. The media guidance application may retrieve the supplemental information (e.g., supplemental information 204) from the location in storage.

In some embodiments, the media guidance application may determine which supplemental information (e.g., supplemental information 204) associated with advertisements in the advertisement slot to display based on user preferences of the user (e.g., user 106). Specifically, the media guidance application may determine that a plurality of advertisements is associated with the advertisement slot. For example, the media guidance application may, based on a retrieved identifier associated with the advertisement slot that contains the advertisement that the user most recently consumed, query a database (e.g., either local in storage or at a remote server) to determine which, if any, other advertisements were part of the advertisement slot. The media guidance application may retrieve, for each advertisement of the plurality of advertisements, a product type associated with the advertisement (e.g., advertisement 104). For example, the media guidance application may retrieve, from a field of the database associated with each advertisement in the advertisement slot, an identifier of a product type. For example, the product type may be any combination of characters (e.g., a string) and describes a general category of the product that was advertised, such as "beer" or "organic food". The media guidance application may compare each retrieved product type with user preferences stored in a profile associated with the user (e.g., user 106). For example, the media guidance application may retrieve the profile from local storage (e.g., of the first device) or from a remote server. The media guidance application may compare the characters of each user preference in the profile for a product type to each product type associated with an advertisement in the advertisement slot. The user preferences may be explicit indications of products that the user (e.g., user 106) enjoys (e.g., the user has indicated that they "love" the product type "beer"). Alternatively or additionally, the user preferences may be implicit and based on user purchasing history. For example, if the user (e.g., user 106) often buys beer, they likely enjoy and have a preference for the product type, "beer".

The media guidance application may determine, based on comparing each retrieved product type with the user preferences, that a first user preference matches the product type associated with a first advertisement of the plurality of advertisements. For example, based on the characters, "beer" of a user preference matching the characters "beer" associated with a product type of a particular advertisement in the advertisement slot, the media guidance application may determine that the user (e.g., user 106) has a preference for the particular advertisement (e.g., advertisement 104). The media guidance application may, in response to determining that the first user preference matches the product type associated with the first advertisement, retrieve supplemental information associated with the first advertisement. For example, the media guidance application may retrieve a pointer to a location in storage that contains supplemental information (e.g., supplemental information 204) that is associated with the advertisement (e.g., advertisement 104) that is for the product type that matches the user preferences. The media guidance application may retrieve the supplemental information (e.g., supplemental information 204) from the location in storage.

In some embodiments, the media guidance application may generate a display enabling the user (e.g., user 106) to select which advertisement that aired during the advertisement slot the user is interested in obtaining supplemental information for. Specifically, the media guidance application may determine that a plurality of advertisements is associated with the advertisement slot. For example, the media guidance application may, based on a retrieved identifier associated with the advertisement slot that contains the advertisement that the user most recently consumed (e.g., advertisement 104), query a database (e.g., either local in storage or at a remote server) to determine which, if any, other advertisements were part of the advertisement slot. The media guidance application may generate for display a selectable indicator associated with each advertisement of the plurality of advertisements. For example, the media guidance application may generate for display text, graphics, or a combination as the indicator that describes each advertisement. The indicators may be displayed in a grid or a list and may be selectable, such that a user can select an indicator that he or she is interested in receiving supplemental information for. As a specific example, the indicators may be screenshots from each advertisement from the advertisement slot, or a graphic showing a product from each advertisement. The media guidance application may receive a user selection of a first selectable indicator associated with a first advertisement of the plurality of advertisements. For example, the media guidance application may receive a user selection of an indicator via a user input interface such as a touchscreen. The media guidance application may, in response to receiving the user selection of the first selectable indicator, retrieve supplemental information (e.g., supplemental information 204) associated with the first advertisement (e.g., advertisement 104). For example, the media guidance application may retrieve the supplemental information (e.g., supplemental information 204) associated with the first advertisement (e.g., advertisement 104) from storage or a remote server.

The media guidance application may generate for display the supplemental information (e.g., supplemental information 204). The supplemental information may be text, graphics, video, or any other visual depiction of information related to the advertisement (e.g., advertisement 104). As another example, the supplemental information may be related to a promotion, sale, coupon, discount, newly available product, or any other information the advertiser wishes to inform the user about to entice him or her to purchase a good or service. For example, the media guidance application may generate the supplemental information automatically upon detecting that the user has started using the first device (e.g., as an overlay or popup). The media guidance application may, alternatively or additionally, prompt the user (e.g., user 106) prior to presenting the supplemental information regarding whether they want to receive supplemental information (e.g., supplemental information 204). In response to receiving a user selection to display the supplemental information, the media guidance application may generate the retrieved supplemental information for display. In some embodiments, the media guidance application may retrieve a plurality of supplemental information related to one or more of the advertisements associated with the advertisement slot. The media guidance application may present the supplemental information over fixed time intervals (e.g., each piece of supplemental information is displayed for five seconds and then the next is automatically displayed) and/or prompt the user for which specific supplemental information to display (e.g., generate for display selectable options to display different types of supplemental information, such as a movie trailer or a textual synopsis).

In some embodiments, the media guidance application may configure an application (e.g., a web browser) on the first device (e.g., mobile device 108) to generate for display the retrieved supplemental information (e.g., supplemental information 204) when the application is accessed. Specifically, the media guidance application may retrieve the supplemental information (e.g., a link to a promotion related to an advertisement that the user consumed) in response to the user (e.g., user 106) starting to use the first device (e.g., mobile device 108), but generate for display that supplemental information responsive to another user input (e.g., launching the application). For example, the media guidance application may retrieve the supplemental information (e.g., supplemental information 204) in response to the user (e.g., user 106) unlocking the first device (e.g., mobile device 108) and may use the information to configure a homepage or a start page of a web browser application. Continuing with this example, when the user (e.g., user 106) selects the web browser application with another user input, the user is presented with the supplemental information (e.g., the browser loads the start page or the homepage). It should be noted that in some embodiments, if the user doesn't access the application within a threshold amount of time (e.g., the threshold discussed above), the media guidance application may reconfigure the application to not present the supplemental information.

In some embodiments, the selection of a web browser application or other application may itself be the indication that the user (e.g., user 106) has started using the first device (e.g., mobile device 108). Specifically, upon receiving a selection of an application by the user (e.g., user 106), the media guidance application may retrieve supplemental information (e.g., supplemental information 204) related to an advertisement that a user recently consumed and configure the application to generate the supplemental information for display. For example, the media guidance application may retrieve the supplemental information (e.g., supplemental information 204) in response to the user (e.g., user 106) selecting a web browser application on the first device (e.g., mobile device 108) and may use the information to configure a homepage or a start page of the web browser application. Continuing with this example, the web browser application may present the supplemental information (e.g., supplemental information 204) in a banner advertisement on a start page or the homepage of the web browser application.

In some embodiments, the media guidance application may determine on which device (e.g., mobile device 108) to generate for display supplemental information (e.g., supplemental information 204) based on user preferences. Specifically, the media guidance application may determine a type of the supplemental information (e.g., supplemental information 204). For example, the type may be a movie, text article, graphic(s) or any other category of information that can be presented to a user. The media guidance application may determine the type of a particular retrieved supplemental information (e.g., supplemental information 204) from a stored string in a header of the retrieved supplemental information identifying the type (e.g., type='movie'). The media guidance application may compare the type of the supplemental information with user preferences stored in a profile associated with the user (e.g., user 106), where the user preferences identify devices to display types of supplemental information on. For example, the media guidance application may retrieve the profile associated with the user (e.g., user 106) from local storage (e.g., of mobile device 108) or from a remote server. The media guidance application may retrieve preferences for different types of supplemental information (e.g., supplemental information 204) and determine whether a retrieved preference matches the type of the presently retrieved supplemental information. The media guidance application may determine, based on comparing the type of the supplemental information with the user preferences, that the type of the supplemental information matches a first stored user preference associated with displaying supplemental information on the second device. For example, the media guidance application may determine that the type of the supplemental information (e.g., supplemental information 204), "movie," matches a user preference for displaying a "movie" on the second device (e.g., on user equipment 102, as opposed to on mobile device 108, which may have a smaller display size and be more difficult to consume the supplemental information). The media guidance application may, in response to determining that the type of the supplemental information matches the first stored user preference, transmit an instruction to the second device (e.g., user equipment 102) to display the supplemental information. For example, the media guidance application may send a data packet to the second device (e.g., user equipment 102) including the supplemental information (e.g., supplemental information 204) and an instruction to generate the supplemental information for display.

In some embodiments, the media guidance application may be configured to present supplemental information (e.g., supplemental information 204) that is related to an advertisement (e.g., advertisement 104) consumed on a device if the user (e.g., user 106) begins using a different device within a threshold time period of an advertisement based on the average amount of time users have historically taken to access supplemental information manually (e.g., by typing in a website URL after consuming an advertisement). Specifically, the media guidance application may detect that a user (e.g., user 106) has started using a first device (e.g., mobile device 108) at a first time. For example, at the first time, the media guidance application may check the user's recent interactions with the first device (e.g., mobile device 108) to determine whether the user (e.g., user 106) has just started using the device after a period of not using the device (e.g., mobile device 108 was not in use when advertisement 104 was presented). As a specific example, the media guidance application may retrieve an activity log associated with the first device (e.g., mobile device 108) to determine whether the user has just started using the device. The activity log may be structured as a table or other suitable data structure containing times that various processes were executed in response to user input. For example, the activity log may contain an indication that the most recent time that an application was opened was one hour ago.

Alternatively or additionally, the activity log may include device states. For example, the activity log may include an indication that the device screen was locked one hour ago. As another example, the activity log may include an indication that the device was powered off until the first time and/or in a standby mode. Alternatively or additionally, the media guidance application may retrieve a messaging history (e.g., if the first device is a mobile device). For example, the media guidance application may determine that the user (e.g., user 106) has not sent a text message in an hour.

The media guidance application may compare recent user interactions with the first device (e.g., mobile device 108) with a rule-set to determine whether the user has started using the first device. For example, if a rule in the rule-set indicates that a period of non-use of more than ten minutes constitutes the user not continually using the device, the media guidance application may determine that since the device was powered off for one hour before the user turned the first device (e.g., mobile device 108) on at the first time that the user (e.g., user 106) has started using the device at the first time.

In some embodiments, the media guidance application may detect that the user has started using the first device based on whether the first device has recently received a user input prior to the first time. Specifically, the media guidance application may receive, at the first device (e.g., mobile device 108), a user input (e.g., from user 106) at the first time. For example, the media guidance application may detect that the user has input a command (e.g., user 106 has unlocked the screen of the mobile device 108) at the first time (e.g., 8:22 pm). To determine whether the user (e.g., user 106) was already using the first device (e.g., mobile device 108) or whether the user has started using the first device at the first time, the media guidance application may retrieve a second time corresponding to a most recent user input received prior to the first input. For example, the media guidance application may retrieve a log of user commands received at particular times stored in storage of the first device (e.g., mobile device 158). The log may be structured as a table where each row contains an identifier of an input received from the user and a time at which it was received. As a specific example, the media guidance application may determine that the most recent command was at 8:10 pm and was a user input to lock the screen of the first device.

The media guidance application, in order to determine whether the previous user input indicates that the user started to use the first device (e.g., mobile device 158) at the first time or was already using the first device, compares the first time with the second time that the previous user input was received. Specifically, the media guidance application may determine that a difference between the first time and the second time is greater than a threshold difference. For example, the media guidance application may calculate a difference (e.g., 12 minutes) between the first time (e.g., 8:22 pm) and the second time (e.g., 8:10 pm). The media guidance application may compare the calculated difference (e.g., 12 minutes) to a threshold time indicating whether the user (e.g., user 106) is currently using the first device (e.g., mobile device 108) or has just started using it. For example, if the user sent an email ten seconds prior to the first time using the first device (e.g., mobile device 108) and the threshold is five minutes, then the media guidance application may determine that because the previously received user input was so close to the first time it likely does not indicate the user (e.g., user 106) is interested in the advertisement based on the threshold being greater than the calculated difference. The media guidance application may, in response to determining that the difference is greater than the threshold difference, determine that the user has started using the first device (e.g., mobile device 108). For example, if the previous user input was received 12 minutes from the user input at the first time and the threshold is five minutes, the media guidance application may determine that the user (e.g., user 106) had stopped using the device and has now started using the device (e.g., mobile device 108), which may be due to the user's interest in the advertisement (e.g., advertisement 104).

In some embodiments, the media guidance application may determine that the difference between the first time and the second time is greater than the threshold difference based on the average time between user inputs. Specifically, the media guidance application may retrieve a log of recent user inputs on the first device (e.g., mobile device 108). For example, as discussed above, the media guidance application may retrieve a log of recent user inputs from storage of the first device (e.g., mobile device 108). The log may be structured as a table where each row contains an identifier of an input received from the user (e.g., user 106) and a time at which it was received. The media guidance application may determine, based on the log of recent user inputs, an average time between user inputs on the first device (e.g., mobile device 108). For example, the media guidance application may execute a program script utilizing a for-loop to retrieve a user input (e.g., from a row in a table corresponding to the log) and determine a difference in time with the next most recent user input. As a specific example, if user inputs were received at 8:10 pm, 8:20 pm, and 8:22 pm, the media guidance application may calculate the differences as two minutes and ten minutes, respectively. The media guidance application may iteratively determine differences between every user input and a next most recent user input in the log, or a subset within a threshold timeframe (e.g., the last two hours). The media guidance application may average the differences by dividing the total number of differences calculated by the sum of the differences. For example, if two minutes and ten minutes were calculated as the differences, then the average difference calculated by the media guidance application may be six minutes.

The media guidance application may compare the average time between user inputs with the difference between the first time and the second time. For example, the media guidance application may compare the average time (e.g., two minutes) between user inputs with the time between the two most recent user inputs (e.g., ten minutes) to determine which value is greater. The media guidance application may scale the average time by a factor in order to increase the probability the user (e.g., user 106) was not using the device (e.g., mobile device 108) at the first time and thus began using the first device responsive to seeing the advertisement (e.g., advertisement 104). The media guidance application may determine, based on comparing the average time between user inputs with the difference, that the average time between user inputs is less than the difference. For example, the media guidance application may determine that since the average time between user inputs is two minutes and the time between the two most recent user inputs (e.g., at the first time and the second time) is ten minutes, the user has started using the first device at the first time. The media guidance application may, based on determining that the average time between user inputs is less than the difference, determine that the difference between the first time and the second time is greater than the threshold difference. For example, since the average time between user inputs is less than the difference, the media guidance application may determine that the user (e.g., user 106) started using the first device (e.g., mobile device 108) at the first time, as opposed to already using the first device.

The media guidance application may, based on detecting that the user has started using the first device (e.g., mobile device 108) at the first time, determine whether the user has consumed an advertisement (e.g., advertisement 104) on a second device (e.g., a display coupled to user equipment 102) within a threshold amount of time from when the advertisement ended. If the user has consumed the advertisement on the second device within the threshold amount of time, the media guidance application may present supplemental information to the user. Specifically, the media guidance application may search media asset consumption history associated with the user (e.g., user 106) for an advertisement (e.g., advertisement 104) that the user consumed last. For example, the media guidance application may retrieve the media asset consumption history associated with the user (e.g., user 106) from local storage of either the first or second device (e.g., mobile device 108 or user equipment 102), or from a remote server. The consumption history may be structured as a table, array, or any other suitable data structure for storing times and identifiers of media assets consumed by a user (e.g., user 106). The consumption history may include times that the user consumed media assets (e.g., media asset 202), an identifier of the media asset consumed, and an identifier of a device (e.g., user equipment 102) on which the media asset was generated for display. For example, the media guidance application may, as is discussed further below, determine that a given user (e.g., user 106) is associated with multiple devices in a home that were concurrently generating media assets for display and determine which one was being used by the user (e.g., based on the user logging on to the device or GPS coordinates) to determine a media asset that the user consumed most recently.

The consumption history may include identifiers of advertisements (e.g., an identifier of advertisement 104) that were consumed during a media asset (e.g., media asset 202) consumed by the user (e.g., user 106). The media guidance application may determine based on an associated time period during which the advertisement (e.g., advertisement 104) was consumed which advertisement the user (e.g., user 106) consumed most recently (e.g., based on comparison with the first time when the user started using the first device). Alternatively or additionally, the consumption history may only identify times that a user (e.g., user 106) consumed a specific media asset (e.g., media asset 202) and another database may be necessary to determine which advertisements were generated during that media asset. For example, the consumption history may store an indication that the user consumed a media asset (e.g., media asset 202) with identifier "The Good Place" from 8 pm to 8:22 pm. The media guidance application may access a headend server or other media guidance database storing indications which advertisements (e.g., advertisement 104) were presented from 8 pm to 8:22 pm for the media asset (e.g., media asset 202) with the identifier "The Good Place." The media guidance application may determine which advertisement (e.g., advertisement 104) was generated for display closest to 8:22 pm that the user (e.g., user 106) completely consumed as the advertisement that the user consumed last.

In some embodiments, the media guidance application determines the advertisement that the user consumed last based on which advertisement (e.g., advertisement 104) was consumed on a second device (e.g., user equipment 102) that is closest to the current location of the first device (e.g., mobile device 108). Specifically, the media guidance application may detect a device that is closest to the first device (e.g., mobile device 108), where the device is one of a plurality of devices associated with the user. For example, the media guidance application may receive an indication that an identifier associated with the user (e.g., a parental control PIN and/or any other login that is specific to user 106) has been entered on a second device (e.g., user equipment 102). The media guidance application may receive the indication from the second device (e.g., user equipment 102), or from a remote server. Based on receiving the indication that the identifier associated with the user has been entered on the second device (e.g., user equipment 102), the media guidance application may determine that the second device is located closest to the first device that the user started using at the first time. Alternatively or additionally, the media guidance application may determine the device that is closest to the first device (e.g., mobile device 108) based on comparing coordinates associated with the first device with coordinates associated with a plurality of devices associated with the user. For example, the media guidance application may access a profile associated with the user and determine GPS coordinates of a device located in a summer home of the user (e.g., user 106) and a device located in the user's main home. The media guidance application may compare GPS coordinates from the first device (e.g., a mobile phone) with the coordinates in the profile to determine which location the first device (e.g., mobile device 108) is in and thus which advertisement (e.g., advertisement 104) was most recently consumed by the user (e.g., user 106). In this way, the media guidance application may prevent the user (e.g., user 106) from receiving supplemental information about advertisements he or she did not watch (e.g., if the user's sister consumed an advertisement most recently on a television that is also associated with the user, the user may receive supplemental information about the advertisement his sister consumed which will likely not be of interest).

The media guidance application may determine a device identifier of the device closest to the first device (e.g., mobile device 108). For example, the media guidance application may retrieve an identifier, which may be any combination of characters that uniquely identifies the device from other devices associated with the user (e.g., "Family Room STB"), of the device (e.g., user equipment 102) determine to be closest to the first device (e.g., mobile device 108). The media guidance application may retrieve, using the device identifier for the device closest to the first device, device media asset consumption history associated with the user. For example, the media guidance application may filter the media asset consumption history based on the device it was consumed on to determine the advertisement most recently consumed on the device (e.g., user equipment 102) determined to be closest to the user. The media guidance application may search the device media asset consumption history for the advertisement that the user consumed last. For example, the media guidance application may sort the advertisements consumed by the user (e.g., user 106) on the device (e.g., user equipment 102) determined to be closest to the first device (e.g., mobile device 108) by time and date, using a bubble sort, merge sort, or other algorithm. The media guidance application may determine from the sorted device consumption history which advertisement (e.g., advertisement 104) that the user consumed last on the device closest to the first device.

The media guidance application may retrieve metadata associated with the advertisement (e.g., advertisement 104). For example, the media guidance application may retrieve metadata associated with an advertisement locally from storage or a remote server. The metadata may be any data related to the advertisement (e.g., advertisement 104) that describes content associated with the advertisement. For example, if the advertisement is for a new book, the metadata may include the author of the article, genre (e.g., Non-fiction), and/or publisher.

The media guidance application may determine, based on the metadata associated with the advertisement (e.g., advertisement 104), that the advertisement is part of a group of similar advertisements. For example, the media guidance application may access an advertising database (either locally in storage or at a remote server) that includes a plurality of data structures that each includes a plurality of identifiers of advertisements that are similar, as well as metadata that is common to the similar advertisements. The data structures may be linked via an index data structure (e.g., via pointers). The media guidance application may compare the metadata associated with the advertisement (e.g., advertisement 104) with metadata associated with each group of similar advertisements stored in the advertising database to determine which group of similar advertisements the advertisement belongs to. For example, if the advertisement (e.g., advertisement 104) is for a brand of beer, the media guidance application may determine that the advertisement belongs to a group of similar advertisements for "beer."

In some embodiments, the media guidance application may determine the group of similar advertisements that the advertisement (e.g., advertisement 104) that the user consumed last is a part of based on comparing metadata. Specifically, the media guidance application may retrieve metadata associated with a plurality of groups of similar advertisements, where each group of similar advertisements includes advertisements that share one or more characteristics. For example, the media guidance application may retrieve identifiers of an actor, product type, company name, or any other metadata that is used to characterize a group of similar advertisements, for each group of similar advertisements. As an example, the media guidance application may retrieve metadata "Tom Hanks" for a particular group of similar advertisements that all include the actor Tom Hanks. The media guidance application may compare the metadata associated with the advertisement (e.g., advertisement 104) with the metadata associated with each of the plurality of groups of similar advertisements. For example, the media guidance application may compare each retrieved piece of metadata associated with the advertisement that the user consumed last with the metadata associated with each group of similar advertisements by comparing the characters of the metadata. For example, the media guidance application may compare characters "Tom Hanks," who is an actor associated with the advertisement that the user consumed last, with characters "Tom Cruise," an actor associated with a particular group of similar advertisements.

The media guidance application may, based on comparing the metadata associated with the advertisement with the metadata associated with one of the plurality of groups of similar advertisements, determine that the advertisement (e.g., advertisement 104) is part of the group of similar advertisements. For example, the media guidance application may determine a match between metadata of the advertisement that the user consumed last (e.g., advertisement 104) and the metadata of the group of similar advertisements if every character matches between a particular piece of metadata (e.g., for an actor). In some embodiments, all the metadata associated with the advertisement that the user consumed last (e.g., advertisement 104) must match the metadata of the group of similar advertisements for a match to be determined. In other embodiments, if a threshold amount of the metadata matches, a match may be determined. If the media guidance application determines that the metadata matches between the advertisement that the user consumed last (e.g., advertisement 104) and a particular group of similar advertisements, the media guidance application may determine that the advertisement that the user consumed last is part of the group of similar advertisements.

The media guidance application may retrieve interaction histories for a plurality of users who consumed advertisements in the group of similar advertisements. For example, the media guidance application may access a database containing interaction histories associated with a plurality of users (e.g., which may be stored locally or at a remote server). For example, each interaction history may be structured as a table or other suitable data structure, where each row in the table contains an identifier of an action taken by a specific user. The interaction history may aggregate times and actions taken by a specific user from different sources, for example, a web browsing history and a television viewing history. In this way, the media guidance application may use the interaction history to determine an amount of time that a user took between consuming an advertisement (e.g., advertisement 104) and accessing supplemental information (e.g., supplemental information 204) manually (e.g., by typing in the URL of a particular webpage into a web browser at a given time).

The media guidance application may determine which interaction histories to retrieve based on comparing identifiers of similar advertisements from the group of similar advertisements with identifiers stored in the interaction histories. For example, the interaction histories may contain an identifier of a media asset (e.g., media asset 202) that was consumed (e.g., "Friends, Season 3 Episode") from a particular source (e.g., "CW") at a particular time (e.g., 8-8:30 pm on Jan. 1, 2017). The media guidance application may access another data structure associated with the source from local storage or a remote server to determine which advertisements were displayed during the media asset. Alternatively or additionally, the identifiers of advertisements may be stored in the interaction history and the media guidance application may retrieve and compare the identifiers with the identifiers of similar advertisements without the need to access another data structure. The media guidance application may retrieve all, or a subset of, interaction histories where an associated user has consumed an advertisement that is part of the group of similar advertisements. Alternatively or additionally, the media guidance application may retrieve all stored user interaction histories, or a subset, without determining whether a similar advertisement was consumed by a user associated with each interaction history. In some embodiments, the interaction history is anonymous with no identifying information associated with the user stored in the interaction history. In other embodiments, as discussed below, the interaction history includes a demographic profile, which enables the media guidance application to select interaction histories of users that are similar to the user (e.g., user 106) for a potentially better estimation of the threshold amount of time.

In some embodiments, the media guidance application may retrieve a portion of the available interaction histories of users based on whether demographic profiles of the users match a demographic profile of the user (e.g., user 106). Specifically, the media guidance application may determine, based on data stored in a user profile of the user, a demographic profile of the user. For example, the media guidance application may retrieve a demographic profile associated with the user (e.g., user 106) stored in local storage or at a remote server. The demographic profile may contain information regarding the age, ethnicity, location, gender, or any other general feature of the user that allows the full identity of the user to remain anonymous. The media guidance application may retrieve demographic profiles associated with users who consumed advertisements in the group of similar advertisements. For example, the media guidance application may retrieve demographic profiles from the interaction histories (e.g., from one or more fields in the interaction history) or from a separate location. For example, each demographic profile retrieved by the media guidance application may be related to an interaction history of a user that consumed one of the advertisements of the group of similar advertisements that the advertisement most recently consumed by the user belongs to. The demographic profiles may be linked to an interaction history associated with the user such that the media guidance application may retrieve an interaction history where the associated demographic profile matches a profile of the user. The demographic profiles may contain information regarding the age, ethnicity, location, gender, or any other general feature of the users that allows the full identity of the users to remain anonymous.

The media guidance application may compare the demographic profile of the user (e.g., user 106) with a demographic profile corresponding to each user of the users who consumed advertisements in the group of similar advertisements. For example, the media guidance application may compare each characteristic of the demographic profile of the user (e.g., age) with the corresponding characteristic (e.g., age) of each demographic profile associated with one of the users who consumed advertisements in the group of similar advertisements. The media guidance application may, based on comparing the demographic profile of the user with the demographic profile corresponding to each user who consumed advertisements in the group of similar advertisements, determine that a portion of demographic profiles corresponding to the plurality of users matches the demographic profile of the user. For example, the media guidance application may determine that the demographic profile of the user matches a demographic profile of one of the users that consumed advertisements of the group of similar advertisements if the every characteristic in both profiles match. Alternatively, the media guidance application may determine that the demographic profile of the user matches a demographic profile of one of the users that consumed advertisements of the group of similar advertisements if a threshold amount of the characteristics in the demographic profiles match.

The media guidance application may retrieve, based on determining that the portion of demographic profiles corresponding to the plurality of users matches the demographic profile of the user, interaction histories for the plurality of users. For example, the media guidance application may retrieve the interaction history associated with each user where the demographic profile of the user of the users who consumed advertisements in the group of similar advertisements matches the demographic profile of the user (e.g., user 106). In this way, the media guidance application may calculate an estimation of the threshold amount of time that it takes users to access supplemental information by filtering out users that are not similar to the user (e.g., if the user is young, the longer amount of time an older individual takes to access supplemental information related to an advertisement would skew the threshold).

The media guidance application may determine, based on the retrieved interaction histories, a plurality of durations, where each duration of the plurality of durations is a length of time between a time when a user of the plurality of users finished consuming one of the advertisements in the group to when the user of the plurality of users accessed corresponding supplemental information (e.g., supplemental information 204). For example, the media guidance application may search each retrieved interaction history for an identifier of a similar advertisement from the group of similar advertisements. The media guidance application may determine whether the user accessed supplemental information associated with the similar advertisement. For example, the media guidance application may determine that an advertisement for an above ground pool was consumed by the user and ended at 8:20 pm on a particular day and that at 8:22 pm (two minutes later) on the same day the user visited www.abovegroundpools.com. The media guidance application may determine that the user accessed supplemental information two minutes after consuming the advertisement based on retrieving the values from the interaction history.

The media guidance application may determine whether a user action stored in the interaction history with a corresponding time that is after the user finished consuming the similar advertisement (e.g., advertisement 104) represents the user accessing supplemental information (e.g., supplemental information 204) based on a rule-set. For example, the media guidance application may store, in the same or another data structure, keywords, metadata, or other identifying features and/or bibliographic information associated with the similar advertisement. The media guidance application may, after determining that a user consumed an advertisement that is part of the group of similar advertisements based on an identifier of the advertisement being present in the interaction history, search for the keywords, metadata, or other identifying features associated with the advertisement at later times in the interaction history. If the user never consumed supplemental information (e.g., no actions after the user finished consuming the advertisement relate to accessing associated supplemental information), then the media guidance application may continue checking the interaction history and/or other interaction histories for another advertisement of the group of similar advertisements. However, if the media guidance application does determine that supplemental information was consumed at a time after the end of the advertisement, the media guidance application may store the amount of time later that the information was consumed (e.g., one of the plurality of durations) in a list, array, or other suitable data structure. The media guidance application may iteratively retrieve and compare actions stored in the interaction history with identifiers of advertisements of the group until every retrieved interaction history has been analyzed to determine whether supplemental information was accessed by a respective user after consuming an advertisement of the group of similar advertisements. In some embodiments, if the media guidance application determines that the amount of time later that the supplemental information was consumed (e.g., one of the plurality of durations) after the end of an advertisement was greater than a threshold amount of time (e.g., one day), the accessing of supplemental information was not tied to the advertisement and should not be used in determining the threshold amount of time.

In some embodiments, the media guidance application may determine the plurality of durations by calculating a length of time between the time when each user of the plurality of users finished consuming one of the advertisements (e.g., advertisement 104) and when the user started consuming supplemental information (e.g., supplemental information 204). Specifically, the media guidance application may retrieve an end time when each user of the plurality of users finished consuming one of the advertisements in the group of advertisements from each retrieved interaction history. For example, the media guidance application may retrieve from a field of the interaction history for a given user that the user consumed an advertisement that is part of the group of similar advertisements at 8:20 pm on a particular day. The media guidance application may determine that the advertisement is part of the group of similar advertisements based on comparing a stored identifier of the advertisement with identifiers associated with advertisements of the group of similar advertisements. The media guidance application may retrieve a start time from each retrieved interaction history when supplemental information associated with the advertisement in the group of similar advertisements was accessed by each user. For example, when the media guidance application determines a time that the user consumed an advertisement of the group of similar advertisements in the interaction history, the media guidance application may search the interaction history for later times when the user may have accessed supplemental information. For example, as discussed above, the media guidance application may determine whether supplemental information accessed by a user at a time after the end of the advertisement is associated with the advertisement. For example, if the media guidance application determines that a particular piece of supplemental information is related to the advertisement, the media guidance application may retrieve from a field of the interaction history for the user that the user accessed supplemental information at 8:22 pm.

The media guidance application may calculate the length of time between the time when the user of the plurality of users finished consuming one of the advertisements (e.g., advertisement 104) in the group to when the user of the plurality of users accessed the corresponding supplemental information (e.g., supplemental information 204) based on the start time and the end time from each retrieved interaction history. For example, the media guidance application may determine a difference between the two values (e.g., the difference between 8:20 pm and 8:22 pm is two minutes) as the length of time after the end of the advertisement that the user of the plurality of users accessed supplemental information. The media guidance application may determine the plurality of durations based on the calculated length of time from each retrieved interaction history. For example, the media guidance application may execute a program script to iteratively retrieve and compare values stored in each retrieved interaction history and determine whether a user who consumed an advertisement of the group of similar advertisements later consumed supplemental information associated with the advertisement. The media guidance application may, for each interaction history where a user did consume an advertisement of the group of similar advertisements and later consumed supplemental information associated with the advertisement, store the length of time in a list or other suitable data structure. The media guidance application may optionally modify the value stored based on how closely the demographic profile of the user associated with the retrieved interaction history matches the demographic profile of user 106 (e.g., weight the values added to the list).

The media guidance application may calculate a threshold amount of time associated with the advertisement (e.g., advertisement 104) based on the plurality of durations. For example, the media guidance application may retrieve a stored list, array, or other data structure that contains the plurality of durations and average the values stored in the list, array, or other data structure. The media guidance application may store the calculated average of the retrieved values as the threshold amount of time. The media guidance application may optionally weight particular durations higher than others, based on a type of supplemental information accessed. For example, the media guidance application may determine that a user who accesses a website associated with a company whose product was feature in an advertisement should be weighted more than if the user accessed the website associated with a competitor company selling a similar product.

The media guidance application may calculate an amount of time starting from an endpoint of the advertisement (e.g., advertisement 104) to when the user (e.g., user 106) started using the first device (e.g., mobile device 108). For example, the media guidance application may initialize and store a variable for the amount of time starting from the endpoint of the advertisement to when the user started using the first device (e.g., mobile device 108). Continuing with this example, the media guidance application may calculate and store the amount of time by subtracting the first time from an end time code of the advertisement (e.g., advertisement 104). As a specific example, if the user started using the first device at (20:22:10:00) and the end time code is (20:21:40:00), then the media guidance application may calculate the amount of time as 30 seconds. In some embodiments, the end time code of the advertisement may not be the endpoint of the advertisement. For example, the media guidance application may add a small amount of time (e.g., ten seconds) to account for a transition element that leads back into the media asset (e.g., media asset 202) provided as part of the media asset by a content source.

The media guidance application may compare the threshold amount of time with the amount of time starting from the endpoint of the advertisement to when the user started using the first device (e.g., mobile device 108). For example, the media guidance application may compare the two calculated values to determine which is greater. In some embodiments the media guidance application may round the two values (e.g., to the nearest second) for easier comparison.

The media guidance application may determine, based on comparing the threshold amount of time with the amount of time starting from the endpoint of the advertisement to when the user started using the first device, that the user started using the first device (e.g., mobile device 108) within the threshold amount of time from the endpoint of the advertisement (e.g., advertisement 104). For example, if the amount of time from the endpoint of the advertisement (e.g., mobile device 108) to when the user began using the first device was calculated as 30 seconds and the threshold amount of time was calculated to be 40 seconds based on the interaction histories of users that consumed similar advertisements as described above, then the media guidance application may determine that the user (e.g., user 106) started using the first device (e.g., mobile device 108) within the amount of time from the endpoint of the advertisement. In some embodiments, the media guidance application may determine that the user started using the first device within the amount of time if the amount of time is within a tolerance factor of the duration. The tolerance factor may be adjusted based on user preferences or interaction history (e.g., stored in a profile associated with the user). For example, the user may be slow to start using a mobile phone after the conclusion of the advertisement if he or she is interested in an advertisement (e.g., because the user always keeps their mobile phone in a different room when watching television) and may want the threshold time to be increased. The media guidance application may store a tolerance factor and multiply the length of the advertisement segment by the factor. For example, if the calculated threshold amount of time is 30 seconds and the tolerance factor is 1.2, then the effective threshold amount of time used for the purposes of determining whether the user began using the first device within the threshold amount of time is 36 seconds.

The media guidance application may, in response to determining that the user (e.g., user 106) started using the first device (e.g., mobile device 108) within the threshold amount of time from the endpoint of the advertisement (e.g., advertisement 104), retrieve supplemental information (e.g., supplemental information 204) associated with the advertisement that the user consumed last and generate the supplemental information for display. For example, the media guidance application may determine that since the user (e.g., user 106) began using the first device (e.g., mobile device 108) within the calculated threshold amount of time from the end of the advertisement (e.g., advertisement 104), supplemental information (e.g., supplemental information 204) related to the advertisement should be presented to the user. Specifically, the media guidance application may retrieve supplemental information (e.g., supplemental information 204) for the advertisement that the user consumed last. For example, the media guidance application may retrieve the supplemental information (e.g., supplemental information 204) from storage or a remote server. The media guidance application may determine a location of the supplemental information (e.g., supplemental information 204) to retrieve based on an index data structure. For example, the media guidance application may compare an identifier of the advertisement with stored identifiers associated with supplemental information (e.g., supplemental information 204). As a specific example, the media guidance application may determine that the advertisement that the user consumed most recently (e.g., "Budweiser_ad_1") matches an identifier stored in the index data structure. The media guidance application may retrieve supplemental information (e.g., supplemental information 204) associated with the stored identifier. For example, the media guidance application may retrieve a pointer to a location in memory where the supplemental information (e.g., supplemental information 204) is located and retrieve the supplemental information from that location.

In some embodiments, the media guidance application may determine the location of the second device (e.g., user equipment 102) in order to target supplemental information (e.g., supplemental information 204) related to an advertisement (e.g., advertisement 104) to the user (e.g., user 106). Specifically, the media guidance application may retrieve a location of the second device from a profile associated with the user, where the location is from a plurality of locations that indicate an area in a home. For example, the media guidance application may retrieve the profile from local storage (e.g., of the first device) or from a remote server. The profile may include a table or other suitable data structure with identifiers of devices (e.g., user equipment 102 and mobile device 108) associated with the user (e.g., user 106) each with at least one corresponding indication of a location of the device (e.g., bedroom). The media guidance application may retrieve a location corresponding to the second device (e.g., user equipment 102) from a field associated with the second device in the profile. The locations may, alternatively or additionally, be locations in any building (e.g., an airport or office building) such that a user waiting for a flight at an airport consuming a television monitor may be able to obtain supplemental information related to an advertisement that he or she has consumed. The media guidance application may retrieve a plurality of identifiers of supplemental information (e.g., supplemental information 204) associated with the advertisement that the user consumed last, where each of the plurality of identifiers is associated with one or more locations of the plurality of locations. For example, the media guidance application may retrieve an index data structure including identifiers of supplemental information (e.g., which may be any combination of characters that describe the supplemental information). The data structure further may include both a pointer to a location in storage containing the supplemental information (e.g., supplemental information 204), as well as a location in a home that the supplemental information is relevant to.

The media guidance application may compare the location of the second device (e.g., user equipment 102) with each location associated with one of the retrieved plurality of identifiers of supplemental information (e.g., supplemental information 204). For example, the media guidance application may iteratively compare the location of the second device retrieved from the profile (e.g., "bedroom") with locations associated with supplemental information that is related to the advertisement. As a specific example, the media guidance application may compare the location of the second device, "bedroom," to the location associated with supplemental information (e.g., supplemental information 204) related to a television discount that is associated with the locations "bedroom" and "living room". The media guidance application may determine, based on comparing the location of the second device with each location associated with one of the retrieved plurality of identifiers of supplemental information, that the location matches a stored location. For example, the media guidance application may determine that all, or a threshold amount or percentage, of characters describing the location of the second device (e.g. user equipment 102) match characters describing the location associated with a particular supplemental information (e.g., supplemental information 204) and thus the two locations match. The media guidance application may retrieve, from a field associated with the stored location, corresponding supplemental information related to the location of the second device. For example, the media guidance application may retrieve a pointer to a location in storage that contains the supplemental information (e.g., supplemental information 204) that is associated with the location of the second device. The media guidance application may retrieve the supplemental information from the location in storage.

In some embodiments, the media guidance application may select supplemental information associated with an advertisement (e.g., different from advertisement 104) in the group of advertisements if there is not supplemental information available for the advertisement (e.g., advertisement 104) most recently consumed by the user. Specifically, the media guidance application may determine that no supplemental information is associated with the advertisement (e.g., advertisement 104). For example, the media guidance application may compare an identifier of the advertisement that was most recently consumed by the user with a plurality of identifiers associated with supplemental information in a database (e.g., stored locally in storage or at a remote server) and determine that none of the supplemental information in the database is associated with the advertisement (e.g., advertisement 104). The media guidance application may compare the metadata associated with the advertisement with metadata associated with each advertisement in the group of similar advertisements. For example, the media guidance application may compare each piece of metadata associated with the advertisement (e.g., advertisement 104) that the user consumed last with the metadata associated with each advertisement in the group of similar advertisements by comparing the characters of the metadata. For example, the media guidance application may compare characters "Tom Hanks," who is an actor associated with the advertisement that the user consumed last, with characters "Tom Cruise," an actor associated with another advertisement in the group of similar advertisements.

The media guidance application may determine, based on comparing the metadata associated with the advertisement with metadata associated with each advertisement in the group of similar advertisements, that the metadata associated with the advertisement (e.g., advertisement 104) matches the metadata associated with a first similar advertisement. For example, the media guidance application may determine a match between metadata of the advertisement (e.g., advertisement 104) that the user consumed last and the metadata of a different advertisement in the group of similar advertisements if every character matches between a particular piece of metadata (e.g., for an actor). In some embodiments, all the metadata associated with the advertisement (e.g., advertisement 104) that the user consumed last must match the metadata of the different advertisement for a match to be determined. In other embodiments, if a threshold amount of the metadata matches, a match may be determined. The media guidance application may, in response to determining that the metadata associated with the advertisement matches the metadata associated with a first similar advertisement, retrieve supplemental information associated with the first similar advertisement in the group of similar advertisements. For example, the media guidance application may retrieve the supplemental information associated with the first similar advertisement from storage or a remote server.

The media guidance application may generate for display the supplemental information (e.g., supplemental information 204). The supplemental information may be text, graphics, video, or any other visual depiction of information related to the advertisement (e.g., advertisement 104). As another example, the supplemental information may be related to a promotion, sale, coupon, discount, newly available product, or any other information the advertiser wishes to inform the user about to entice him or her to purchase a good or service. For example, the media guidance application may generate the supplemental information automatically upon detecting that the user has started using the first device (e.g., as an overlay or popup). The media guidance application may, alternatively or additionally, prompt the user (e.g., user 106) prior to presenting the supplemental information regarding whether they want to receive supplemental information (e.g., supplemental information 204). In response to receiving a user selection to display the supplemental information, the media guidance application may generate the retrieved supplemental information for display. In some embodiments, the media guidance application may retrieve a plurality of supplemental information related to one or more of the advertisements associated with the advertisement slot. The media guidance application may present the supplemental information over fixed time intervals (e.g., each piece of supplemental information is displayed for five seconds and then the next is automatically displayed) and/or prompt the user for which specific supplemental information to display (e.g., generate for display selectable options to display different types of supplemental information, such as a movie trailer or a textual synopsis).

In some embodiments, the media guidance application may configure an application (e.g., a web browser) on the first device (e.g., mobile device 108) to generate for display the retrieved supplemental information (e.g., supplemental information 204) when the application is accessed. Specifically, the media guidance application may retrieve the supplemental information (e.g., a link to a promotion related to an advertisement that the user consumed) in response to the user (e.g., user 106) starting to use the first device (e.g., mobile device 108), but generate for display that supplemental information responsive to another user input (e.g., launching the application). For example, the media guidance application may retrieve the supplemental information (e.g., supplemental information 204) in response to the user (e.g., user 106) unlocking the first device (e.g., mobile device 108) and may use the information to configure a homepage or a start page of a web browser application. Continuing with this example, when the user (e.g., user 106) selects the web browser application with another user input, the user is presented with the supplemental information (e.g., the browser loads the start page or the homepage). It should be noted that in some embodiments, if the user doesn't access the application within a threshold amount of time (e.g., the threshold discussed above), the media guidance application may reconfigure the application to not present the supplemental information.

In some embodiments, the selection of a web browser application or other application may itself be the indication that the user (e.g., user 106) has started using the first device (e.g., mobile device 108). Specifically, upon receiving a selection of an application by the user (e.g., user 106), the media guidance application may retrieve supplemental information (e.g., supplemental information 204) related to an advertisement that a user recently consumed and configure the application to generate the supplemental information for display. For example, the media guidance application may retrieve the supplemental information (e.g., supplemental information 204) in response to the user (e.g., user 106) selecting a web browser application on the first device (e.g., mobile device 108) and may use the information to configure a homepage or a start page of the web browser application. Continuing with this example, the web browser application may present the supplemental information (e.g., supplemental information 204) in a banner advertisement on a start page or the homepage of the web browser application.

In some embodiments, the media guidance application may determine on which device (e.g., user equipment 102 or mobile device 108) to generate for display supplemental information (e.g., supplemental information 204) based on user preferences. Specifically, the media guidance application may determine a type of the supplemental information (e.g., supplemental information 204). For example, the type may be a movie, text article, graphic(s) or any other category of information that can be presented to a user. The media guidance application may determine the type of a particular retrieved supplemental information (e.g., supplemental information 204) from a stored string in a header of the retrieved supplemental information identifying the type (e.g., type='movie'). The media guidance application may compare the type of the supplemental information with user preferences stored in a profile associated with the user (e.g., user 106), where the user preferences identify devices to display types of supplemental information on. For example, the media guidance application may retrieve the profile associated with the user (e.g., user 106) from local storage (e.g., of mobile device 108) or from a remote server. The media guidance application may retrieve preferences for different types of supplemental information (e.g., supplemental information 204) and determine whether a retrieved preference matches the type of the presently retrieved supplemental information. The media guidance application may determine, based on comparing the type of the supplemental information with the user preferences, that the type of the supplemental information matches a first stored user preference associated with displaying supplemental information on the second device. For example, the media guidance application may determine that the type of the supplemental information (e.g., supplemental information 204), "movie," matches a user preference for displaying a "movie" on the second device (e.g., on user equipment 102, as opposed to on mobile device 108, which may have a smaller display size and be more difficult to consume the supplemental information). The media guidance application may, in response to determining that the type of the supplemental information matches the first stored user preference, transmit an instruction to the second device (e.g., user equipment 102) to display the supplemental information. For example, the media guidance application may send a data packet to the second device (e.g., user equipment 102) including the supplemental information (e.g., supplemental information 204) and an instruction to generate the supplemental information for display.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 3:
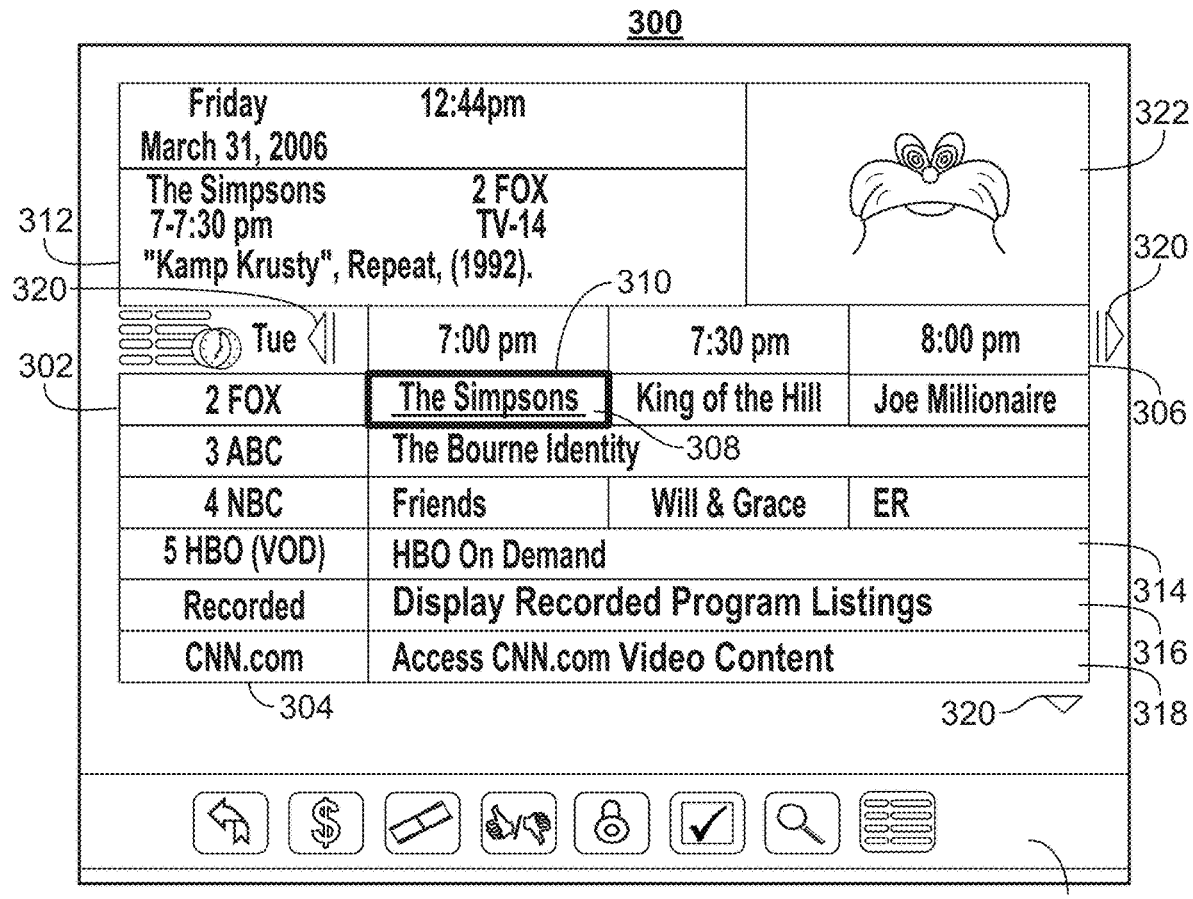
FIG. 3 shows an illustrative example of a display screen for use in accessing media content in accordance with some embodiments of the disclosure.
Figure 4:
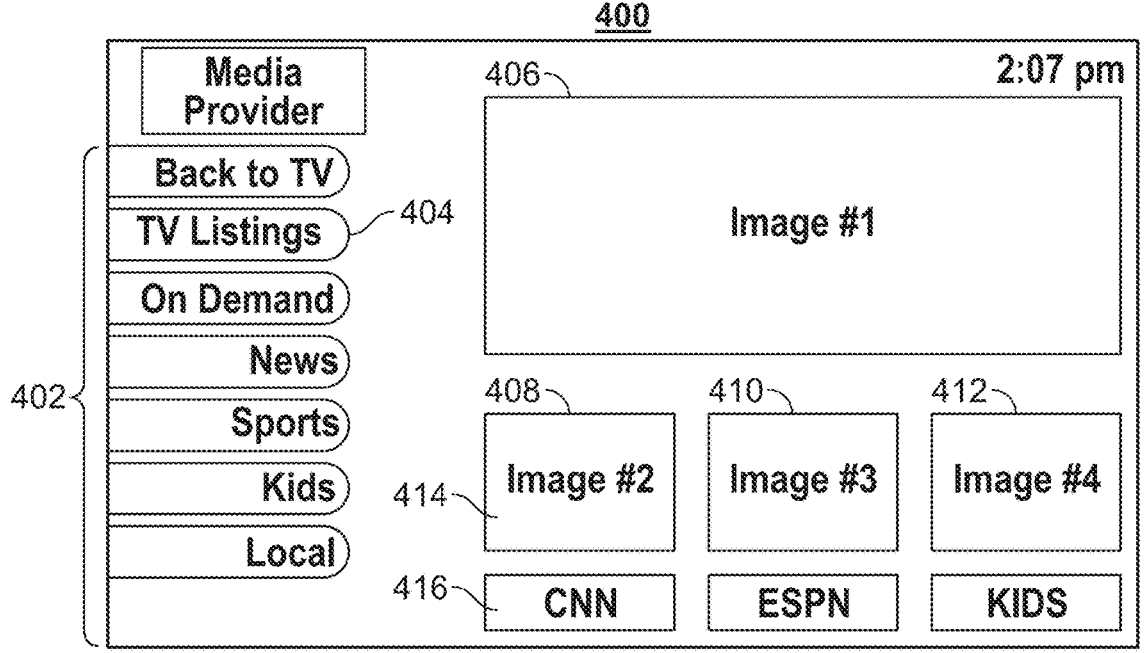
FIG. 4 shows another illustrative example of a display screen for use in accessing media content in accordance with some embodiments of the disclosure.

FIGS. 3-4 show illustrative display screens that may be used to provide media guidance data. The display screens shown in FIGS. 3-4 may be implemented on any suitable user equipment device or platform. While the displays of FIGS. 3-4 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 3 shows illustrative grid of a program listings display 300 arranged by time and channel that also enables access to different types of content in a single display. Display 300 may include grid 302 with: (1) a column of channel/content type identifiers 304, where each channel/content type identifier (which is a cell in the column) identifies a different channel or content type available; and (2) a row of time identifiers 306, where each time identifier (which is a cell in the row) identifies a time block of programming. Grid 302 also includes cells of program listings, such as program listing 308, where each listing provides the title of the program provided on the listing's associated channel and time. With a user input device, a user can select program listings by moving highlight region 310. Information relating to the program listing selected by highlight region 310 may be provided in program information region 312. Region 312 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc.

Internet content may include web events, such as a chat session or Webcast, or content available on-demand as streaming content or downloadable content through an Internet web site or other Internet access (e.g. FTP).

Grid 302 may provide media guidance data for non-linear programming including on-demand listing 314, recorded content listing 316, and Internet content listing 318. A display combining media guidance data for content from different types of content sources is sometimes referred to as a "mixed-media" display. Various permutations of the types of media guidance data that may be displayed that are different than display 300 may be based on user selection or guidance application definition (e.g., a display of only recorded and broadcast listings, only on-demand and broadcast listings, etc.). As illustrated, listings 314, 316, and 318 are shown as spanning the entire time block displayed in grid 302 to indicate that selection of these listings may provide access to a display dedicated to on-demand listings, recorded listings, or Internet listings, respectively. In some embodiments, listings for these content types may be included directly in grid 302. Additional media guidance data may be displayed in response to the user selecting one of the navigational icons 320. (Pressing an arrow key on a user input device may affect the display in a similar manner as selecting navigational icons 320.)

Display 300 may also include video region 322, and options region 326. Video region 322 may allow the user to view and/or preview programs that are currently available, will be available, or were available to the user. The content of video region 322 may correspond to, or be independent from, one of the listings displayed in grid 302. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 326 may allow the user to access different types of content, media guidance application displays, and/or media guidance application features. Options region 326 may be part of display 300 (and other display screens described herein), or may be invoked by a user by selecting an on-screen option or pressing a dedicated or assignable button on a user input device. The selectable options within options region 326 may concern features related to program listings in grid 302 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 6. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 4. Video mosaic display 400 includes selectable options 402 for content information organized based on content type, genre, and/or other organization criteria. In display 400, television listings option 404 is selected, thus providing listings 406, 408, 410, and 412 as broadcast program listings. In display 400 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 408 may include more than one portion, including media portion 414 and text portion 416. Media portion 414 and/or text portion 416 may be selectable to view content in full-screen or to view information related to the content displayed in media portion 414 (e.g., to view listings for the channel that the video is displayed on).

The listings in display 400 are of different sizes (i.e., listing 406 is larger than listings 408, 410, and 412), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 5:
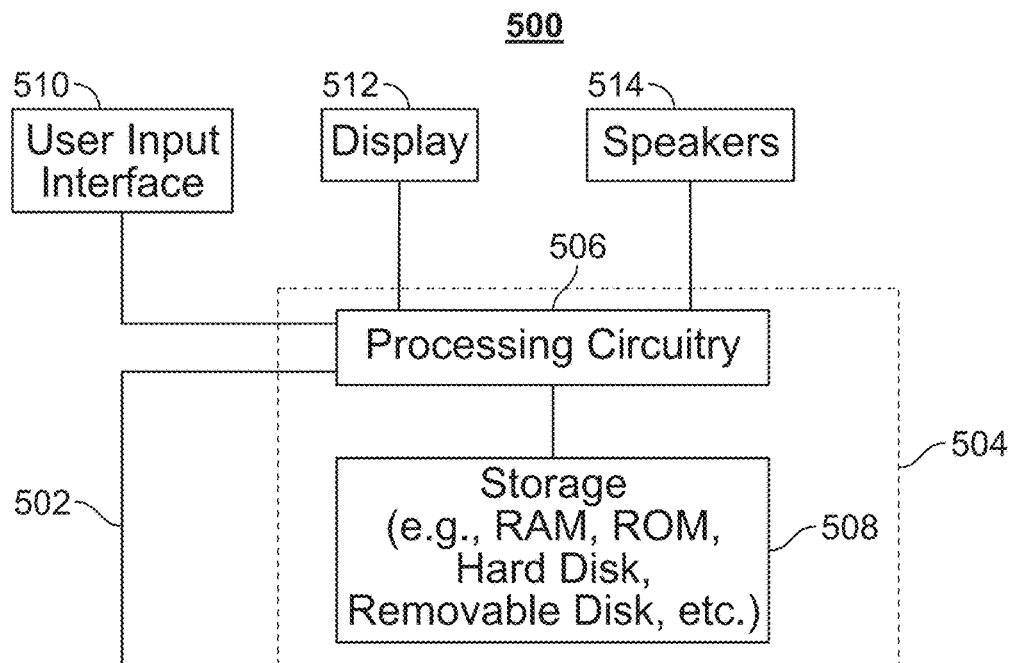
FIG. 5 is a block diagram of an illustrative user equipment device in accordance with some embodiments of the disclosure.

Users may access content and the media guidance application (and its display screens described above and below) from one or more of their user equipment devices. FIG. 5 shows a generalized embodiment of illustrative user equipment device 500. More specific implementations of user equipment devices are discussed below in connection with FIG. 6. User equipment device 500 may receive content and data via input/output (hereinafter "I/O") path 502. I/O path 502 may provide content (e.g., broadcast programming, on-demand programming, Internet content, content available over a local area network (LAN) or wide area network (WAN), and/or other content) and data to control circuitry 504, which includes processing circuitry 506 and storage 508. Control circuitry 504 may be used to send and receive commands, requests, and other suitable data using I/O path 502. I/O path 502 may connect control circuitry 504 (and specifically processing circuitry 506) to one or more communications paths (described below). I/O functions may be provided by one or more of these communications paths, but are shown as a single path in FIG. 5 to avoid overcomplicating the drawing.

Control circuitry 504 may be based on any suitable processing circuitry such as processing circuitry 506. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 504 executes instructions for a media guidance application stored in memory (i.e., storage 508). Specifically, control circuitry 504 may be instructed by the media guidance application to perform the functions discussed above and below. For example, the media guidance application may provide instructions to control circuitry 504 to generate the media guidance displays. In some implementations, any action performed by control circuitry 504 may be based on instructions received from the media guidance application.

In client-server based embodiments, control circuitry 504 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 6). In addition, communications circuitry may include circuitry that enables peer-to-peer communication of user equipment devices, or communication of user equipment devices in locations remote from each other (described in more detail below).

Memory may be an electronic storage device provided as storage 508 that is part of control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 508 may be used to store various types of content described herein as well as media guidance data described above. Nonvolatile memory may also be used (e.g., to launch a boot-up routine and other instructions). Cloud-based storage, described in relation to FIG. 6, may be used to supplement storage 508 or instead of storage 508.

Control circuitry 504 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 504 may also include scaler circuitry for upconverting and downconverting content into the preferred output format of the user equipment 500. Circuitry 504 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 508 is provided as a separate device from user equipment 500, the tuning and encoding circuitry (including multiple tuners) may be associated with storage 508.

A user may send instructions to control circuitry 504 using user input interface 510. User input interface 510 may be any suitable user interface, such as a remote control, mouse, trackball, keypad, keyboard, touch screen, touchpad, stylus input, joystick, voice recognition interface, or other user input interfaces. Display 512 may be provided as a stand-alone device or integrated with other elements of user equipment device 500. For example, display 512 may be a touchscreen or touch-sensitive display. In such circumstances, user input interface 510 may be integrated with or combined with display 512. Display 512 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 512 may be HDTV-capable. In some embodiments, display 512 may be a 3D display, and the interactive media guidance application and any suitable content may be displayed in 3D. A video card or graphics card may generate the output to the display 512. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 504. The video card may be integrated with the control circuitry 504. Speakers 514 may be provided as integrated with other elements of user equipment device 500 or may be stand-alone units. The audio component of videos and other content displayed on display 512 may be played through speakers 514. In some embodiments, the audio may be distributed to a receiver (not shown), which processes and outputs the audio via speakers 514.

The guidance application may be implemented using any suitable architecture. For example, it may be a stand-alone application wholly-implemented on user equipment device 500. In such an approach, instructions of the application are stored locally (e.g., in storage 508), and data for use by the application is downloaded on a periodic basis (e.g., from an out-of-band feed, from an Internet resource, or using another suitable approach). Control circuitry 504 may retrieve instructions of the application from storage 508 and process the instructions to generate any of the displays discussed herein. Based on the processed instructions, control circuitry 504 may determine what action to perform when input is received from input interface 510. For example, movement of a cursor on a display up/down may be indicated by the processed instructions when input interface 510 indicates that an up/down button was selected.

In some embodiments, the media guidance application is a client-server based application. Data for use by a thick or thin client implemented on user equipment device 500 is retrieved on-demand by issuing requests to a server remote to the user equipment device 500. In one example of a client-server based guidance application, control circuitry 504 runs a web browser that interprets web pages provided by a remote server. For example, the remote server may store the instructions for the application in a storage device. The remote server may process the stored instructions using circuitry (e.g., control circuitry 504) and generate the displays discussed above and below. The client device may receive the displays generated by the remote server and may display the content of the displays locally on equipment device 500. This way, the processing of the instructions is performed remotely by the server while the resulting displays are provided locally on equipment device 500. Equipment device 500 may receive inputs from the user via input interface 510 and transmit those inputs to the remote server for processing and generating the corresponding displays. For example, equipment device 500 may transmit a communication to the remote server indicating that an up/down button was selected via input interface 510. The remote server may process instructions in accordance with that input and generate a display of the application corresponding to the input (e.g., a display that moves a cursor up/down). The generated display is then transmitted to equipment device 500 for presentation to the user.

In some embodiments, the media guidance application is downloaded and interpreted or otherwise run by an interpreter or virtual machine (run by control circuitry 504). In some embodiments, the guidance application may be encoded in the ETV Binary Interchange Format (EBIF), received by control circuitry 504 as part of a suitable feed, and interpreted by a user agent running on control circuitry 504. For example, the guidance application may be an EBIF application. In some embodiments, the guidance application may be defined by a series of JAVA-based files that are received and run by a local virtual machine or other suitable middleware executed by control circuitry 504. In some of such embodiments (e.g., those employing MPEG-2 or other digital media encoding schemes), the guidance application may be, for example, encoded and transmitted in an MPEG-2 object carousel with the MPEG audio and video packets of a program.

Figure 6:
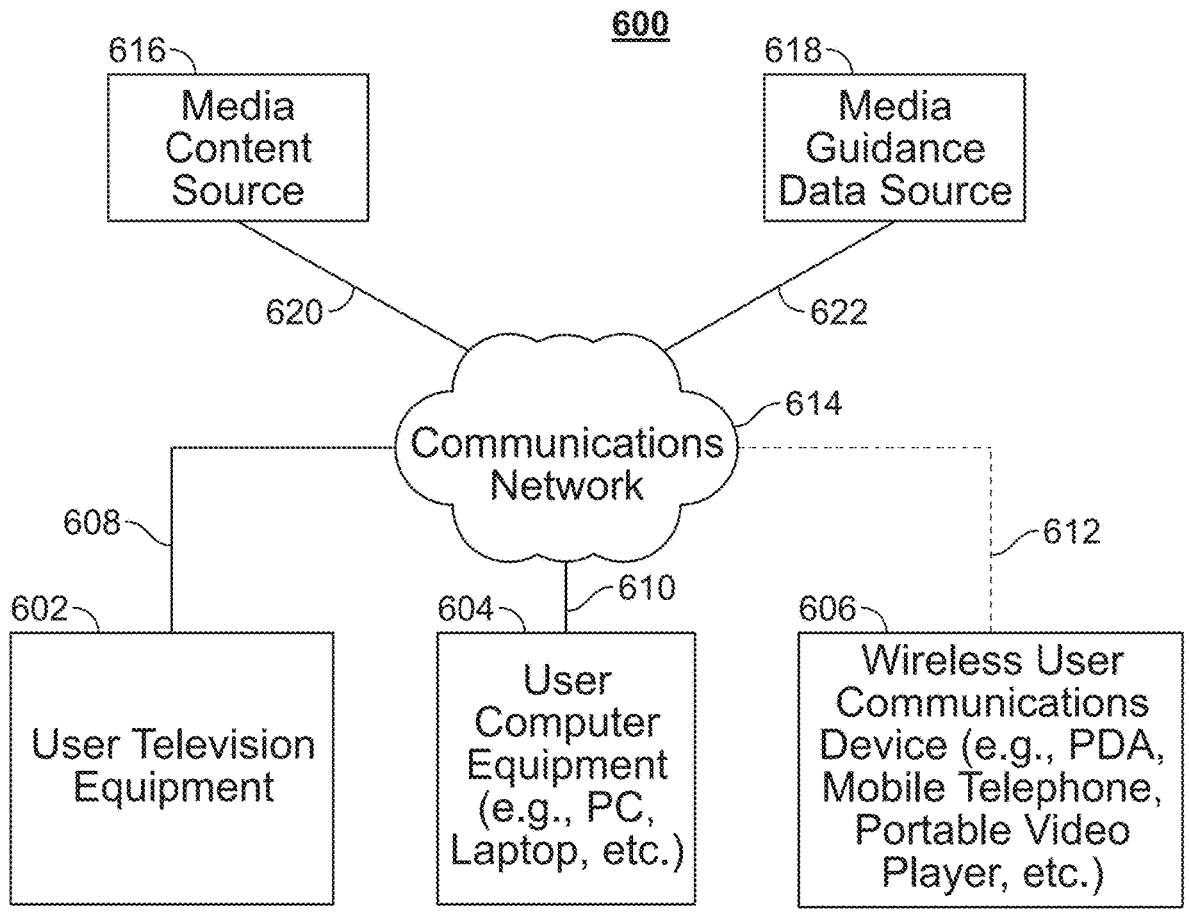
FIG. 6 is a block diagram of an illustrative media system in accordance with some embodiments of the disclosure.

User equipment device 500 of FIG. 5 can be implemented in system 600 of FIG. 6 as user television equipment 602, user computer equipment 604, wireless user communications device 606, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 5 may not be classified solely as user television equipment 602, user computer equipment 604, or a wireless user communications device 606. For example, user television equipment 602 may, like some user computer equipment 604, be Internet-enabled allowing for access to Internet content, while user computer equipment 604 may, like some television equipment 602, include a tuner allowing for access to television programming. The media guidance application may have the same layout on various different types of user equipment or may be tailored to the display capabilities of the user equipment. For example, on user computer equipment 604, the guidance application may be provided as a web site accessed by a web browser. In another example, the guidance application may be scaled down for wireless user communications devices 606.

In system 600, there is typically more than one of each type of user equipment device but only one of each is shown in FIG. 6 to avoid overcomplicating the drawing. In addition, each user may utilize more than one type of user equipment device and also more than one of each type of user equipment device.

In some embodiments, a user equipment device (e.g., user television equipment 602, user computer equipment 604, wireless user communications device 606) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 614. Namely, user television equipment 602, user computer equipment 604, and wireless user communications device 606 are coupled to communications network 614 via communications paths 608, 610, and 612, respectively. Communications network 614 may be one or more networks including the Internet, a mobile phone network, mobile voice or data network (e.g., a 4G or LTE network), cable network, public switched telephone network, or other types of communications network or combinations of communications networks. Paths 608, 610, and 612 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 612 is drawn with dotted lines to indicate that in the exemplary embodiment shown in FIG. 6 it is a wireless path and paths 608 and 610 are drawn as solid lines to indicate they are wired paths (although these paths may be wireless paths, if desired). Communications with the user equipment devices may be provided by one or more of these communications paths, but are shown as a single path in FIG. 6 to avoid overcomplicating the drawing.

Although communications paths are not drawn between user equipment devices, these devices may communicate directly with each other via communication paths, such as those described above in connection with paths 608, 610, and 612, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 614.

System 600 includes content source 616 and media guidance data source 618 coupled to communications network 614 via communication paths 620 and 622, respectively. Paths 620 and 622 may include any of the communication paths described above in connection with paths 608, 610, and 612. Communications with the content source 616 and media guidance data source 618 may be exchanged over one or more communications paths, but are shown as a single path in FIG. 6 to avoid overcomplicating the drawing. In addition, there may be more than one of each of content source 616 and media guidance data source 618, but only one of each is shown in FIG. 6 to avoid overcomplicating the drawing. (The different types of each of these sources are discussed below.) If desired, content source 616 and media guidance data source 618 may be integrated as one source device. Although communications between sources 616 and 618 with user equipment devices 602, 604, and 606 are shown as through communications network 614, in some embodiments, sources 616 and 618 may communicate directly with user equipment devices 602, 604, and 606 via communication paths (not shown) such as those described above in connection with paths 608, 610, and 612.

Content source 616 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 616 may be the originator of content (e.g., a television broadcaster, a Webcast provider, etc.) or may not be the originator of content (e.g., an on-demand content provider, an Internet provider of content of broadcast programs for downloading, etc.). Content source 616 may include cable sources, satellite providers, on-demand providers, Internet providers, over-the-top content providers, or other providers of content. Content source 616 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 618 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 618 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 618 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 618 may provide user equipment devices 602, 604, and 606 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 508, and executed by control circuitry 504 of a user equipment device 500. In some embodiments, media guidance applications may be client-server applications where only a client application resides on the user equipment device, and server application resides on a remote server. For example, media guidance applications may be implemented partially as a client application on control circuitry 504 of user equipment device 500 and partially on a remote server as a server application (e.g., media guidance data source 618) running on control circuitry of the remote server. When executed by control circuitry of the remote server (such as media guidance data source 618), the media guidance application may instruct the control circuitry to generate the guidance application displays and transmit the generated displays to the user equipment devices. The server application may instruct the control circuitry of the media guidance data source 618 to transmit data for storage on the user equipment. The client application may instruct control circuitry of the receiving user equipment to generate the guidance application displays.

Content and/or media guidance data delivered to user equipment devices 602, 604, and 606 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 600 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 6.

In one approach, user equipment devices may communicate with each other within a home network. User equipment devices can communicate with each other directly via short-range point-to-point communication schemes described above, via indirect paths through a hub or other similar device provided on a home network, or via communications network 614. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 616 to access content. Specifically, within a home, users of user television equipment 602 and user computer equipment 604 may access the media guidance application to navigate among and locate desirable content. Users may also access the media guidance application outside of the home using wireless user communications devices 606 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 614. These cloud resources may include one or more content sources 616 and one or more media guidance data sources 618. In addition or in the alternative, the remote computing sites may include other user equipment devices, such as user television equipment 602, user computer equipment 604, and wireless user communications device 606. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 604 or wireless user communications device 606 having content capture feature. Alternatively, the user can first transfer the content to a user equipment device, such as user computer equipment 604. The user equipment device storing the content uploads the content to the cloud using a data transmission service on communications network 614. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 5.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

FIG. 7 is a flowchart of illustrative actions for presenting supplemental information associated with an advertisement to a user, in accordance with some embodiments of the disclosure. For example, a media guidance application implementing process 700 may be executed by control circuitry 504 (FIG. 5). It should be noted that process 700 or any step thereof could be performed on, or provided by, any of the devices shown in FIGS. 5-6.

Process 700 begins with 702, where the media guidance application detects (e.g., via control circuitry 504 (FIG. 5)) that a user has started using a first device. For example, at the first time, the media guidance application may check (e.g., via control circuitry 504 (FIG. 5)) the user's recent interactions with the first device (e.g., any of user equipment described in FIGS. 5-6) to determine whether the user has just started using the device after a period of not using the device.

Process 700 continues to 704, where the media guidance application identifies (e.g., via control circuitry 504 (FIG. 5)) an advertisement slot associated with one or more advertisements that the user has most recently consumed on a second device. For example, the media guidance application may determine (e.g., via control circuitry 504 (FIG. 5)) based on an associated time period during which the advertisement was consumed which advertisement the user consumed most recently (e.g., based on comparison with a first time when the user started using the first device). As a specific example, the consumption history (e.g., which may be stored locally in storage 508 or remotely at media guidance data source 618, accessible via communications network 614) may include a stored indication that the user consumed an advertisement with identifier "Cola_ad_1" from 8:20 pm to 8:21 pm. If the current time is 8:22 pm and no additional advertisements were consumed after "Cola_ad_1," then the media guidance application may determine (e.g., via control circuitry 504 (FIG. 5)) it is the advertisement that the user consumed last. After determining the advertisement that the user consumed last, the media guidance application may determine (e.g., via control circuitry 504 (FIG. 5)) an advertisement slot that the advertisement is part of. For example, the media guidance application may compare (e.g., via control circuitry 504 (FIG. 5)) a time period associated with the advertisement that the user consumed last with a plurality of time periods associated with advertisement slots (e.g., from content source 616 (FIG. 6)) to determine an advertisement slot that includes the advertisement. In some embodiments, the media guidance application performs actions 704-708 responsive to the detection that the user has started using the first device at step 702.

Process 700 continues to 706, where the media guidance application determines (e.g., via control circuitry 504 (FIG. 5)) that the user started using the first device within an amount of time from an endpoint of the advertisement slot that corresponds to a duration associated with the advertisement slot. For example, if the amount of time from the endpoint of the advertisement slot to when the user began using the first device was calculated as 30 seconds and the length of the advertisement slot is 40 seconds, then the media guidance application may determine (e.g., via control circuitry 504 (FIG. 5)) that the user started using the first device (e.g., any of user equipment discussed with respect to FIGS. 5-6) within the amount of time from the endpoint of the advertisement slot. In some embodiments, the media guidance application may determine (e.g., via control circuitry 504 (FIG. 5)) that the user started using the first device within the amount of time if the amount of time is within a tolerance factor of the duration. The tolerance factor may be adjusted based on user preferences or interaction history (e.g., which may be stored locally in storage 508 or remotely at media guidance data source 618, accessible via communications network 614).

Process 700 continues to 708, where the media guidance application generates (e.g., via control circuitry 504 (FIG. 5)) for display (e.g., on display 512 (FIG. 5)) supplemental information associated with the one or more advertisements associated with the advertisement slot. For example, the supplemental information may be related to a promotion, sale, coupon, discount, newly available product, or any other information the advertiser wishes to inform the user about to entice him or her to purchase a good or service. As a specific example, the media guidance application may generate (e.g., via control circuitry 504 (FIG. 5)) for display the supplemental information automatically upon detecting that the user has started using the first device (e.g., as an overlay or popup on display 612 (FIG. 6)). The media guidance application may, alternatively or additionally, prompt (e.g., on display 512 (FIG. 5)) the user prior to presenting the supplemental information. In response to receiving a user selection (e.g., via user input interface 510 (FIG. 5)) to display the supplemental information, the media guidance application may generate (e.g., via control circuitry 504 (FIG. 5)) supplemental information for display.

Figure 8:
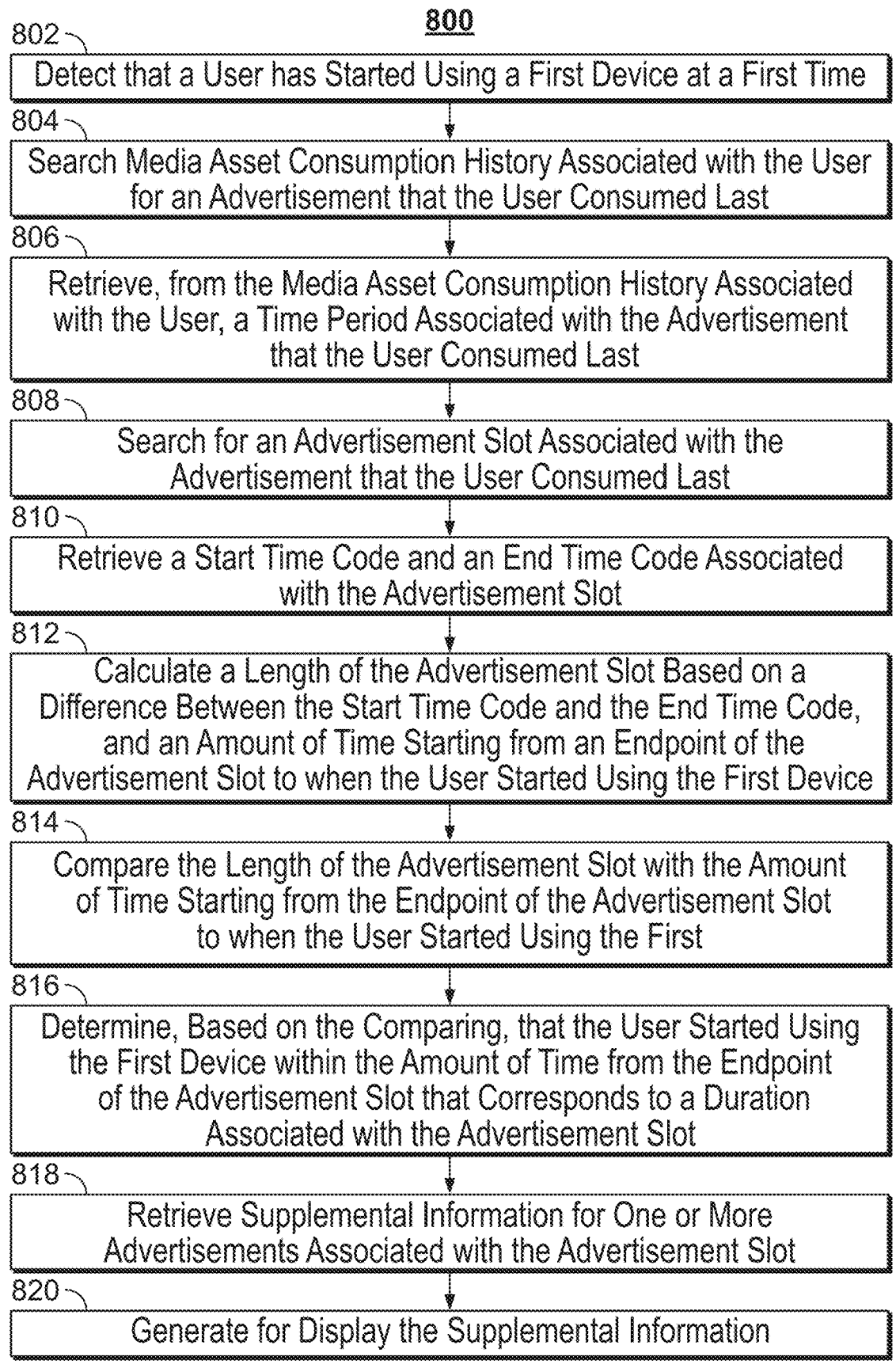
FIG. 8 is another flowchart of illustrative actions for presenting supplemental information associated with an advertisement to a user, in accordance with some embodiments of the disclosure.

FIG. 8 is another flowchart of illustrative actions for presenting supplemental information associated with an advertisement to a user, in accordance with some embodiments of the disclosure. For example, a media guidance application implementing process 800 may be executed by control circuitry 504 (FIG. 5). It should be noted that process 800 or any step thereof could be performed on, or provided by, any of the devices shown in FIGS. 5-6.

Process 800 begins with 802, where the media guidance application detects (e.g., via control circuitry 504 (FIG. 5)) that a user has started using a first device. For example, at the first time, the media guidance application may check (e.g., via control circuitry 504 (FIG. 5)) the user's recent interactions with the first device (e.g., any of user equipment described in FIGS. 5-6) to determine whether the user has just started using the device after a period of not using the device.

Process 800 continues to 804, where the media guidance application searches (e.g., via control circuitry 504 (FIG. 5)) media asset consumption history associated with the user for an advertisement that the user consumed last. For example, the media guidance application may determine (e.g., via control circuitry 504 (FIG. 5)) based on an associated time period during which the advertisement was consumed which advertisement the user consumed most recently (e.g., based on comparison with the first time when the user started using the first device). As a specific example, the consumption history (e.g., which may be stored locally in storage 508 or remotely at media guidance data source 618, accessible via communications network 614) may include a stored indication that the user consumed an advertisement with identifier "Cola_ad_1" from 8:20 pm to 8:21 pm. If the current time is 8:22 pm and no additional advertisements were consumed after "Cola_ad_1," then the media guidance application may determine (e.g., via control circuitry 504 (FIG. 5)) it is the advertisement that the user consumed last. In some embodiments, the media guidance application performs (e.g., via control circuitry 504 (FIG. 5)) actions 804-820 responsive to the detection that the user has started using the first device at step 802.

Process 800 continues to 806, where the media guidance application retrieves (e.g., via control circuitry 504 (FIG. 5)), from the media asset consumption history associated with the user, a time period associated with the advertisement that the user consumed last. For example, the media guidance application may retrieve (e.g., via control circuitry 504 (FIG. 5)) a start value and/or end value of the advertisement from the media asset consumption history (e.g., which may be stored locally in storage 508 or remotely at media guidance data source 618, accessible via communications network 614). As a specific example, the media guidance application may retrieve (e.g., via control circuitry 504 (FIG. 5)) two values from the media asset consumption history, indicating that from 8:21:20 pm to 8:21:40 pm the user consumed the advertisement.

Process 800 continues to 808, where the media guidance application searches (e.g., via control circuitry 504 (FIG. 5)) for an advertisement slot associated with the advertisement that the user consumed last. For example, the media guidance application may compare (e.g., via control circuitry 504 (FIG. 5)) the time period of the advertisement that the user consumed last with an index of advertisement slots and advertisements that filled the slots (e.g., which may be stored locally in storage 508 or remotely at media guidance data source 618, accessible via communications network 614). The media guidance application may retrieve (e.g., via control circuitry 504 (FIG. 5)) metadata associated with the advertisement (e.g., from media guidance data source 618 or the media asset consumption history associated with the user) such as an identifier of the advertisement (e.g., "Budweiser_ad_1"), a source from which the user consumed the advertisement (e.g., content source 616 (FIG. 6)), and/or any other information associated with the advertisement that may allow the media guidance application to more efficiently determine the advertisement slot that the user consumed with the advertisement.

Process 800 continues to 810, where the media guidance application retrieves (e.g., via control circuitry 504 (FIG. 5)) a start time code and an end time code associated with the advertisement slot. For example, the media guidance application may retrieve (e.g., via control circuitry 504 (FIG. 5)) an end time code (20:21:40:00) corresponding to (hour:minute:second:frame) when the advertisement time slot ended. For example, the media guidance application may retrieve (e.g., via control circuitry 504 (FIG. 5)) start and end time codes associated with the advertisement slot, indicating that the advertisement slot lasted from 8:21:00 pm to 8:21:40 pm.

Process 800 continues to 812, where the media guidance application calculates (e.g., via control circuitry 504 (FIG. 5)) a length of the advertisement slot based on a difference between the start time code and the end time code, and an amount of time starting from an endpoint of the advertisement slot to when the user started using the first device. For example, the media guidance application may calculate (e.g., via control circuitry 504 (FIG. 5)) and store (e.g., locally in storage 508 or remotely at media guidance data source 618, accessible via communications network 614) the length of the advertisement slot by subtracting the end time code from the start time code associated with the advertisement slot. As a specific example, if the start time code is (20:21:00:00) and the end time code is (20:21:40:00), the media guidance application may calculate (e.g., via control circuitry 504 (FIG. 5)) that the length of the advertisement slot is 40 seconds. For example, the media guidance application may calculate (e.g., via control circuitry 504 (FIG. 5)) and store (e.g., locally in storage 508 or remotely at media guidance data source 618, accessible via communications network 614) the amount of time by subtracting the first time from the end time code of the advertising slot. As a specific example, if the user started using the first device at (20:22:10:00) and the end time code is (20:21:40:00), then the media guidance application may calculate (e.g., via control circuitry 504 (FIG. 5)) the amount of time as 30 seconds. In some embodiments, the end time code of the advertisement slot may not be the endpoint of the advertisement slot. For example, the media guidance application may add (e.g., via control circuitry 504 (FIG. 5)) a small amount of time (e.g., ten seconds) to account for a transition element that leads back into the show provided as part of the media asset by a content source (e.g., content source 616 (FIG. 6)).

Process 800 continues to 814, where the media guidance application compares (e.g., via control circuitry 504 (FIG. 5)) the length of the advertisement slot with the amount of time starting from the endpoint of the advertisement slot to when the user started using the first device. For example, the media guidance application may compare (e.g., via control circuitry 504 (FIG. 5)) the two calculated values to determine which is greater. In some embodiments the media guidance application may round (e.g., via control circuitry 504 (FIG. 5)) the two values (e.g., to the nearest second) for easier comparison.

Process 800 continues to 816, where the media guidance application determines (e.g., via control circuitry 504 (FIG. 5)), based on the comparing at 814, that the user started using the first device within the amount of time from the endpoint of the advertisement slot that corresponds to a duration associated with the advertisement slot. For example, if the amount of time from the endpoint of the advertisement slot to when the user began using the first device was calculated as 30 seconds and the length of the advertisement slot is 40 seconds, then the media guidance application may determine (e.g., via control circuitry 504 (FIG. 5)) that the user started using the first device (e.g., any of user equipment discussed with respect to FIGS. 5-6) within the amount of time from the endpoint of the advertisement slot. In some embodiments, the media guidance application may determine (e.g., via control circuitry 504 (FIG. 5)) that the user started using the first device within the amount of time if the amount of time is within a tolerance factor of the duration. The tolerance factor may be adjusted based on user preferences or interaction history (e.g., which may be stored locally in storage 508 or remotely at media guidance data source 618, accessible via communications network 614).

Process 800 continues to 818, where the media guidance application retrieves (e.g., via control circuitry 504 (FIG. 5)) supplemental information for one or more advertisements associated with the advertisement slot. For example, the media guidance application may determine (e.g., via control circuitry 504 (FIG. 5)) that the advertisement that the user consumed most recently (e.g., "Budweiser_ad_1") matches an identifier that is associated with supplemental information. The media guidance application may retrieve (e.g., via control circuitry 504 (FIG. 5)) supplemental information associated with the stored identifier. For example, the media guidance application may retrieve (e.g., via control circuitry 504 (FIG. 5)) a pointer to a location (e.g., locally in storage 508 or remotely at media guidance data source 618, accessible via communications network 614) where the supplemental information is located and retrieve the supplemental information from that location.

Process 800 continues to 820, where the media guidance application generates (e.g., via control circuitry 504 (FIG. 5)) for display (e.g., on display 512 (FIG. 5)) the supplemental information. For example, the supplemental information may be related to a promotion, sale, coupon, discount, newly available product, or any other information the advertiser wishes to inform the user about to entice him or her to purchase a good or service. As a specific example, the media guidance application may generate (e.g., via control circuitry 504 (FIG. 5)) for display the supplemental information automatically upon detecting that the user has started using the first device (e.g., as an overlay or popup on display 612 (FIG. 6)). The media guidance application may, alternatively or additionally, prompt (e.g., on display 512 (FIG.

5)) the user prior to presenting the supplemental information. In response to receiving a user selection (e.g., via user input interface 510 (FIG. 5)) to display the supplemental information, the media guidance application may generate (e.g., via control circuitry 504 (FIG. 5)) the retrieved supplemental information for display.

Figure 9:
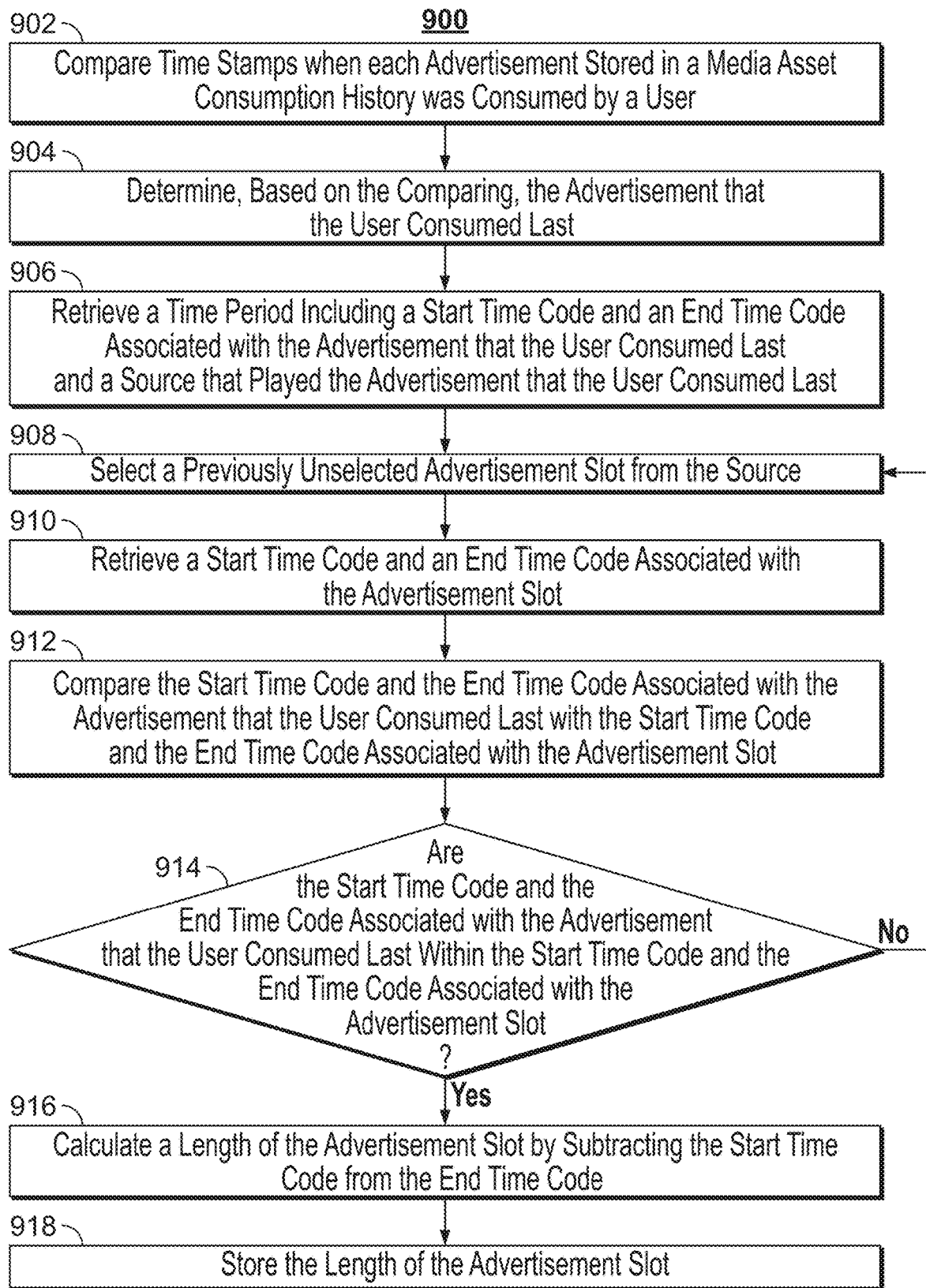
FIG. 9 is a flowchart of illustrative actions for calculating a length of an advertisement slot that includes an advertisement that a user most recently consumed, in accordance with some embodiments of the disclosure.

FIG. 9 is a flowchart of illustrative actions for calculating a length of an advertisement slot that includes an advertisement that a user most recently consumed, in accordance with some embodiments of the disclosure. For example, a media guidance application implementing process 900 may be executed by control circuitry 504 (FIG. 5). It should be noted that process 900 or any step thereof could be performed on, or provided by, any of the devices shown in FIGS. 5-6.

Process 900 begins with 902, where the media guidance application compares (e.g., via control circuitry 504 (FIG. 5)) time stamps when each advertisement stored in a media asset consumption history was consumed by a user. For example, the media guidance application may retrieve and compare (e.g., via control circuitry 504 (FIG. 5)) time stamps (e.g., time codes) stored in a data structure (e.g., which may be stored locally in storage 508 or remotely at media guidance data source 618, accessible via communications network 614) associated with the user that indicate when the user consumed different advertisements.

Process 900 continues to 904, where the media guidance application determines (e.g., via control circuitry 504 (FIG. 5)), based on the comparing, the advertisement that the user consumed last. For example, the media guidance application may determine (e.g., via control circuitry 504 (FIG. 5)) which of the stored time stamps is closest to the current time. As a specific example, the media guidance application may determine (e.g., via control circuitry 504 (FIG. 5)) that, if the current time is 8:22 pm on Jan. 1, 2017 that, out of an advertisement consumed in 2016 and an advertisement consumed at 6:00 pm on Jan. 1, 2017, the advertisement consumed at 6:00 pm is the advertisement that the user consumed last.

Process 900 continues to 906, where the media guidance application retrieves (e.g., via control circuitry 504 (FIG. 5)) a time period including a start time code and an end time code associated with the advertisement that the user consumed last and a source that played the advertisement that the user consumed last. For example, the media guidance application may retrieve (e.g., via control circuitry 504 (FIG. 5)) from fields in a data structure (e.g., which may be stored locally in storage 508 or remotely at media guidance data source 618, accessible via communications network 614) a start time code of the advertisement, an end time code, a source (e.g., content source 616 (FIG. 6)). As a specific example, the media guidance application may retrieve (e.g., via control circuitry 504 (FIG. 5)) values from fields in the data structure indicating that the advertisement that the user consumed last began at 8:20 pm, ended at 8:22 pm, and was received from source "NBC."

Process 900 continues to 908, where the media guidance application selects (e.g., via control circuitry 504 (FIG. 5)) a previously unselected advertisement slot from the source. For example, the media guidance application may access (e.g., via control circuitry 504 (FIG. 5)) a server (e.g., media guidance data source 618 (FIG. 6)) that contains data associated with advertisement slots of a source that presented the advertisement that the user consumed last to the user. Continuing with this example, the media guidance application may execute (e.g., via control circuitry 504 (FIG. 5)) an instruction to iteratively retrieve (e.g., by utilizing a for-loop) data associated with each advertisement slot to determine which advertisement slot the advertisement that the user consumed last was a part of.

Process 900 continues to 910, where the media guidance application retrieves (e.g., via control circuitry 504 (FIG. 5)) a start time code and an end time code associated with the advertisement slot. For example, the media guidance application may execute (e.g., via control circuitry 504 (FIG. 5)) a database query language script (e.g., SQL) to retrieve data from a particular fields in a database (e.g., media guidance data source 618 (FIG. 6)) containing values for the start time code and the end time code associated with a particular advertisement slot. As a specific example, the media guidance application may retrieve (e.g., via control circuitry 504 (FIG. 5)) a start time code of 20:20:00:00 (8:20 pm) and an end time code of 20:21:00:00 (8:21 pm). In some embodiments, the date is embedded into the time code (e.g., the time code contains additional values for the date), while in other embodiments, the media guidance application may retrieve the date that the advertisement slot was presented by the source (e.g., content source 616 (FIG. 6)) from a separate field.

Process 900 continues to 912, where the media guidance application compares (e.g., via control circuitry 504 (FIG. 5)) the start time code and the end time code associated with the advertisement that the user consumed last with the start time code and the end time code associated with the advertisement slot. For example, the media guidance application may compare (e.g., via control circuitry 504 (FIG. 5)) the start time code associated with the advertisement that the user consumed last with the start time code of the advertisement slot to determine whether the advertisement that the user consumed began after the beginning of the advertisement slot. Similarly, the media guidance application may compare (e.g., via control circuitry 504 (FIG. 5)) the end time code associated with the advertisement that the user consumed last with the end time code of the advertisement slot to determine whether the advertisement that the user consumed ended before the end of the advertisement slot.

Process 900 continues to 914, where the media guidance application determines (e.g., via control circuitry 504 (FIG. 5)) whether the start time code and the end time code associated with the advertisement that the user consumed last are within the start time code and the end time code associated with the advertisement slot. For example, the media guidance application may determine (e.g., via control circuitry 504 (FIG. 5)) that the start time code of the advertisement that the user consumed last (e.g., 8:22 pm) is after the start time code of the advertisement slot (e.g., 8:20 pm) and that the end time code of the advertisement that the user consumed last (e.g., 8:23 pm) is before the end time code of the advertisement slot (e.g., 8:25 pm). If both conditions are true, the media guidance application may determine (e.g., via control circuitry 504 (FIG. 5)) that the start time code and the end time code associated with the advertisement that the user consumed last are within the start time code and the end time code associated with the advertisement slot. In some embodiments, if the two start time codes or two end time codes are equal, the media guidance application may still determine (e.g., via control circuitry 504 (FIG. 5)) that the start time code and the end time code associated with the advertisement that the user consumed last are within the start time code and the end time code associated with the advertisement slot.

If, at 914, the media guidance application determines that the start time code and the end time code associated with the advertisement that the user consumed last are not within the start time code and the end time code associated with the advertisement slot, process 900 returns to 908, where the media guidance application selects (e.g., via control circuitry 504 (FIG. 5)) a previously unselected advertisement slot from the source. As discussed above with respect to action 908, the media guidance application may execute (e.g., via control circuitry 504 (FIG. 5)) an instruction to iteratively retrieve (e.g., by utilizing a for-loop) data associated with each advertisement slot to determine which advertisement slot the advertisement that the user consumed last was a part of. If, at 914, the media guidance application determines that the start time code and the end time code associated with the advertisement that the user consumed last are within the start time code and the end time code associated with the advertisement slot, process 900 continues to 916, where the media guidance application calculates (e.g., via control circuitry 504 (FIG. 5)) a length of the advertisement slot by subtracting the start time code from the end time code. For example, the media guidance application may subtract (e.g., via control circuitry 504 (FIG. 5)) corresponding values for the two time codes (e.g., the minutes value of the start time code is subtracted from the minutes value for the end time code and so on) to determine a difference time code which represents the length of the advertisement slot.

Process 900 continues to 918, where the media guidance application stores (e.g., via control circuitry 504 (FIG. 5)) the length of the advertisement slot. For example, the media guidance application may store the length of the advertisement slot in local storage (e.g., storage 508 (FIG. 5)), or at a remote server (e.g., media guidance data source 618 (FIG. 6)).

Figure 10:
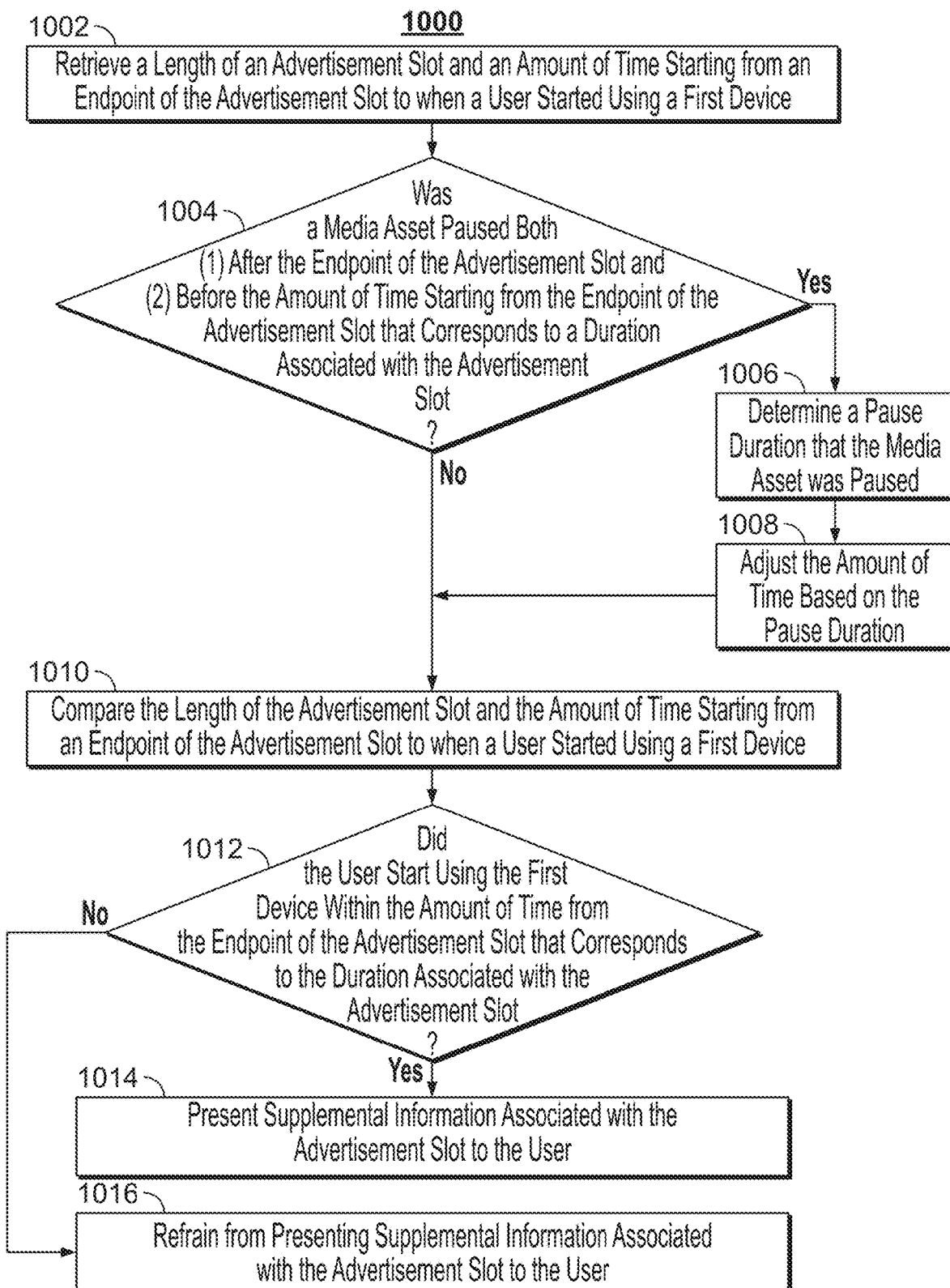
FIG. 10 is a flowchart of illustrative actions for determining whether to present supplemental information to a user, in accordance with some embodiments of the disclosure.

FIG. 10 is a flowchart of illustrative actions for determining whether to present supplemental information to a user, in accordance with some embodiments of the disclosure. For example, a media guidance application implementing process 1000 may be executed by control circuitry 504 (FIG. 5). It should be noted that process 1000 or any step thereof could be performed on, or provided by, any of the devices shown in FIGS. 5-6.

Process 1000 begins with 1002, where the media guidance application retrieves (e.g., via control circuitry 504 (FIG. 5)) a length of an advertisement slot and an amount of time starting from an endpoint of the advertisement slot to when a user started using a first device. For example, the media guidance application may retrieve (e.g., via control circuitry 504 (FIG. 5)) from local storage (e.g., storage 508 (FIG. 5)) or a remote server (e.g., media guidance data source 618 (FIG. 6)) values calculated for the length of the advertisement slot (e.g., as discussed above with respect to FIGS. 8-9) and the amount of time (e.g., as discussed above with respect to FIG. 9).

Process 1000 continues to 1004, where the media guidance application determines (e.g., via control circuitry 504 (FIG. 5)) whether a media asset was paused both (1) after the endpoint of the advertisement slot and (2) before the amount of time starting from the endpoint of the advertisement slot that corresponds to a duration associated with the advertisement slot. For example, the media guidance application may compare (e.g., via control circuitry 504 (FIG. 5)) a time code associated with the time that the media asset was paused (e.g., 8:22 pm) with the endpoint of the advertisement slot (e.g., 8:20 pm) to determine whether the pause happened after the advertisement slot ended. The media guidance application may also compare (e.g., via control circuitry 504 (FIG. 5)) the time after the endpoint of the advertisement slot that corresponds to the first duration with the time that the media asset was paused. For example, the media guidance application may determine (e.g., via control circuitry 504 (FIG. 5)) whether the media asset was paused before the length of the advertisement slot after the endpoint of the advertisement. Based on the result of the two comparisons, the media guidance application may determine (e.g., via control circuitry 504 (FIG. 5)) whether the media asset was paused both (1) after the endpoint of the advertisement slot and (2) before the amount of time starting from the endpoint of the advertisement slot that corresponds to a duration associated with the advertisement slot.

If, at 1004, the media guidance application determines that the media asset was paused both (1) after the endpoint of the advertisement slot and (2) before the amount of time starting from the endpoint of the advertisement slot that corresponds to a duration associated with the advertisement slot, process 1000 continues to 1006, where the media guidance application determines (e.g., via control circuitry 504 (FIG. 5)) a pause duration that the media asset was paused. For example, the media guidance application may receive an indication (e.g., a data packet) that the media asset was paused that includes a value for a duration (e.g., two minutes) that the media asset was paused.

Process 1000 continues to 1008, where the media guidance application adjusts (e.g., via control circuitry 504 (FIG. 5)) the amount of time based on the pause duration. For example, the media guidance application may adjust (e.g., via control circuitry 504 (FIG. 5)) the amount of time by adding the pause duration. Alternatively, the media guidance application may adjust (e.g., via control circuitry 504 (FIG. 5)) the amount of time by scaling the pause duration (e.g., if the media asset was paused for two minutes and the scaling factor is 0.5, the amount of time may be adjusted by only one minute). Process 1000 then proceeds to 1010.

If, at 1004, the media guidance application determines that the media asset was not paused both (1) after the endpoint of the advertisement slot and (2) before the amount of time starting from the endpoint of the advertisement slot that corresponds to a duration associated with the advertisement slot, process 1000 continues to 1010, where the media guidance application compares (e.g., via control circuitry 504 (FIG. 5)) the length of the advertisement slot and the amount of time starting from an endpoint of the advertisement slot to when a user started using a first device. For example, if the media asset was not paused, then the media guidance application may determine that no adjustment to the amount of time is needed and can proceed to action 1010.

At 1010, the media guidance application compares (e.g., via control circuitry 504 (FIG. 5)) the length of the advertisement slot and the amount of time starting from an endpoint of the advertisement slot to when a user started using a first device. For example, the media guidance application may compare the two values (e.g., via control circuitry 504 (FIG. 5)) to determine which is greater. In some embodiments the media guidance application may round (e.g., via control circuitry 504 (FIG. 5)) the two values (e.g., to the nearest second) for easier comparison.

Process 1000 continues to 1012, where the media guidance application determines (e.g., via control circuitry 504 (FIG. 5)) whether the user started using the first device within the amount of time from the endpoint of the advertisement slot that corresponds to the duration associated with the advertisement slot. For example, if the amount of time from the endpoint of the advertisement slot to when the user began using the first device was calculated as 30 seconds and the length of the advertisement slot is 40 seconds, then the media guidance application may determine (e.g., via control circuitry 504 (FIG. 5)) that the user started using the first device within the amount of time from the endpoint of the advertisement slot. In some embodiments, the media guidance application may determine (e.g., via control circuitry 504 (FIG. 5)) that the user started using the first device within the amount of time if the amount of time is within a tolerance factor of the duration. The tolerance factor may be adjusted based on user preferences or interaction history (e.g., stored in a profile associated with the user).

If, at 1012, the media guidance application determines that the user did start using the first device within the amount of time from the endpoint of the advertisement slot that corresponds to the duration associated with the advertisement slot, process 1000 continues to 1014, where the media guidance application presents (e.g., via control circuitry 504 (FIG. 5)) supplemental information associated with the advertisement slot to the user. For example, if the user began using the first device 30 seconds after the end of the advertisement slot and if the duration associated with the advertisement slot is the length of the advertisement slot and is one minute, then the media guidance application may determine (e.g., via control circuitry 504 (FIG. 5)) that the user did start using the first device within the amount of time. Accordingly, the media guidance application may retrieve (e.g., via control circuitry 504 (FIG. 5)) corresponding supplemental information to present to the user, as described with respect to FIGS. 1, 8, and 10.

If, at 1012, the media guidance application determines that the user did not start using the first device within the amount of time from the endpoint of the advertisement slot that corresponds to the duration associated with the advertisement slot, process 1000 continues to 1014, where the media guidance application refrains (e.g., via control circuitry 504 (FIG. 5)) from presenting supplemental information associated with the advertisement slot to the user. For example, if the user began using the first device two minutes after the end of the advertisement slot and if the duration associated with the advertisement slot is the length of the advertisement slot and is one minute, then the media guidance application may determine (e.g., via control circuitry 504 (FIG. 5)) that the user did not start using the first device within the amount of time. Accordingly, the media guidance application may refrain (e.g., via control circuitry 504 (FIG. 5)) from presenting supplemental information to the user as the user is likely not interested.

Figure 11:
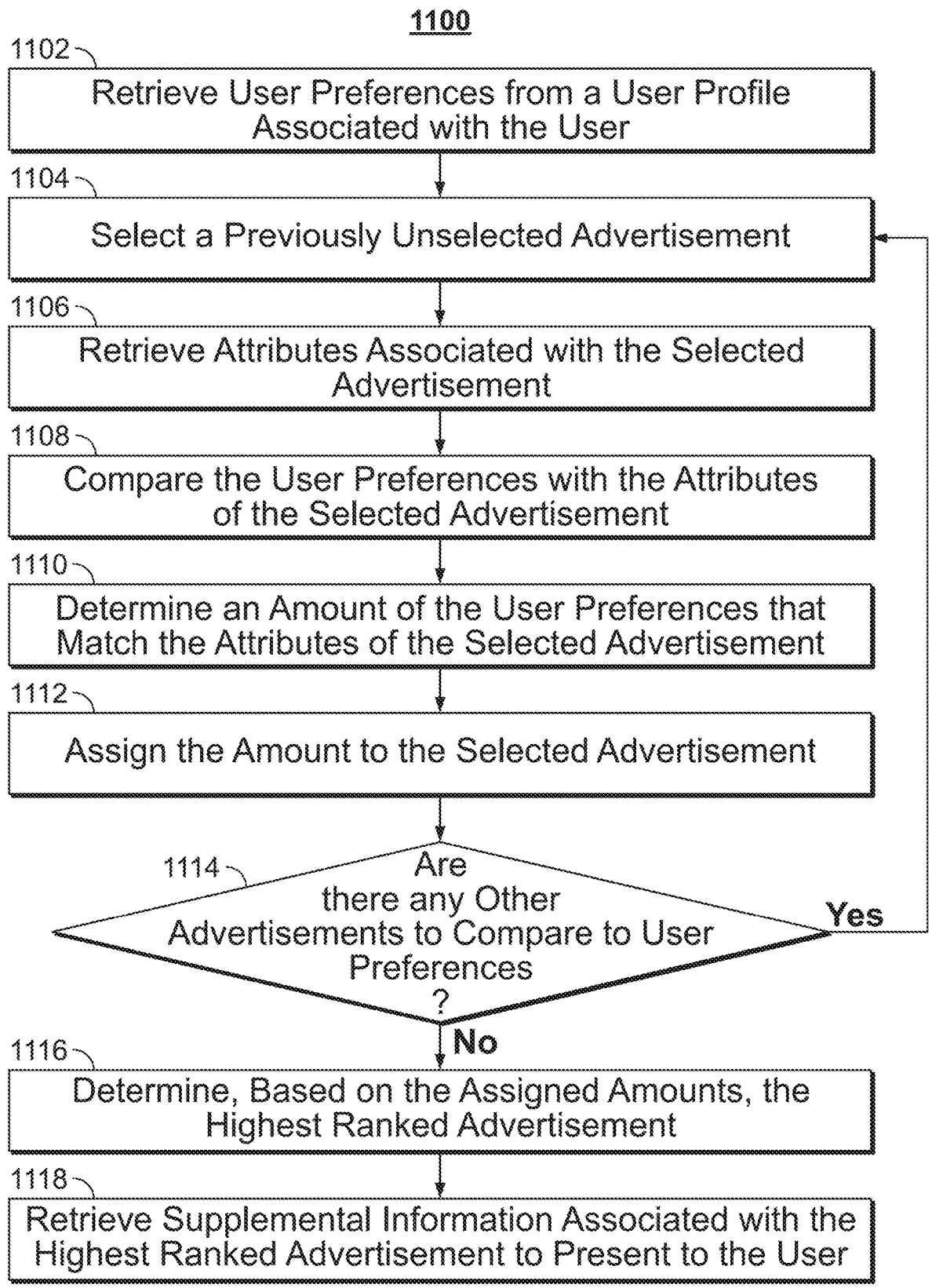
FIG. 11 is a flowchart of illustrative actions for retrieving supplemental information based on user preferences, in accordance with some embodiments of the disclosure

FIG. 11 is a flowchart of illustrative actions for retrieving supplemental information based on user preferences, in accordance with some embodiments of the disclosure. For example, a media guidance application implementing process 1100 may be executed by control circuitry 504 (FIG. 5). It should be noted that process 1100 or any step thereof could be performed on, or provided by, any of the devices shown in FIGS. 5-6.

Process 1100 begins with 1102, where the media guidance application retrieves (e.g., via control circuitry 504 (FIG. 5)) user preferences from a user profile associated with the user. For example, the media guidance application may retrieve (e.g., via control circuitry 504 (FIG. 5)) the user profile from local storage (e.g., storage 508 (FIG. 5)) or a remote server (e.g., media guidance data source 618 (FIG. 6)). As a specific example, the media guidance application may retrieve (e.g., via control circuitry 504 (FIG. 5)) a user preference of a user for the actor "Tom Hanks."

Process 1100 continues to 1104, where the media guidance application selects (e.g., via control circuitry 504 (FIG. 5)) a previously unselected advertisement. For example, the media guidance application may access (e.g., via control circuitry 504 (FIG. 5)) a server (e.g., media guidance data source 618 (FIG. 6)) that contains data associated with advertisements (e.g., advertisements that are part of an advertisement slot including the advertisement that the user consumed last). Continuing with this example, the media guidance application may execute (e.g., via control circuitry 504 (FIG. 5)) an instruction to iteratively retrieve (e.g., by utilizing a for-loop) data associated with each advertisement.

Process 1100 continues to 1106, where the media guidance application retrieves (e.g., via control circuitry 504 (FIG. 5)) attributes associated with the selected advertisement. For example, the media guidance application may retrieve (e.g., via control circuitry 504 (FIG. 5)) attributes associated with advertisements from local storage (e.g., storage 508 (FIG. 5)) or a remote server (e.g., media guidance data source 618 (FIG. 6)). As a specific example, the media guidance application may retrieve (e.g., via control circuitry 504 (FIG. 5)) that a particular advertisement includes the actor "Tom Hanks."

Process 1100 continues to 1108, where the media guidance application compares (e.g., via control circuitry 504 (FIG. 5)) the user preferences with the attributes of the selected advertisement. For example, the media guidance application may compare (e.g., via control circuitry 504 (FIG. 5)) the characters of each user preference in the profile to attributes associated with an advertisement (e.g., in the same advertisement slot as the advertisement that the user consumed last). As a specific example, the media guidance application may compare (e.g., via control circuitry 504 (FIG. 5)) a user preference indicating that he or she "love" actor "Tom Welling" with an actor associated with an advertisement such as "Tom Hanks".

Process 1100 continues to 1110, where the media guidance application determines (e.g., via control circuitry 504 (FIG. 5)) an amount of the user preferences that match the attributes of the selected advertisement. For example, the media guidance application may determine (e.g., via control circuitry 504 (FIG. 5)) the amount based on the number of attributes that match user preferences. As a specific example, a higher amount may be determined (e.g., via control circuitry 504 (FIG. 5)) by the media guidance application for a first advertisement than a second advertisement if the user has a preference for both the product type and actor in the first advertisement, as opposed to just the product type in the second advertisement.

Process 1100 continues to 1112, where the media guidance application assigns (e.g., via control circuitry 504 (FIG. 5)) the amount to the selected advertisement. For example, the media guidance application may store (e.g., via control circuitry 504 (FIG. 5)) a list or other suitable data structure with identifiers of each selected advertisement and an associated field with the assigned amount. The media guidance application may use (e.g., via control circuitry 504 (FIG. 5)) the assigned amounts to rank the advertisements based on their similarity to user preferences (e.g., by utilizing a merge sort, bubble sort, or other sorting algorithm).

Process 1100 continues to 1114, where the media guidance application determines (e.g., via control circuitry 504 (FIG. 5)) whether there are any other advertisements to compare to user preferences. If, at 1114, the media guidance application determines that there are other advertisements to compare to user preferences, process 1100 continues to 1104, where the media guidance application selects (e.g., via control circuitry 504 (FIG. 5)) a previously unselected advertisement. As discussed above with respect to action 1104, the media guidance application may execute (e.g., via control circuitry 504 (FIG. 5)) an instruction to iteratively retrieve (e.g., by utilizing a for-loop) data associated with each advertisement (e.g., of an advertisement slot) to determine which advertisement most closely matches the user preferences.

If, at 1114, the media guidance application determines that there are not any other advertisements to compare to user preferences, process 1100 continues to 1116, where the media guidance application determines (e.g., via control circuitry 504 (FIG. 5)), based on the assigned amounts, the highest ranked advertisement. For example, the media guidance application may determine (e.g., via control circuitry 504 (FIG. 5)), from a ranked list or other data structure containing the assigned amounts, which assigned amount is greatest. The media guidance application may retrieve (e.g., via control circuitry 504 (FIG. 5)) an identifier of the advertisement associated with the greatest assigned amount as the highest ranked advertisement.

Process 1100 continues to 1118, where the media guidance application retrieves (e.g., via control circuitry 504 (FIG. 5)) supplemental information associated with the highest ranked advertisement to present to the user. For example, the media guidance application may determine (e.g., via control circuitry 504 (FIG. 5)) that the highest ranked advertisement (e.g., "Budweiser_ad_1") matches an identifier that is associated with supplemental information. The media guidance application may retrieve (e.g., via control circuitry 504 (FIG. 5)) supplemental information associated with the stored identifier.

Figure 12:
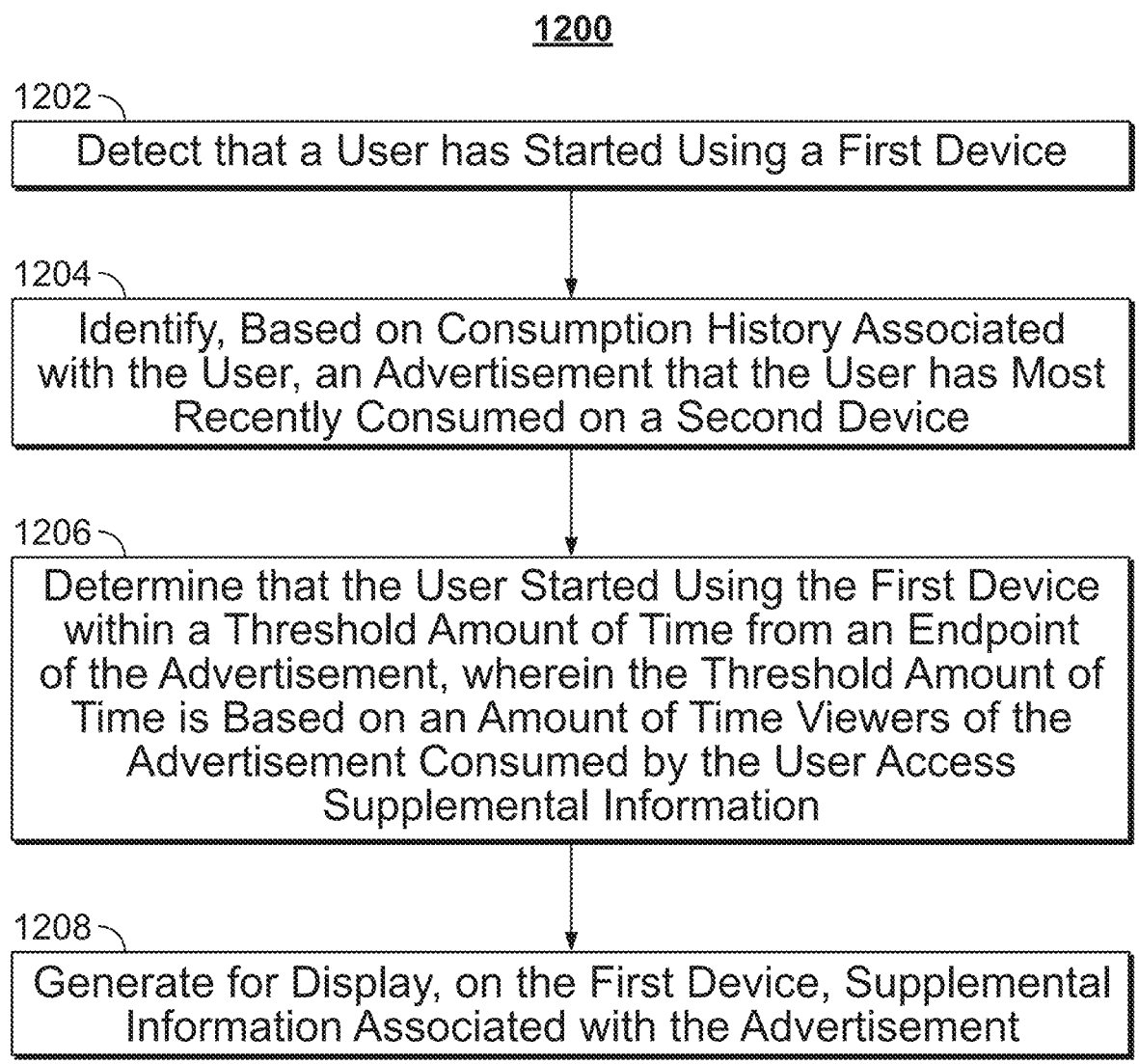
FIG. 12 is a flowchart of illustrative actions for presenting supplemental information associated with an advertisement to a user based on user interaction histories, in accordance with some embodiments of the disclosure.

FIG. 12 is a flowchart of illustrative actions for presenting supplemental information associated with an advertisement to a user based on user interaction histories, in accordance with some embodiments of the disclosure. For example, a media guidance application implementing process 1200 may be executed by control circuitry 504 (FIG. 5). It should be noted that process 1200 or any step thereof could be performed on, or provided by, any of the devices shown in FIGS. 5-6.

Process 1200 begins with 1202, where the media guidance application detects (e.g., via control circuitry 504 (FIG. 5)) that a user has started using a first device (e.g., any of user equipment discussed with respect to FIGS. 5-6). For example, at the first time, the media guidance application may check (e.g., via control circuitry 504 (FIG. 5)) the user's recent interactions with the first device (e.g., any of user equipment described in FIGS. 5-6) to determine whether the user has just started using the device after a period of not using the device.

Process 1200 continues to 1204, where the media guidance application identifies (e.g., via control circuitry 504 (FIG. 5)) an advertisement that the user has most recently consumed on a second device. For example, the media guidance application may determine (e.g., via control circuitry 504 (FIG. 5)) based on an associated time period during which the advertisement was consumed which advertisement the user consumed most recently (e.g., based on comparison with a first time when the user started using the first device). As a specific example, the consumption history (e.g., which may be stored locally in storage 508 or remotely at media guidance data source 618, accessible via communications network 614) may include a stored indication that the user consumed an advertisement with identifier "Cola_ad_1" from 8:20 pm to 8:21 pm. If the current time is 8:22 pm and no additional advertisements were consumed after "Cola_ad_1," then the media guidance application may determine (e.g., via control circuitry 504 (FIG. 5)) it is the advertisement that the user consumed last. In some embodiments, the media guidance application performs actions 1204-1208 responsive to the detection that the user has started using the first device at step 1202.

Process 1200 continues to 1206, where the media guidance application determines (e.g., via control circuitry 504 (FIG. 5)) that the user started using the first device within a threshold amount of time from an endpoint of the advertisement, where the threshold amount of time is based on an amount of time viewers of the advertisement consumed by the user access supplemental information. For example, the media guidance application may retrieve (e.g., via control circuitry 504 (FIG. 5)) a plurality of interaction histories (e.g., stored locally in storage 508 or remotely at media guidance data source 618, accessible via communications network 614) associated with users who consumed similar advertisements to the advertisement consumed last by the user. Continuing with this example, the media guidance application may determine (e.g., via control circuitry 504 (FIG. 5)) a duration after consuming the similar advertisement that a user associated with one of the interaction histories accessed supplemental information associated with the similar advertisements. The media guidance application may iteratively determine (e.g., via control circuitry 504 (FIG. 5)) one or more duration from each of the interaction histories. The media guidance application may average (e.g., via control circuitry 504 (FIG. 5)) the durations to generate the threshold amount of time. After determining the threshold amount of time, the media guidance application may compare (e.g., via control circuitry 504 (FIG. 5)) the amount of time that the user started using the first device after the endpoint of the advertisement with the threshold amount of time. As a specific example, if the amount of time from the endpoint of the advertisement to when the user began using the first device was calculated as 30 seconds and the threshold amount of time was calculated to be 40 seconds based on the interaction histories of users that consumed similar advertisements as described above, then the media guidance application may determine (e.g., via control circuitry 504 (FIG. 5)) that the user started using the first device within the amount of time from the endpoint of the advertisement slot.

Process 1200 continues to 1208, where the media guidance application generates (e.g., via control circuitry 504 (FIG. 5)) for display (e.g., on display 512 (FIG. 5)) supplemental information associated with the advertisement. For example, the supplemental information may be related to a promotion, sale, coupon, discount, newly available product, or any other information the advertiser wishes to inform the user about to entice him or her to purchase a good or service. As a specific example, the media guidance application may generate (e.g., via control circuitry 504 (FIG. 5)) for display the supplemental information automatically upon detecting that the user has started using the first device (e.g., as an overlay or popup on display 612 (FIG. 6)). The media guidance application may, alternatively or additionally, prompt (e.g., on display 512 (FIG. 5)) the user prior to presenting the supplemental information. In response to receiving a user selection (e.g., via user input interface 510 (FIG. 5)) to display the supplemental information, the media guidance application may generate (e.g., via control circuitry 504 (FIG. 5)) supplemental information for display.

Figure 13:
FIG. 13 is another flowchart of illustrative actions for presenting supplemental information associated with an advertisement to a user based on user interaction histories, in accordance with some embodiments of the disclosure.

FIG. 13 is another flowchart of illustrative actions for presenting supplemental information associated with an advertisement to a user based on user interaction histories, in accordance with some embodiments of the disclosure. For example, a media guidance application implementing process 1300 may be executed by control circuitry 504 (FIG. 5).

It should be noted that process 1300 or any step thereof could be performed on, or provided by, any of the devices shown in FIGS. 5-6.

Process 1300 begins with 1302, where the media guidance application detects (e.g., via control circuitry 504 (FIG. 5)) that a user has started using a first device (e.g., any of user equipment discussed with respect to FIGS. 5-6). For example, at the first time, the media guidance application may check (e.g., via control circuitry 504 (FIG. 5)) the user's recent interactions with the first device (e.g., any of user equipment described in FIGS. 5-6) to determine whether the user has just started using the device after a period of not using the device.

Process 1300 continues to 1304, where the media guidance application searches (e.g., via control circuitry 504 (FIG. 5)) media asset consumption history associated with the user for an advertisement that the user consumed last. For example, the media guidance application may determine (e.g., via control circuitry 504 (FIG. 5)) based on an associated time period during which the advertisement was consumed which advertisement the user consumed most recently (e.g., based on comparison with the first time when the user started using the first device). As a specific example, the consumption history (e.g., which may be stored locally in storage 508 or remotely at media guidance data source 618, accessible via communications network 614) may include a stored indication that the user consumed an advertisement with identifier "Cola_ad_1" from 8:20 pm to 8:21 pm. If the current time is 8:22 pm and no additional advertisements were consumed after "Cola_ad_1," then the media guidance application may determine (e.g., via control circuitry 504 (FIG. 5)) it is the advertisement that the user consumed last. In some embodiments, the media guidance application performs (e.g., via control circuitry 504 (FIG. 5)) actions 1304-1324 responsive to the detection that the user has started using the first device at step 1302.

Process 1300 continues to 1306, where the media guidance application retrieves (e.g., via control circuitry 504 (FIG. 5)) metadata associated with the advertisement. For example, the media guidance application may retrieve (e.g., via control circuitry 504 (FIG. 5)) metadata associated with an advertisement locally from storage (e.g., storage 508 (FIG. 5)) or a remote server (e.g., media guidance data source 618, accessible via communications network 614 (FIG. 6)). The metadata may be any data related to the advertisement that describes content associated with the advertisement. For example, if the advertisement is for a new book, the metadata may include the author of the article, genre (e.g., Non-fiction), and/or publisher.

Process 1300 continues to 1308, where the media guidance application determines (e.g., via control circuitry 504 (FIG. 5)), based on the metadata associated with the advertisement, that the advertisement is part of a group of similar advertisements. For example, the media guidance application may retrieve (e.g., via control circuitry 504 (FIG. 5)) identifiers of an actor, product type, company name, or any other metadata that is used to characterize a group of similar advertisements, for each group of similar advertisements (e.g., which may be stored locally in storage 508 or remotely at media guidance data source 618, accessible via communications network 614). As a specific example, the media guidance application may retrieve (e.g., via control circuitry 504 (FIG. 5)) metadata "Tom Hanks" for a particular group of similar advertisements that all include the actor Tom Hanks. The media guidance application may compare (e.g., via control circuitry 504 (FIG. 5)) the metadata associated with the advertisement with the metadata associated with each of the plurality of groups of similar advertisements. For example, the media guidance application may compare (e.g., via control circuitry 504 (FIG. 5)) each retrieved piece of metadata associated with the advertisement that the user consumed last with the metadata associated with each group of similar advertisements by comparing the characters of the metadata. For example, the media guidance application may compare (e.g., via control circuitry 504 (FIG. 5)) characters "Tom Hanks," who is an actor associated with the advertisement that the user consumed last, with characters "Tom Cruise," an actor associated with a particular group of similar advertisements. If the media guidance application determines (e.g., via control circuitry 504 (FIG. 5)) a match between every character of metadata associated with a particular attribute of the advertisement most recently consumed by the user and a corresponding attribute of the group of similar advertisements, the media guidance application may determine (e.g., via control circuitry 504 (FIG. 5)) that the advertisement is part of the group of similar advertisements.

Process 1300 continues to 1310, where the media guidance application retrieves (e.g., via control circuitry 504 (FIG. 5)) interaction histories for a plurality of users who consumed advertisements in the group of similar advertisements. For example, the media guidance application may retrieve (e.g., via control circuitry 504 (FIG. 5)) multiple interaction histories where each interaction history indicates that the associated user consumed an advertisement of the group of similar advertisements (e.g., which may be stored locally in storage 508 or remotely at media guidance data source 618, accessible via communications network 614). As a specific example, each interaction history may include aggregated times and actions taken by a specific user from different sources, for example, a web browsing history and a television viewing history. In this way, the media guidance application may analyze (e.g., via control circuitry 504 (FIG. 5) the interaction histories to determine an amount of time that an associated user took between consuming an advertisement and accessing supplemental information manually (e.g., by typing in the URL of a particular webpage into a web browser at a given time), as described further below with respect to FIG. 14.

Process 1300 continues to 1312, where the media guidance application determines (e.g., via control circuitry 504 (FIG. 5)), based on the retrieved interaction histories, a plurality of durations, where each duration of the plurality of durations is a length of time between a time when a user of the plurality of users finished consuming one of the advertisements in the group to when the user of the plurality of users accessed corresponding supplemental content. For example, the media guidance application may search (e.g., via control circuitry 504 (FIG. 5)) each retrieved interaction history for an identifier of a similar advertisement from the group of similar advertisements. The media guidance application may determine (e.g., via control circuitry 504 (FIG. 5)) whether the user accessed supplemental information associated with the similar advertisement. For example, the media guidance application may determine (e.g., via control circuitry 504 (FIG. 5)) that an advertisement for an above ground pool was consumed by the user and ended at 8:20 pm on a particular day and that at 8:22 pm (two minutes later) on the same day the user visited www.abovegroundpools.com. Continuing with this example, the media guidance application may determine (e.g., via control circuitry 504 (FIG. 5)) that the user accessed supplemental information two minutes after consuming the advertisement based on retrieving the values from the interaction history. The media guidance application may determine (e.g., via control circuitry 504 (FIG. 5)) a difference between the two values (e.g., the difference between 8:20 pm and 8:22 pm is two minutes) as a length of time after the end of the advertisement that the user of the plurality of users accessed supplemental information (e.g., one of the plurality of durations).

Process 1300 continues to 1314, where the media guidance application calculates (e.g., via control circuitry 504 (FIG. 5)) a threshold amount of time associated with the advertisement based on the plurality of durations. For example, the media guidance application may retrieve (e.g., via control circuitry 504 (FIG. 5)) the durations calculated based on the interaction histories and average the durations. As a specific example, if the durations are one, two, and three minutes, the media guidance application may calculate (e.g., via control circuitry 504 (FIG. 5)) two minutes as the threshold amount of time. The media guidance application may optionally weight (e.g., via control circuitry 504 (FIG. 5)) particular durations higher than others, based on a type of supplemental information accessed. For example, the media guidance application may determine (e.g., via control circuitry 504 (FIG. 5)) that a user who accesses a website associated with a company whose product was feature in an advertisement should be weighted more than if the user accessed the website associated with a competitor company selling a similar product.

Process 1300 continues to 1316, where the media guidance application calculates (e.g., via control circuitry 504 (FIG. 5)) an amount of time starting from an endpoint of the advertisement to when the user started using the first device (e.g., any of user equipment discussed with respect to FIGS. 5-6). For example, the media guidance application may calculate (e.g., via control circuitry 504 (FIG. 5)) and store (e.g., in storage 608 (FIG. 6)) the amount of time by subtracting the first time from an end time code of the advertisement. As a specific example, if the user started using the first device at (20:22:10:00) and the end time code is (20:21:40:00), then the media guidance application may calculate (e.g., via control circuitry 504 (FIG. 5)) the amount of time as 30 seconds. In some embodiments, the end time code of the advertisement may not be the endpoint of the advertisement. For example, the media guidance application may add (e.g., via control circuitry 504 (FIG. 5)) a small amount of time (e.g., ten seconds) to account for a transition element that leads back into the media asset provided as part of the media asset by a content source (e.g., content source 616 (FIG. 6)).

Process 1300 continues to 1318, where the media guidance application compares (e.g., via control circuitry 504 (FIG. 5)) the threshold amount of time with the amount of time starting from the endpoint of the advertisement to when the user started using the first device. For example, the media guidance application may compare (e.g., via control circuitry 504 (FIG. 5)) the two calculated values to determine which is greater. In some embodiments the media guidance application may round (e.g., via control circuitry 504 (FIG. 5)) the two values (e.g., to the nearest second) for easier comparison.

Process 1300 continues to 1320, where the media guidance application determines (e.g., via control circuitry 504 (FIG. 5)), based on comparing the threshold amount of time with the amount of time starting from the endpoint of the advertisement to when the user started using the first device (e.g., any of user equipment discussed with respect to FIGS. 5-6), that the user started using the first device within the threshold amount of time from the endpoint of the advertisement. For example, if the amount of time from the endpoint of the advertisement to when the user began using the first device was calculated as 30 seconds and the threshold amount of time was calculated to be 40 seconds based on the interaction histories of users that consumed similar advertisements as described above, then the media guidance application may determine (e.g., via control circuitry 504 (FIG. 5)) that the user started using the first device within the amount of time from the endpoint of the advertisement slot. In some embodiments, the media guidance application may determine (e.g., via control circuitry 504 (FIG. 5)) that the user started using the first device within the amount of time if the amount of time is within a tolerance factor of the duration. For example, the user may be slow to start using a mobile phone after the conclusion of the advertisement if he or she is interested in an advertisement (e.g., because the user always keeps their mobile phone in a different room when watching television) and may want the threshold time to be increased.

Process 1300 continues to 1322, where the media guidance application retrieves (e.g., via control circuitry 504 (FIG. 5)) supplemental information associated with the advertisement that the user consumed last. For example, the media guidance application may determine (e.g., via control circuitry 504 (FIG. 5)) that the advertisement that the user consumed most recently (e.g., "Budweiser_ad_1") matches an identifier that is associated with supplemental information. The media guidance application may retrieve (e.g., via control circuitry 504 (FIG. 5)) supplemental information associated with the stored identifier. For example, the media guidance application may retrieve (e.g., via control circuitry 504 (FIG. 5)) a pointer to a location (e.g., locally in storage 508 or remotely at media guidance data source 618, accessible via communications network 614) where the supplemental information is located and retrieve the supplemental information from that location.

Process 1300 continues to 1324, where the media guidance application generates (e.g., via control circuitry 504 (FIG. 5)) for display (e.g., on display 512 (FIG. 5)) the supplemental information. For example, the supplemental information may be related to a promotion, sale, coupon, discount, newly available product, or any other information the advertiser wishes to inform the user about to entice him or her to purchase a good or service. As a specific example, the media guidance application may generate (e.g., via control circuitry 504 (FIG. 5)) for display the supplemental information automatically upon detecting that the user has started using the first device (e.g., as an overlay or popup on display 612 (FIG. 6)). The media guidance application may, alternatively or additionally, prompt (e.g., on display 512 (FIG. 5)) the user prior to presenting the supplemental information. In response to receiving a user selection (e.g., via user input interface 510 (FIG. 5)) to display the supplemental information, the media guidance application may generate (e.g., via control circuitry 504 (FIG. 5)) the retrieved supplemental information for display.

Figure 14:
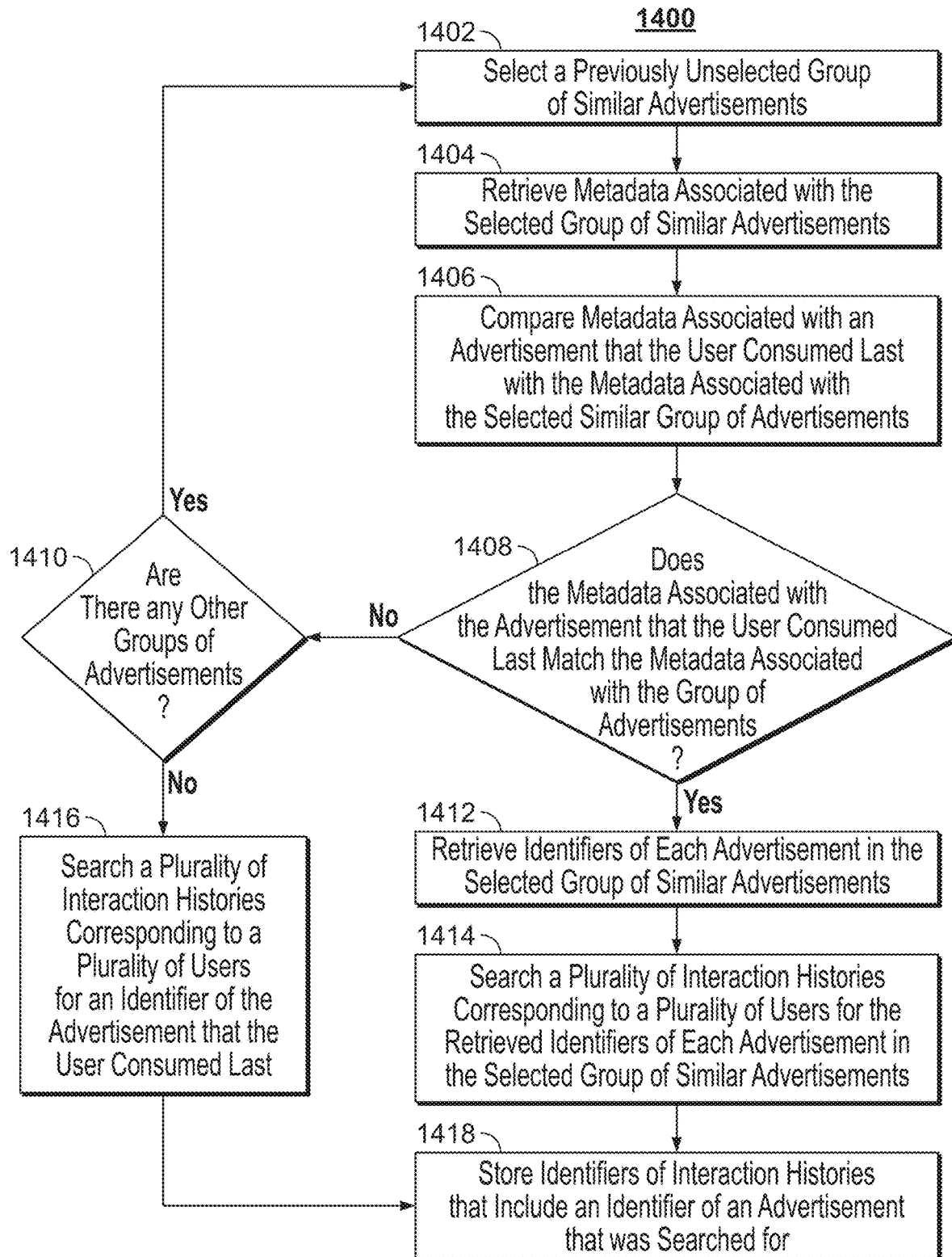
FIG. 14 is a flowchart of illustrative actions for determining a plurality of interaction histories to retrieve based on advertisements that were consumed by users associated with the interaction histories, in accordance with some embodiments of the disclosure.

FIG. 14 is a flowchart of illustrative actions for determining a plurality of interaction histories to retrieve based on advertisements that were consumed by users associated with the interaction histories, in accordance with some embodiments of the disclosure. For example, a media guidance application implementing process 1400 may be executed by control circuitry 504 (FIG. 5). It should be noted that process 1400 or any step thereof could be performed on, or provided by, any of the devices shown in FIGS. 5-6.

Process 1400 begins with 1402, where the media guidance application selects (e.g., via control circuitry 504 (FIG. 5)) a previously unselected group of similar advertisements.

For example, the media guidance application may access (e.g., via control circuitry 504 (FIG. 5)) a server (e.g., media guidance data source 618 (FIG. 6)) that contains data associated with groups of advertisements. Continuing with this example, the media guidance application may execute (e.g., via control circuitry 504 (FIG. 5)) an instruction to iteratively retrieve (e.g., by utilizing a for-loop) data associated with each group of advertisements.

Process 1400 continues to 1404, where the media guidance application retrieves (e.g., via control circuitry 504 (FIG. 5)) metadata associated with the selected group of similar advertisements. For example, the media guidance application may retrieve (e.g., via control circuitry 504 (FIG. 5)) the metadata associated with a group of advertisements from local storage (e.g., storage 508 (FIG. 5)) or a remote server (e.g., media guidance data source 618 (FIG. 6)). As a specific example, the media guidance application may retrieve (e.g., via control circuitry 504 (FIG. 5)) metadata that defines a common characteristic or element of a group of advertisements, such as that all the advertisements are related by an appearance of actor "Chuck Norris."

Process 1400 continues to 1406, where the media guidance application compares (e.g., via control circuitry 504 (FIG. 5)) metadata associated with an advertisement that the user consumed last with the metadata associated with the selected similar group of advertisements. For example, the media guidance application may compare (e.g., via control circuitry 504 (FIG. 5)) each retrieved piece of metadata associated with the advertisement that the user consumed last with the metadata associated with each group of similar advertisements by comparing the characters of the metadata. For example, the media guidance application may compare (e.g., via control circuitry 504 (FIG. 5)) characters "Tom Hanks," representing an actor associated with the advertisement that the user consumed last, with characters "Tom Cruise," representing an actor associated with a particular group of similar advertisements.

Process 1400 continues to 1408, where the media guidance application determines (e.g., via control circuitry 504 (FIG. 5)) whether the metadata associated with an advertisement that the user consumed last matches the metadata associated with the selected similar group of advertisements. For example, the media guidance application may determine (e.g., via control circuitry 504 (FIG. 5)) a match between metadata of the advertisement that the user consumed last and the metadata of the group of similar advertisements if every character matches between a particular piece of metadata (e.g., for an actor). In some embodiments, all the metadata associated with the advertisement that the user consumed last must match the metadata of the group of similar advertisements for a match to be determined. In other embodiments, if a threshold amount of the metadata matches, a match may be determined. If the media guidance application determines (e.g., via control circuitry 504 (FIG. 5)) that the metadata matches between the advertisement that the user consumed last and a particular group of similar advertisements, the media guidance application may determine that the advertisement that the user consumed last is part of the group of similar advertisements.

If, at 1408, the media guidance application determines that the metadata associated with an advertisement that the user consumed last does not match the metadata associated with the selected similar group of advertisements, process 1400 continues to 1410, where the media guidance application determines (e.g., via control circuitry 504 (FIG. 5)) whether there are any other groups of advertisements. As discussed above with respect to action 1402, the media guidance application may execute (e.g., via control circuitry 504 (FIG. 5)) an instruction to iteratively retrieve (e.g., by utilizing a for-loop) data associated with each group of advertisements (e.g., of an advertisement slot) to determine which group of advertisements includes an advertisement that the user consumed last. If, at 1410, the media guidance application determines that there are other groups of advertisements, process 1400 continues to 1402, where the media guidance application selects (e.g., via control circuitry 504 (FIG. 5)) a previously unselected group of similar advertisements.

If, at 1410, the media guidance application determines that there are not any other groups of advertisements, process 1400 continues to 1416, where the media guidance application searches (e.g., via control circuitry 504 (FIG. 5)) a plurality of interaction histories corresponding to a plurality of users for an identifier of the advertisement that the user consumed last. For example, if the media guidance application is unable to determine a group of similar advertisements that the advertisement that the user consumed last is a part of, the media guidance application may search (e.g., via control circuitry 504 (FIG. 5)) the interaction histories for an identifier of the advertisement that the user consumed last (as opposed to for identifiers of any advertisement in a group of similar advertisements). As a specific example, the media guidance application may search (e.g., via control circuitry 504 (FIG. 5)) the interaction histories for a single identifier, "Cola_ad_1," associated with the advertisement that the user consumed last to determine which other users consumed the advertisement. Process 1400 then continues to 1418.

If, at 1408, the media guidance application determines that the metadata associated with an advertisement that the user consumed last does match the metadata associated with the selected similar group of advertisements, process 1400 continues to 1412, where the media guidance application retrieves (e.g., via control circuitry 504 (FIG. 5)) identifiers of each advertisement in the selected group of similar advertisements. For example, the media guidance application may retrieve (e.g., via control circuitry 504 (FIG. 5)) identifiers associated with each advertisement of a group of advertisements from local storage (e.g., storage 508 (FIG. 5)) or a remote server (e.g., media guidance data source 618 (FIG. 6)).

Process 1400 continues to 1414, where the media guidance application searches (e.g., via control circuitry 504 (FIG. 5)) a plurality of interaction histories corresponding to a plurality of users for the retrieved identifiers of each advertisement in the selected group of similar advertisements. For example, if the media guidance application is able to determine a group of similar advertisements that the advertisement that the user consumed last is a part of, the media guidance application may search (e.g., via control circuitry 504 (FIG. 5)) the interaction histories for any identifiers of advertisements in the group of similar advertisements. As a specific example, the media guidance application may search (e.g., via control circuitry 504 (FIG. 5)) the interaction histories for a single identifier, "Cola_ad_1," associated with the advertisement that the user consumed last to determine which other users consumed the advertisement, as well as identifiers of similar advertisements, "Juice_ad_1," and "Milk_ad_1".

Process 1400 continues to 1418, where the media guidance application stores (e.g., via control circuitry 504 (FIG. 5)) identifiers of interaction histories that include an identifier of an advertisement that was searched for. For example, the media guidance application may store in a list or other data structure (e.g., stored locally in storage 508 or remotely at media guidance data source 618, accessible via communications network 614) an identifier of each interaction history where a match was determined with an identifier that the media guidance application searched for.

Figure 15:
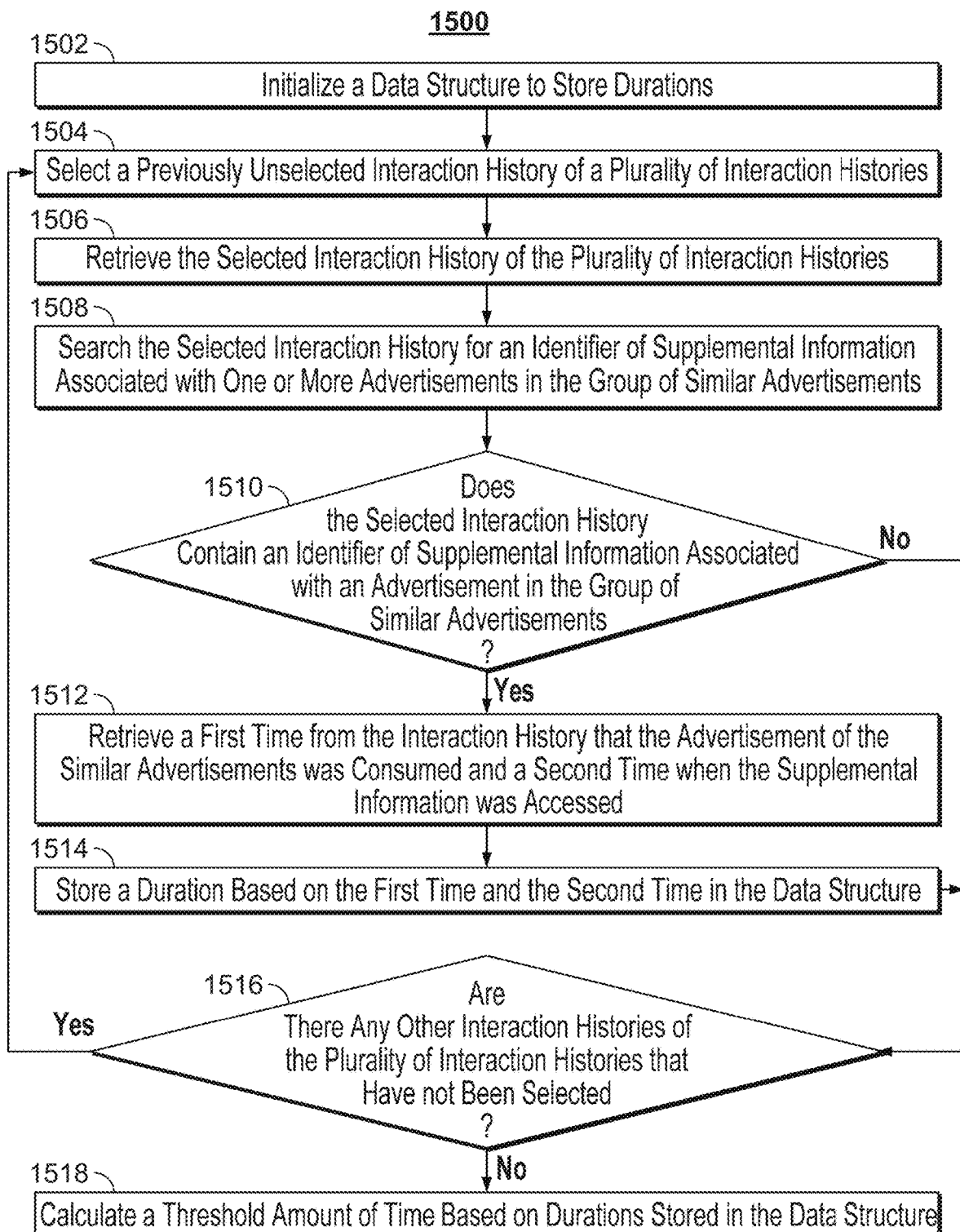
FIG. 15 is a flowchart of illustrative actions for calculating a threshold amount of time based on durations calculated from interaction histories, in accordance with some embodiments of the disclosure.

FIG. 15 is a flowchart of illustrative actions for calculating a threshold amount of time based on durations calculated from interaction histories, in accordance with some embodiments of the disclosure. For example, a media guidance application implementing process 1500 may be executed by control circuitry 504 (FIG. 5). It should be noted that process 1500 or any step thereof could be performed on, or provided by, any of the devices shown in FIGS. 5-6.

Process 1500 begins with 1502, where the media guidance application initializes (e.g., via control circuitry 504 (FIG. 5)) a data structure to store durations. For example, the media guidance application may execute an instruction which initializes an empty list, array, or other data structure that can be used to store durations of time calculated from interaction histories of users, as discussed further below.

Process 1500 continues to 1504, where the media guidance application selects (e.g., via control circuitry 504 (FIG. 5)) a previously unselected interaction history of a plurality of interaction histories. For example, the media guidance application may access (e.g., via control circuitry 504 (FIG. 5)) a server (e.g., media guidance data source 618 (FIG. 6)) that contains a plurality of interaction histories. Continuing with this example, the media guidance application may execute (e.g., via control circuitry 504 (FIG. 5)) an instruction to iteratively retrieve (e.g., by utilizing a for-loop) each interaction history of the plurality of interaction histories.

Process 1500 continues to 1506, where the media guidance application retrieves (e.g., via control circuitry 504 (FIG. 5)) the selected interaction history of the plurality of interaction histories. As discussed above with respect to FIG. 14, the media guidance application may retrieve (e.g., via control circuitry 504 (FIG. 5)) specific interaction histories based on a stored identifier and an indication that the interaction history indicates that a user consumed a similar advertisement to the advertisement that the user consumed last, in order to minimize the number of interaction histories that are retrieved. For example, the media guidance application may retrieve the selected interaction history from local storage (e.g., storage 508 (FIG. 5)) or a remote server (e.g., media guidance data source 618 (FIG. 6)).

Process 1500 continues to 1508, where the media guidance application searches (e.g., via control circuitry 504 (FIG. 5)) the selected interaction history for an identifier of supplemental information associated with one or more advertisements in the group of similar advertisements. For example, the media guidance application may iteratively retrieve (e.g., via control circuitry 504 (FIG. 5)) entries from the selected interaction history at times after a time that the similar advertisement was consumed by a user associated with the interaction history. For example, when the media guidance application determines (e.g., via control circuitry 504 (FIG. 5)) the time that the user consumed an advertisement of the group of similar advertisements in the interaction history, the media guidance application may search (e.g., via control circuitry 504 (FIG. 5)) the interaction history for later times when the user may have accessed supplemental information.

Process 1500 continues to 1510, where the media guidance application determines (e.g., via control circuitry 504 (FIG. 5)) whether the selected interaction history contains an identifier of supplemental information associated with the advertisement in the group of similar advertisements. For example, for each retrieved value, the media guidance application determines (e.g., via control circuitry 504 (FIG. 5)) whether the particular piece of supplemental information the value corresponds to is related to the advertisement. The media guidance application may determine (e.g., via control circuitry 504 (FIG. 5)) that a particular piece of supplemental information is related to the advertisement based on a rule-set, as discussed above with respect to FIG. 1.

If, at 1510, the media guidance application determines that the selected interaction history does contain the identifier of supplemental information, process 1500 continues to 1512, where the media guidance application retrieves (e.g., via control circuitry 504 (FIG. 5)) a first time from the interaction history that the advertisement of the similar advertisements was consumed and a second time when the supplemental information was accessed. For example, the media guidance application may retrieve (e.g., via control circuitry 504 (FIG. 5)), from a field of the selected interaction history, a time code for when the user consumed the advertisement, such as 8:20 pm. The media guidance application may also retrieve (e.g., via control circuitry 504 (FIG. 5)), from another field of the selected interaction history, a time code for when the user accessed supplemental information, such as 8:25 pm on the same day.

Process 1500 continues to 1514, where the media guidance application stores (e.g., via control circuitry 504 (FIG. 5)) a duration based on the first time and the second time in the data structure. For example, the media guidance application may store (e.g., via control circuitry 504 (FIG. 5)) a value for the duration based on subtracting the first time from the second time retrieved from the interaction history. Process 1500 may continue to 1516.

If, at 1510, the media guidance application determines that the selected interaction history does not contain the identifier of supplemental information, process 1500 continues to 1516, where the media guidance application determines (e.g., via control circuitry 504 (FIG. 5)) whether there are any other interaction histories of the plurality of interaction histories that have not been selected. As discussed above with respect to action 1504, the media guidance application may execute (e.g., via control circuitry 504 (FIG. 5)) an instruction to iteratively retrieve (e.g., by utilizing a for-loop) each interaction history of the plurality of interaction histories. If the loop executed by the media guidance application terminates, the media guidance application may determine that every interaction history has been retrieved. If, at 1516, the media guidance application determines that there are other interaction histories of the plurality of interaction histories that have not been selected, process 1500 returns to 1504, where the media guidance application selects (e.g., via control circuitry 504 (FIG. 5)) a previously unselected interaction history of a plurality of interaction histories, as discussed above.

If, at 1516, the media guidance application determines that there are not any other interaction histories of the plurality of interaction histories that have not been selected, process 1500 continues to 1518, where the media guidance application calculates (e.g., via control circuitry 504 (FIG. 5)) a threshold amount of time based on durations stored in the data structure. For example, the media guidance application may calculate (e.g., via control circuitry 504 (FIG. 5)) the threshold amount of time by averaging the durations stored on the list. As a specific example, if durations of two minutes and 4 minutes are stored on the list, representing the amount of time two users took to access supplemental information after consuming an advertisement, the media guidance application may calculate (e.g., via control circuitry 504 (FIG. 5)) three minutes as the threshold amount of time.

Figure 16:
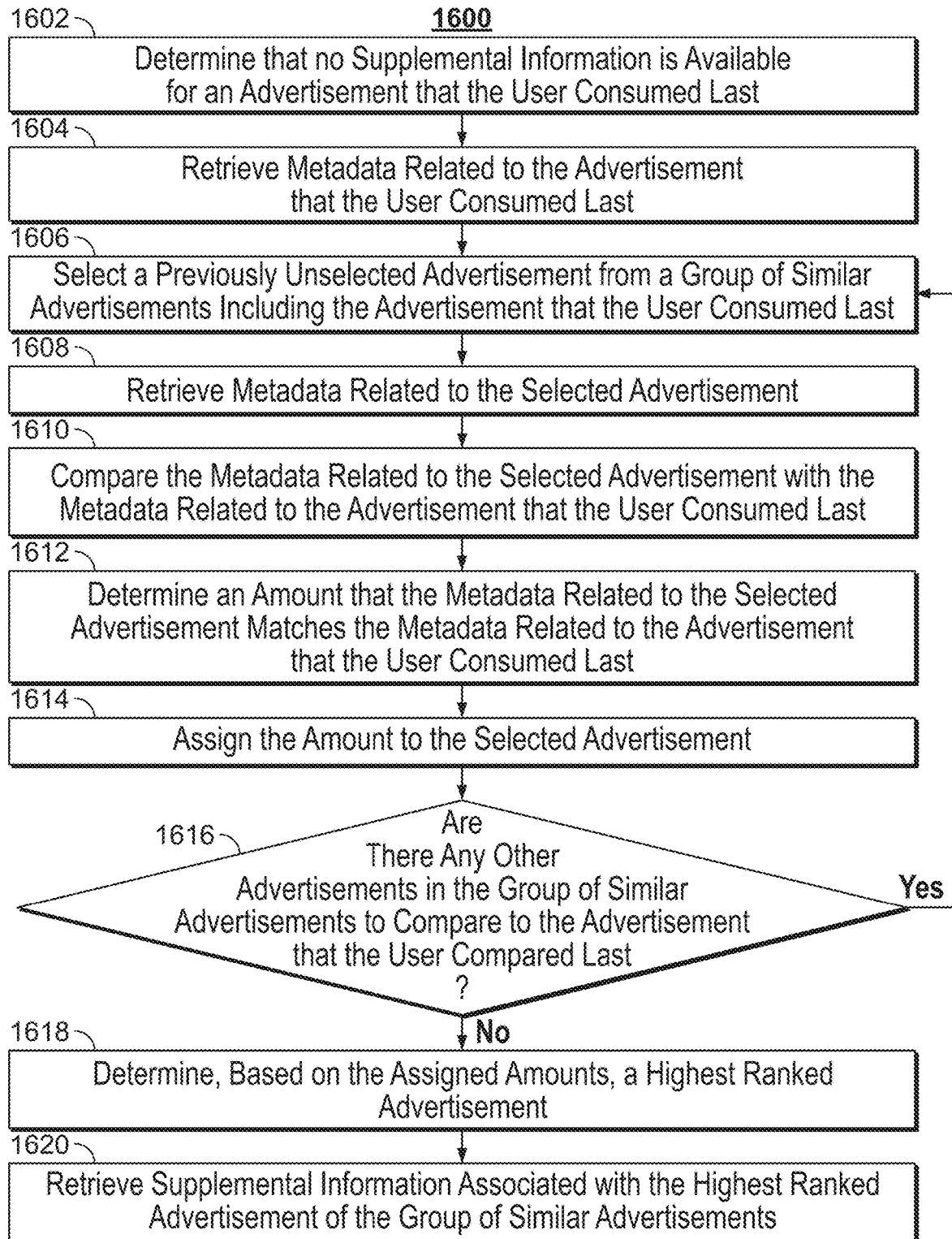
FIG. 16 is a flowchart of illustrative actions for determining supplemental information to retrieve, in accordance with some embodiments of the disclosure.

FIG. 16 is a flowchart of illustrative actions for determining supplemental information to retrieve, in accordance with some embodiments of the disclosure. For example, a media guidance application implementing process 1600 may be executed by control circuitry 504 (FIG. 5). It should be noted that process 1600 or any step thereof could be performed on, or provided by, any of the devices shown in FIGS. 5-6.

Process 1600 begins with 1602, where the media guidance application determines (e.g., via control circuitry 504 (FIG. 5)) that no supplemental information is available for an advertisement that the user consumed last. For example, the media guidance application may compare (e.g., via control circuitry 504 (FIG. 5)) an identifier of the advertisement that was most recently consumed by the user with a plurality of identifiers associated with supplemental information in a database (e.g., stored locally in storage 508 or remotely at media guidance data source 618) and determine that none of the supplemental information in the database is associated with the advertisement.

Process 1600 continues to 1604, where the media guidance application retrieves (e.g., via control circuitry 504 (FIG. 5)) metadata related to the advertisement that the user consumed last. For example, the media guidance application may retrieve (e.g., via control circuitry 504 (FIG. 5)) metadata associated with the advertisement locally from storage (e.g., storage 508 (FIG. 5)) or a remote server (e.g., media guidance data source 618, accessible via communications network 614 (FIG. 6)). The metadata may be any data related to the advertisement that describes content associated with the advertisement. For example, if the advertisement is for a new book, the metadata may include the author of the article, genre (e.g., Non-fiction), and/or publisher.

Process 1600 continues to 1606, where the media guidance application selects (e.g., via control circuitry 504 (FIG. 5)) a previously unselected advertisement from a group of similar advertisements including the advertisement that the user consumed last. For example, the media guidance application may access (e.g., via control circuitry 504 (FIG. 5)) a server (e.g., media guidance data source 618 (FIG. 6)) that contains data associated with advertisements of the group of similar advertisements. Continuing with this example, the media guidance application may execute (e.g., via control circuitry 504 (FIG. 5)) an instruction to iteratively retrieve (e.g., by utilizing a for-loop) data associated with each advertisement.

Process 1600 continues to 1608, where the media guidance application retrieves (e.g., via control circuitry 504 (FIG. 5)) metadata related to the selected advertisement. For example, the media guidance application may retrieve (e.g., via control circuitry 504 (FIG. 5)) metadata from a field of a data structure associated with the selected advertisement, which may be stored on a server (e.g., media guidance data source 618 (FIG. 6)).

Process 1600 continues to 1610, where the media guidance application compares (e.g., via control circuitry 504 (FIG. 5)) the metadata related to the selected advertisement with the metadata related to the advertisement that the user consumed last. For example, the media guidance application may compare (e.g., via control circuitry 504 (FIG. 5)) each piece of metadata associated with the advertisement that the user consumed last with the metadata associated with each advertisement in the group of similar advertisements by comparing the characters of the metadata. As a specific example, the media guidance application may compare (e.g., via control circuitry 504 (FIG. 5)) characters "Tom Hanks," who is an actor associated with the advertisement that the user consumed last, with characters "Tom Cruise," an actor associated with the selected advertisement in the group of similar advertisements.

Process 1600 continues to 1612, where the media guidance application determines (e.g., via control circuitry 504 (FIG. 5)) an amount that the metadata related to the selected advertisement matches the metadata related to the advertisement that the user consumed last. For example, the media guidance application may determine (e.g., via control circuitry 504 (FIG. 5)) the amount based on the number of attributes that match between the advertisement that the user consumed last and the selected advertisement. As a specific example, a higher amount may be determined (e.g., via control circuitry 504 (FIG. 5)) by the media guidance application for a first advertisement than a second advertisement if both the product type and actor in the first advertisement match the corresponding attributes of the advertisement that the user consumed last, as opposed to just the product type in the second advertisement.

Process 1600 continues to 1614, where the media guidance application assigns (e.g., via control circuitry 504 (FIG. 5)) the amount to the selected advertisement. For example, the media guidance application may store (e.g., via control circuitry 504 (FIG. 5)) a list or other suitable data structure with identifiers of each selected advertisement and an associated field with the assigned amount. The media guidance application may use (e.g., via control circuitry 504 (FIG. 5)) the assigned amounts to rank the advertisements based on their similarity to the advertisement that the user consumed last (e.g., by utilizing a merge sort, bubble sort, or other sorting algorithm).

Process 1600 continues to 1616, where the media guidance application determines (e.g., via control circuitry 504 (FIG. 5)) whether there are any other advertisements in the group of similar advertisements to compare to the advertisement that the user compared last. As discussed above with respect to action 1606, the media guidance application may execute (e.g., via control circuitry 504 (FIG. 5)) an instruction to iteratively retrieve (e.g., by utilizing a for-loop) data associated with each advertisement. If the loop executed by the media guidance application terminates, the media guidance application may determine that every similar advertisement has been retrieved. If, at 1616, the media guidance application determines that there are other advertisements in the group of similar advertisements to compare to the advertisement that the user compared last, process 1600 returns to 1606, where the media guidance application selects (e.g., via control circuitry 504 (FIG. 5)) a previously unselected advertisement from a group of similar advertisements including the advertisement that the user consumed last, as discussed above.

If, at 1616, the media guidance application determines that there are not any other advertisements in the group of similar advertisements to compare to the advertisement that the user compared last, process 1600 continues to 1618, where the media guidance application determines (e.g., via control circuitry 504 (FIG. 5)), based on the assigned amounts, a highest ranked advertisement. For example, the media guidance application may determine (e.g., via control circuitry 504 (FIG. 5)), from a ranked list or other data structure containing the assigned amounts, which assigned amount is greatest. The media guidance application may retrieve (e.g., via control circuitry 504 (FIG. 5)) an identifier of the advertisement associated with the greatest assigned amount as the highest ranked advertisement.

Process 1600 continues to 1620, where the media guidance application retrieves (e.g., via control circuitry 504 (FIG. 5)) supplemental information associated with the highest ranked advertisement of the group of similar advertisements. For example, the media guidance application may determine (e.g., via control circuitry 504 (FIG. 5)) that the highest ranked advertisement (e.g., "Budweiser_ad_1") matches an identifier that is associated with supplemental information. The media guidance application may retrieve (e.g., via control circuitry 504 (FIG. 5)) supplemental information associated with the stored identifier.

It is contemplated that the steps or descriptions of each of FIGS. 7-16 may be used with any other embodiment of this disclosure. In addition, the steps and descriptions described in relation to FIGS. 7-16 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 5-6 could be used to perform one or more of the steps in FIGS. 7-16.

While some portions of this disclosure may make reference to "convention," any such reference is merely for the purpose of providing context to the invention(s) of the instant disclosure, and does not form any admission as to what constitutes the state of the art.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for presenting supplemental content related to an advertisement, the method comprising:
    storing, in a content consumption history database associated with a user, content consumption history comprising identifiers of advertisements consumed by the user and a respective time at which each advertisement was consumed;
    detecting, at a first time, based on an input received at a first device at the first time after a threshold period of time during which no input was received at the first device, that the user has started using the first device, wherein the detecting comprises:
        retrieving a log of historical user inputs received at the first device;
        setting, based on the retrieved log of historical inputs received at the first device, the threshold period of time;
        determining, based on the retrieved log, a second time corresponding to a most recent user input received at the first device prior to the input received at the first time; and
        determining that the difference between the first time and the second time is greater than the threshold period of time;
    retrieving the content consumption history from the content consumption history database;
    identifying, from the content consumption history, a plurality of advertisements consumed by the user within a threshold period of time prior to the first time;
    determining whether any advertisement of the plurality of advertisements is of interest to the user; and
    in response to determining that an advertisement is of interest to the user:
        retrieving supplemental information associated with the advertisement; and
        automatically causing the supplemental information to be generated for display at the first device by transmitting the supplemental information to the first device without receiving input of a website URL or a search request from the first device.

2. The method of claim 1, wherein determining whether any advertisement of the plurality of advertisements is of interest to the user further comprises:
    generating for display an identifier of each of the plurality of advertisements;
    receiving, from the user, a selection of an advertisement of the plurality of advertisements; and
    in response to receiving, from the user, a selection of an advertisement of the plurality of advertisements, determining that the selected advertisement is of interest to the user.

3. The method of claim 1, wherein determining whether any advertisement of the plurality of advertisements is of interest to the user further comprises:
    accessing a profile associated with the user;
    determining, from the profile, a preference for a product type;
    determining, based on metadata of each advertisement of the plurality of advertisements, whether any advertisement of the plurality of advertisements relates to the product type; and
    in response to determining that an advertisement of the plurality of advertisements relates to the product type, determining that the advertisement is of interest to the user.

4. The method of claim 1, wherein determining whether any advertisement of the plurality of advertisements if of interest to the user further comprises:
    determining, for each respective advertisement of the plurality of advertisements, a time corresponding to an endpoint of the respective advertisement;
    determining whether the endpoint of any advertisement of the plurality of advertisements is less than a threshold amount of time prior to a current time; and
    in response to determining that an endpoint of an advertisement of the plurality of advertisements is less than the threshold amount of time prior to the current time, determining that the advertisement is of interest to the user.

5. The method of claim 1, wherein determining whether any advertisement of the plurality of advertisements is of interest to the user further comprises:
    for each respective advertisement of the plurality of advertisements:
        retrieving metadata associated with the respective advertisement;

determining, based on the metadata, that the respective advertisement is part of a group of similar advertisements;

retrieving interaction histories for a plurality of users who consumed advertisements in the group of similar advertisements;

calculating a threshold amount of time associated with the respective advertisement based on the retrieved interaction histories;

determining whether the user started using the first device within the threshold amount of time from an endpoint of the respective advertisement; and in response to determining that the user started using the first device within the threshold amount of time from the endpoint of the respective advertisement, determining that the respective advertisement is of interest to the user.

6. The method of claim 5, wherein determining, based on the metadata associated with the advertisement, that the advertisement is part of the group of similar advertisements comprises:

retrieving metadata associated with a plurality of groups of similar advertisements, wherein each group of similar advertisements includes advertisements that share one or more characteristics;

comparing the metadata associated with the advertisement with the metadata associated with each of the plurality of groups of similar advertisements; and based on comparing the metadata associated with the advertisement with the metadata associated with one of the plurality of groups of similar advertisements, determining that the advertisement is part of the group of similar advertisements.

7. The method of claim 1, wherein determining that the difference between the first time and the second time is greater than the threshold period of time comprises:

determining, based on recent user inputs indicated in the log of user inputs, an average time between user inputs on the first device;

comparing the average time between user inputs with the difference between the first time and the second time;

determining, based on comparing the average time between user inputs with the difference, that the average time between user inputs is less than the difference; and based on determining that the average time between user inputs is less than the difference, determining that the difference between the first time and the second time is greater than the threshold period of time.

8. The method of claim 1, wherein retrieving the supplemental information associated with the advertisement that the user consumed last comprises:

retrieving a location of a second device from a profile associated with the user, wherein the location is from a plurality of locations that indicate an area in a home;

retrieving a plurality of identifiers of supplemental information associated with the advertisement that the user consumed last, wherein each of the plurality of identifiers is associated with one or more locations of the plurality of locations;

comparing the location of the second device with each location associated with one of the retrieved plurality of identifiers of supplemental information;

determining, based on comparing the location of the second device with each location associated with one of the retrieved plurality of identifiers of supplemental information, that the location of the second device matches a stored location; and retrieving, from a field associated with the stored location, corresponding supplemental information related to the location of the second device.

9. The method of claim 1, wherein automatically causing the supplemental information to be generated for display comprises:

determining a type of the supplemental information;

comparing the type of the supplemental information with user preferences stored in a profile associated with the user, wherein the user preferences identify devices to display types of supplemental information on;

determining, based on comparing the type of the supplemental information with the user preferences, that the type of the supplemental information matches a first stored user preference associated with displaying supplemental information on a second device; and in response to determining that the type of the supplemental information matches the first stored user preference, transmitting an instruction to the second device to display the supplemental information.

10. A system for presenting supplemental content related to an advertisement, the method comprising:

memory; and control circuitry configured to:

store, in a content consumption history database residing in the memory associated with a user, content consumption history comprising identifiers of advertisements consumed by the user and a respective time at which each advertisement was consumed;

detect, at a first time, based on an input received at a first device at the first time after a threshold period of time during which no input was received at the first device, that the user has started using a first device by:

retrieving a log of historical user inputs received at the first device;

setting, based on the retrieved log of historical inputs received at the first device, the threshold period of time;

determining, based on the retrieved log, a second time corresponding to a most recent user input received at the first device prior to the input received at the first time; and determining that the difference between the first time and the second time is greater than the threshold period of time;

retrieve, from the content consumption history database, the content consumption history associated with the user;

identify, from the content consumption history, a plurality of advertisements consumed by the user within a threshold period of time prior to the first time;

determine whether any advertisement of the plurality of advertisements is of interest to the user; and in response to determining that an advertisement is of interest to the user:

retrieve supplemental information associated with the advertisement; and automatically cause the supplemental information to be generated for display at the first device by transmitting the supplemental information to the first device without receiving input of a website URL or a search request from the first device.

11. The system of claim 10, wherein the control circuitry configured to determine whether any advertisement of the plurality of advertisements is of interest to the user is further configured to:
   generate for display an identifier of each of the plurality of advertisements;
   receive, from the user, a selection of an advertisement of the plurality of advertisements; and
   in response to receiving, from the user, a selection of an advertisement of the plurality of advertisements, determine that the selected advertisement is of interest to the user.

12. The system of claim 10, wherein the control circuitry configured to determine whether any advertisement of the plurality of advertisements is of interest to the user is further configured to:
   access a profile associated with the user;
   determine, from the profile, a preference for a product type;
   determine, based on metadata of each advertisement of the plurality of advertisements, whether any advertisement of the plurality of advertisements relates to the product type; and
   in response to determining that an advertisement of the plurality of advertisements relates to the product type, determine that the advertisement is of interest to the user.

13. The system of claim 10, wherein the control circuitry configured to determine whether any advertisement of the plurality of advertisements if of interest to the user is further configured to:
   determine, for each respective advertisement of the plurality of advertisements, a time corresponding to an endpoint of the respective advertisement;
   determine whether the endpoint of any advertisement of the plurality of advertisements is less than a threshold amount of time prior to a current time; and
   in response to determining that an endpoint of an advertisement of the plurality of advertisements is less than the threshold amount of time prior to the current time, determine that the advertisement is of interest to the user.

14. The system of claim 10, wherein the control circuitry configured to determine whether any advertisement of the plurality of advertisements is of interest to the user is further configured to:
   for each respective advertisement of the plurality of advertisements:
      retrieve metadata associated with the respective advertisement;
      determine, based on the metadata, that the respective advertisement is part of a group of similar advertisements;
      retrieve interaction histories for a plurality of users who consumed advertisements in the group of similar advertisements;
      calculate a threshold amount of time associated with the respective advertisement based on the retrieved interaction histories;
      determine whether the user started using the first device within the threshold amount of time from an endpoint of the respective advertisement; and
      in response to determining that the user started using the first device within the threshold amount of time from the endpoint of the respective advertisement, determine that the respective advertisement is of interest to the user.

15. The system of claim 14, wherein the control circuitry configured to determine, based on the metadata associated with the advertisement, that the advertisement is part of the group of similar advertisements is further configured to:
   retrieve metadata associated with a plurality of groups of similar advertisements, wherein each group of similar advertisements includes advertisements that share one or more characteristics;
   compare the metadata associated with the advertisement with the metadata associated with each of the plurality of groups of similar advertisements; and
   based on comparing the metadata associated with the advertisement with the metadata associated with one of the plurality of groups of similar advertisements, determine that the advertisement is part of the group of similar advertisements.

16. The system of claim 10, wherein the control circuitry configured to determine that the difference between the first time and the second time is greater than the threshold difference is further configured to:
   retrieve a log of recent user inputs on the first device;
   determine, based on recent user inputs indicated in the log of user inputs, an average time between user inputs on the first device;
   compare the average time between user inputs with the difference between the first time and the second time;
   determine, based on comparing the average time between user inputs with the difference, that the average time between user inputs is less than the difference; and
   based on determining that the average time between user inputs is less than the difference, determine that the difference between the first time and the second time is greater than the threshold difference.

17. The system of claim 10, wherein the control circuitry configured to retrieve the supplemental information associated with the advertisement that the user consumed last is further configured to:
   retrieve a location of a second device from a profile associated with the user, wherein the location is from a plurality of locations that indicate an area in a home;
   retrieve a plurality of identifiers of supplemental information associated with the advertisement that the user consumed last, wherein each of the plurality of identifiers is associated with one or more locations of the plurality of locations;
   compare the location of the second device with each location associated with one of the retrieved plurality of identifiers of supplemental information;
   determine, based on comparing the location of the second device with each location associated with one of the retrieved plurality of identifiers of supplemental information, that the location of the second device matches a stored location; and
   retrieve, from a field associated with the stored location, corresponding supplemental information related to the location of the second device.

18. The system of claim 10, wherein the control circuitry configured to automatically cause the supplemental information to be generated for display is further configured to:
   determine a type of the supplemental information;
   compare the type of the supplemental information with user preferences stored in a profile associated with the user, wherein the user preferences identify devices to display types of supplemental information on;
   determine, based on comparing the type of the supplemental information with the user preferences, that the type of the supplemental information matches a first stored user preference associated with displaying supplemental information on a second device; and in response to determining that the type of the supplemental information matches the first stored user preference, transmit an instruction to the second device to display the supplemental information.

\* \* \* \* \*